US012213396B2

(12) United States Patent
Rickard et al.

(10) Patent No.: US 12,213,396 B2
(45) Date of Patent: Feb. 4, 2025

(54) APPARATUS AND METHOD FOR CONVERTING EXISTING SOWING EQUIPMENT

(71) Applicant: SYNGENTA PARTICIPATIONS AG, Basel (CH)

(72) Inventors: Jamie Rickard, Oftringen (CH); Christophe Lupfer, Basel (CH); Christoph Grimm, Basel (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 117 days.

(21) Appl. No.: 17/636,639

(22) PCT Filed: Aug. 14, 2020

(86) PCT No.: PCT/EP2020/072888
§ 371 (c)(1),
(2) Date: Feb. 18, 2022

(87) PCT Pub. No.: WO2021/032632
PCT Pub. Date: Feb. 25, 2021

(65) Prior Publication Data
US 2022/0312663 A1    Oct. 6, 2022

(30) Foreign Application Priority Data

Aug. 21, 2019   (EP) .................................... 19192907

(51) Int. Cl.
*A01C 1/06* (2006.01)
*A01C 7/20* (2006.01)
(52) U.S. Cl.
CPC . *A01C 1/06* (2013.01); *A01C 7/20* (2013.01)
(58) Field of Classification Search
CPC .... A01C 1/06; A01C 7/20; A01C 7/00; A01C 1/00; B05B 12/122
(Continued)

(56) References Cited

U.S. PATENT DOCUMENTS 3,460,492 A  *  8/1969  Oakes ...................... A01C 1/06
                                                         221/253
4,356,934 A  *  11/1982  Knake ..................... A01C 1/06
                                                        47/DIG. 9
(Continued)

FOREIGN PATENT DOCUMENTS

DE      102017217478 A1     4/2019
EP         3195716 A1  *    7/2017  .......... A01C 17/006
WO      2016209217 A1    12/2016

OTHER PUBLICATIONS

Written Opinion of the International Searching Authority and International Search Report for International Application No. PCT/EP2020/072888 mailed Nov. 18, 2020.
(Continued)

Primary Examiner — Brady W Frazier
Assistant Examiner — Zoe Tam Tran
(74) Attorney, Agent, or Firm — BakerHostetler; Toni-Junell Herbert

(57) ABSTRACT

The present invention relates to a system for modifying existing sowing equipment comprising a plant propagation materials (K) reservoir, a separation device for singulating plant propagation materials (K), and an outlet for directing the singulated plant propagation materials (K) to the soil, comprising an application assembly (30) configured to be attachable to the outlet or the singulation device, for selectively applying an aliquot of a dressing composition to the separated plant propagation materials (K) wherein the application device (30) further comprises: i. a power supply connector, ii. a reservoir (18) for the fluidized dressing composition, all attachable to the sowing equipment; ill. a sensor array comprising at least one sensor (32, 33) for measuring the trajectory of the plant propagation materials while falling, iv. a controller (35) for calculating the trajectory from the data received from the sensor array; and for
(Continued)

coordinating and applying the dressing composition; and v. an outlet device for dispensing an aliquot of the dressing composition selectively onto the plant propagation materials during free-falling.

15 Claims, 6 Drawing Sheets

(58) Field of Classification Search
 USPC .......................................... 47/57.6; 118/631
 See application file for complete search history.

(56) References Cited

U.S. PATENT DOCUMENTS

| 5,650,609 | A | 7/1997 | Mertins et al. |
| 5,931,882 | A | 8/1999 | Fick et al. |
| 6,289,829 | B1 | 9/2001 | Fish et al. |
| 9,730,377 | B2 | 8/2017 | Kowalchuk |
| 2004/0231575 | A1 | 11/2004 | Wilkerson et al. |
| 2012/0016517 | A1 | 1/2012 | Holland |
| 2016/0374260 | A1 | 12/2016 | Kowalchuk |
| 2017/0251656 | A1* | 9/2017 | Kolb ................... A01C 23/023 |
| 2017/0265374 | A1 | 9/2017 | Wintemute et al. |
| 2018/0255696 | A1 | 9/2018 | Wintemute et al. |

OTHER PUBLICATIONS

Extended European Search Report for Application No. 19192907.4, mailed Feb. 18, 2020.
International Preliminary Report on Patentability and Written Opinion for International Application No. PCT/EP2020/072886, 12 pages, Feb. 17, 2022.
International Preliminary Report on Patentability and Written Opinion for International Application No. PCT/EP2020/072889, 9 pages, Feb. 17, 2022.
Notification of the First Office Action in Chinese Application No. 202080058867.6 dated Oct. 10, 2023, with English translation.

* cited by examiner

APPARATUS AND METHOD FOR CONVERTING EXISTING SOWING EQUIPMENT

CROSS-REFERENCE TO RELATED APPLICATIONS

This application is a 371 National Stage application of International Application No. PCT/EP2020/072888 filed Aug. 14, 2020, which claims the benefit of EP 19192907.4, filed Aug. 21, 2019, the entire contents of these applications are hereby incorporated by reference.

FIELD OF THE INVENTION

The present invention relates to the general technical field of agricultural machinery and in particular to planters and seed drills and similar sowing machines.

BACKGROUND OF THE INVENTION

Agricultural sowing machines such as a row crop planter or grain drill place seeds into cultivation soil at a desired depth, usually within a plurality of parallel seed trenches or furrows formed in soil. These machines have in common that they comprise mechanisms necessary to properly meter the seeds, to dispense the seeds at a predetermined rate and place the seeds at predetermined relative locations within the furrow. The mechanisms associated with metering and placing the seeds generally comprise a seed metering system, and a seed placement system in communication with each other. The seed metering system usually receives the seeds in a bulk manner from a seed reservoir, and then separates them out or singulates them at least to some extent, after which they are directed towards the desired location in a furrow or otherwise created cavity for receiving the seeds.

Most of the seeds sown to date are pre-coated with active agricultural materials for effective protection against various diseases and pests, and/or for growth enhancement. Seed treatment is essential to fight against diseases transmitted by seed and to protect young plants against pests naturally present in the soil. These coated seeds undergo multiple constraints, shocks between packaging and seedlings that generate dust that are found in the hoppers. This dust may be sucked up and thrown into the environment during sowing. This dust rejected by the turbine exhaust may comprise abraded seed dressing components, which may creates an undesired exposure for both the farmer and the environment to this dust.

Recently, a number of developments have been published that attempt to avoid use of pre-treated seeds, while applying seed treatments in the field, although none of them ahs been reported as commerically used. U.S. Pat. No. 9,730,377 for instance discloses a planter provided with onboard seed treatment for treating seeds "on the go" during row-crop planting of an agricultural field. The seed treatment system uses a spray nozzle system, which applies a mist of liquid treatment spray to the seeds traveling within pockets of a belt that singulates and carries the seeds through a seed tube. A disadvantage of this treatment system is that the spray indiscriminately also covers the belt and part of the seed tube, thereby resulting in fouling, and issues with seeds getting stuck in the mechanism. Also, the system is fully integrated with the sowing machine, and hence requires replacement of the existing sowing equipment. During cleaning of this seed equipment, point-source emissions are likely to occur which are also directly affecting the operator, while contaminated drills can pollute areas even of dressed seeds are not used, simply by abrasion of the accumulated material though seeds.

Accordingly, it would hence be highly beneficial if existing seeding machinery could be modified to selectively apply agricultural components directly, and only to each seed, without fouling of the equipment and seed distribution issues, and with minimal interference to the existing seed drop process.

SUMMARY OF THE INVENTION

Accordingly, in a first aspect, the present invention relates to a system for modifying existing precision sowing equipment comprising a plant propagation materials (K) reservoir, a separation device for singulating plant propagation materials (K), and an outlet for directing the singulated plant propagation materials (K) to the soil, comprising an application assembly (30) configured to be attachable to the outlet or the singulation device, for selectively applying an aliquot of a dressing composition to the separated plant propagation materials (K) wherein the application device (30) further comprises:
  i. a power supply connector,
  ii. a reservoir (18) for the fluidized dressing composition, all attachable to the sowing equipment;
  iii. a sensor array comprising at least one sensor (32, 33) for measuring the trajectory of the plant propagation materials while falling,
  iv. a controller (35) for calculating the trajectory from the data received from the sensor array; and for coordinating and applying the dressing composition; and
  v. an outlet device for dispensing an aliquot of the dressing composition selectively onto the plant propagation materials during free-falling.

In a second aspect, the present invention relates to a kit of parts comprising a. a precision sowing equipment comprising a plant propagation materials (K) reservoir, a separation device for singulating plant propagation materials (K), and an outlet for directing the singulated plant propagation materials (K) to the soil, and b. an application assembly (30) configured to be attachable to the outlet or the singulation device, for selectively applying an aliquot of a dressing composition to the separated plant propagation materials (K), and, optionally, i. a power supply, ii. a reservoir (18) for the fluidized dressing composition, all attachable to the sowing equipment optionally comprising removable cartridges; iii. a sensor array comprising at least one sensor (32, 33) for measuring the trajectory of the plant propagation materials while falling, iv. a controller (35) for calculating the trajectory from the data received from the sensor array; and for coordinating and applying the dressing composition; and v. an outlet device for dispensing an aliquot of the dressing composition selectively onto the plant propagation materials during free-falling.

In a further aspect, the present invention also relates to a method for retrofitting an existing sowing equipment, comprising a. providing an existing precision sowing equipment comprising a plant propagation materials (K) reservoir, a separation device for singulating plant propagation materials (K), and an outlet for directing the singulated plant propagation materials (K) to the soil, and b. operably attaching an application assembly (30) configured to be attachable to the outlet or the singulation device, for selectively applying an aliquot of a dressing composition to the separated plant propagation materials (K) to the singulation device or outlet.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE FIGURES

Other features and advantages of the invention will become apparent from the following claims and description of non-limiting embodiments of the invention with reference to the accompanying drawings, in which:

DETAILED DESCRIPTION OF THE INVENTION

Figure 1:
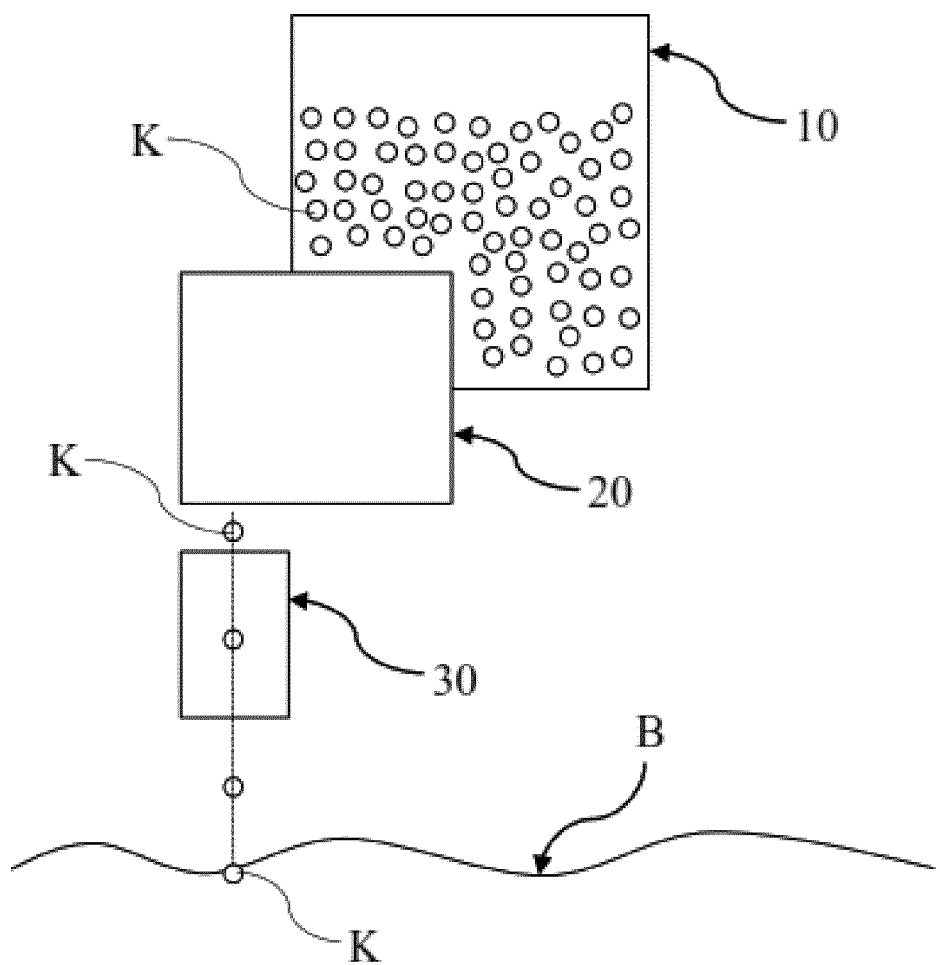
FIG. 1 shows a schematic overall illustration of the retrofitted sowing device according to the invention.
Figures 2, 3:
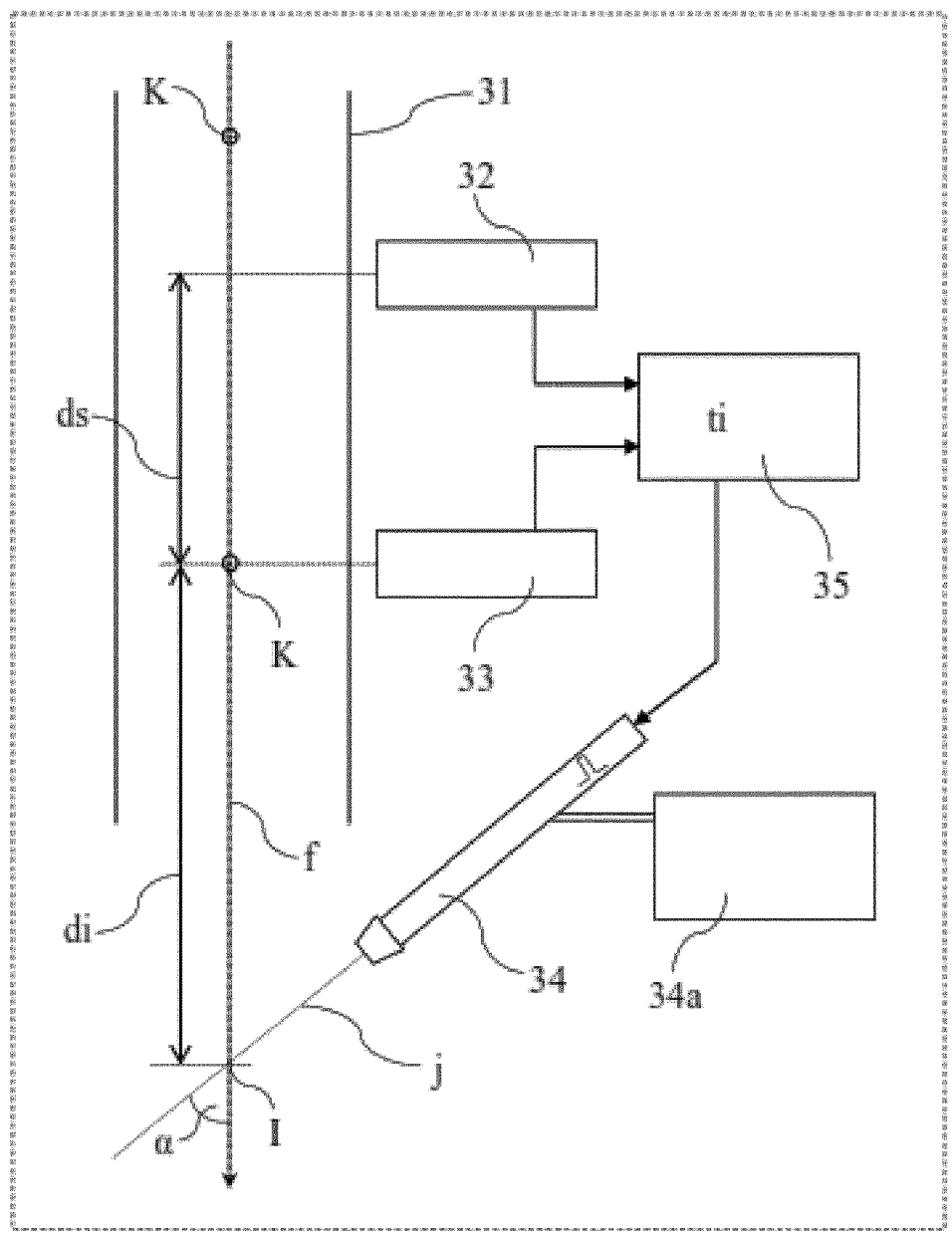
FIG. 2 shows a schematic illustration of the application device of a first exemplary embodiment of the sowing device according to the invention.
FIG. 3 shows a pulse/time diagram.
Figure 4:
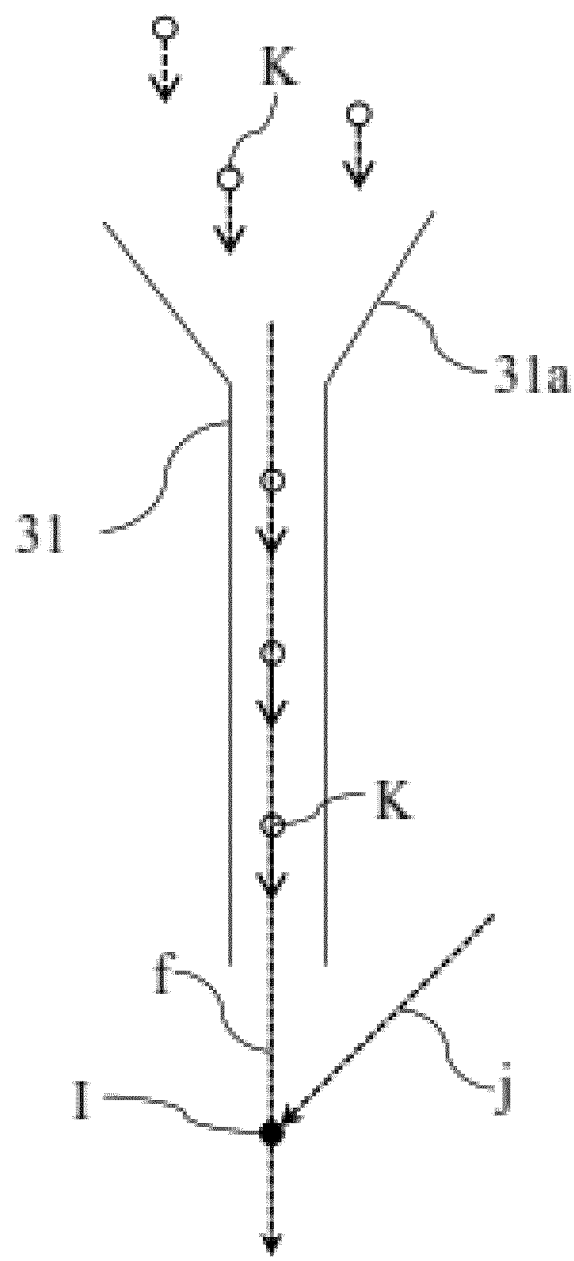
FIG. 4 shows a highly simplified schematic illustration of an application device of a second exemplary embodiment of the system according to the invention.
Figure 5:
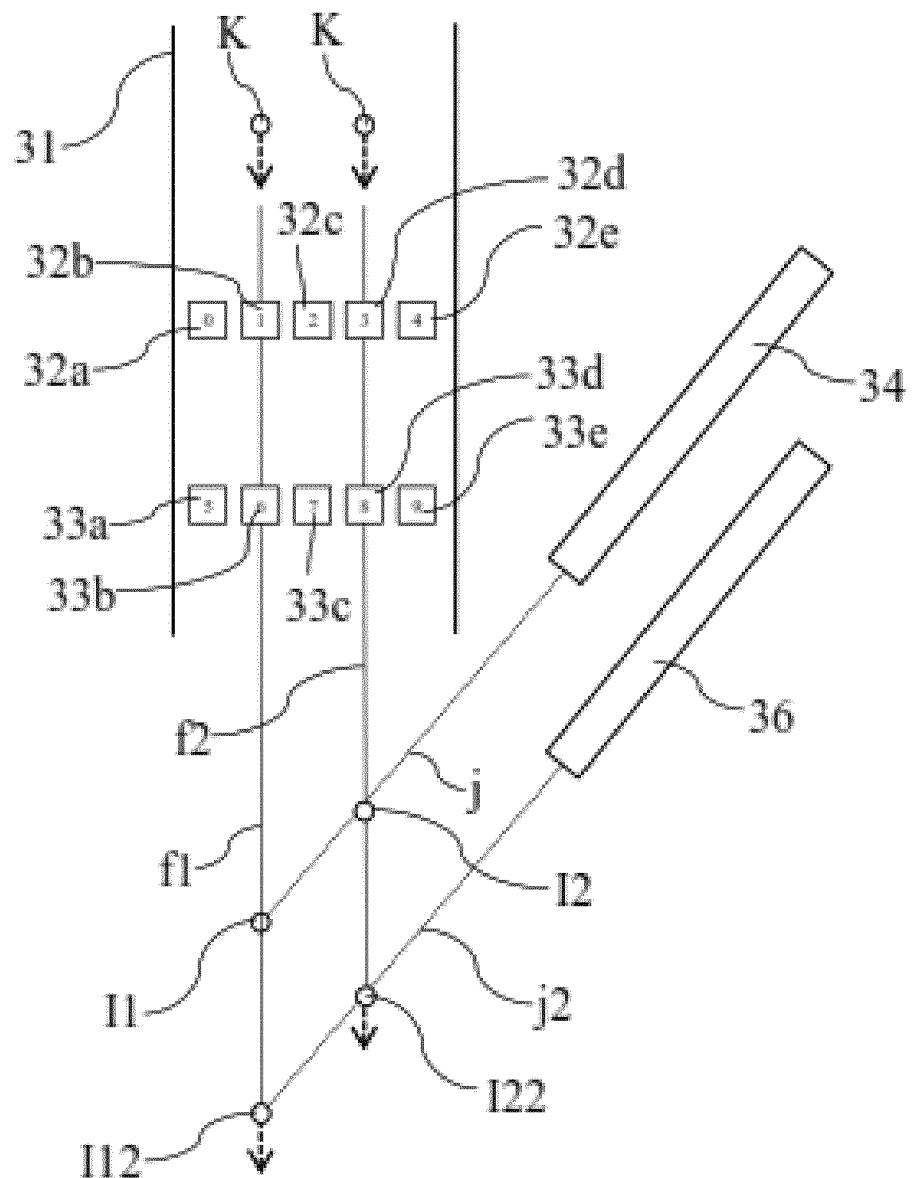
FIG. 5 shows a likewise highly simplified schematic illustration of an application device of a third exemplary embodiment of the system according to the invention.

The present application system is deigned and configured to be mounted on exising precision sowing equipment, such as drill seeders or planters drawn by a conventional tractor. The system may be automatically operated by forward drive of the planter. Alternatively, the system is remotely controlled from the tractor so that the operator of the planter may readily turn the system on or off in accordance with the supply of plant propagation materials to the planter units.

This system allows to retrofit and modernize existing planters, while at the same time deleting contamination by dressing dust, and reduces the overall contamination for the operator and the environment. It further permits to dress seeds depending on the actual conditions in a field, thereby reducing any unnecessary treatments, while allowing to adapt to specific circumstances and to agronomical model that works best for a certain field. It also permits an individualized treatment of microclimates akin to the digital printing process, whereby the operator may use geodata and environmental conditions to apply a varying amount and composition of treatments throughout a single sowing operation, thereby permitting a very soil and environment friendly approach.

The system thus may permit to apply two or more different compositions to plant propagation materials by means of two or more application nozzles in a single device, and this may be varied per row. As a result it is possible to treat the seeds with an individualized dressing made up of a combination of various or different compositions and layers.

An underlying surface (for seed) is understood in the context of the present invention to be an agricultural soil or cultivation medium onto which the plant propagation material is applied.

In the following description, all the positional information and directional information, such as e.g. top, bottom, above, below, upwards, downwards, vertical, horizontal, etc. relate to the upright position of the sowing device according to the invention as illustrated in the figures and corresponding to their practical use.

In accordance with the present invention, plant propagation materials, in particular seeds, are treated in the field just prior to planting by spray coating the seed with a fluid containing such materials as bactericides, fungicides or insecticides, and if desired, fertilizer.

The sowing equipment typically comprises a furrow sowing device for receiving seeds from each tube may include a soil opener, such as a opener disk, covering disks and a press wheel.

A dressing composition is selectively applied to the separated plant propagation materials, and the individual plant propagation materials to which seed dressing has been applied are successively delivered onto the underlying surface, for seeding or planting, without contact of the treated materials. The application of an aliquot of a dressing composition to the separated plant propagation materials takes preferably place during their falling movement onto the underlying surface for seed. The plant propagation materials may fall onto the underlying surface along a straight or curved fall line. For example, if the plant propagation materials have a velocity component substantially parallel to the underlying surface, for example due to horizontal movement of the sowing device as it traverses the underlying surface, as well as a downward acceleration component due to gravity, then the fall line may be substantially parabolic in a frame of reference where the underlying surface is stationary, while the fall line may be substantially straight in a frame of reference where the sowing device is stationary.

Typically, a liquid dressing formulation, is applied, e.g. aqueous solutions or organic solutions or a mixture of phases, as dispersions or suspensions of particles in aqueous or organic liquids or pastes that are seed safe for the periods of time in the frame of application, sowing and germination, wherein the only limitation is that the dressing composition can be applied at the necessary dose rate and volume and pressure and rheological properties and dynamic surface tension and adherence. Typically the active substance is suspended or emulsified or dissolved or absorbed or encapsulated in a liquid phase or blended with a carrier as a water dispersible powder or water dispersible granule. Classical agrochemical formulation such as flowable suspensions, suspension concentrates, emulsions, solutions, encapsulated suspensions, water dispersible powders or water dispersible or water soluble granules may also be applied, provided they meet the same conditions. In some embodiments, the composition to be applied may comprise nutrients, fertilizers and/or inoculants. Dressing compositions that can be employed with the device and in the method according to the present invention, in certain embodiments, may also include additional components, including additional adjuvants, biocides, or other components. The coating on each individual seed is preferably effectively sufficiently dried as it falls onto the underlying surface. Applying seed dressing to the plant propagation materials, as it were, in free fall, prevents contamination of the components of the corresponding sowing device. In particular, seed dressing is not applied to the plant propagation materials while they rest on a surface or while they are held in a container or reservoir or other device. In this way, it is possible to apply seed dressing to the plant propagation materials without at the same time contaminating parts of the sowing device with the seed dressing, as in the prior art.

After the plant propagation materials have been separated they may be allowed to fall through a seed tube comprising sensors, further referred to herein as sensor shaft, wherein the passage of each separated seed through the sensor shaft is detected by sensor and a time delay until the seed arrives at an impact location, located along the fall line of said seed, outside the sensor shaft is calculated, and wherein the application of seed dressing to the seed takes place at the impact location in accordance with the calculated time delay. In this way, precise application of seed dressing to the plant propagation materials can be achieved.

Yet further, due to the fact that each aliquot is directed towards a single plant propagation material, by combining environmental data and/or geolocation data, the operator may vary the composition and/or concentration of the applied dressing during a single application or sowing run. This has the benefit that only where necessary, certain active compounds are used, and specifically for a certain seed or seed patch. An example may be crop fields were different climate conditions apply, e.g. higher soil humidity towards a water source, which may lead to a certain pest to likely originate from this spot; by adapting the concentration or even presence of a certain compound, this may be treated only where necessary. Also, where certain areas are more arid or subject to a certain stress, additional growth enhancer might be added for this area or patch, resulting in a more uniform overall growth, and hence increased harvest.

Yet further, the present invention also allows for the use of dedicated removable cartridges or canisters, which may reduce the operator exposure significantly. Also, this may advantageously permit applying the principles of digital printing to the process of planting and/or sowing, thereby allowing for an adaption to the terrain and current and modelled conditions. Yet further, the present device and method also permit the use of relatively storage unstable components, such as biologicals or biosimilar compounds, which were previously unsuited for pre-treatment of seeds, and the treatment of storage unstable plant propagation materials such as cuttings or seedlings.

In the present context, a triggerable application nozzle is advantageously used to apply seed dressing to the plant propagation materials, which application nozzle ejects, each time it is triggered, a defined quantity of seed dressing along an spraying trajectory, wherein the impact location is defined as an intersection point between the fall line of a seed and the spraying trajectory of the application nozzle. The spraying trajectory may be essentially linear. The application nozzle is connected to a source of seed dressing. The seed dressing is advantageously in fluid form, for example in liquid, gel or droplet form. It is conceivable that a seed dressing in the form of an adhesive powder could be used. The defined quantity of seed dressing may be from 0.1 to 5 µl, optionally from 0.3 to 5 µl, optionally from 1 to 4 µl, optionally from 2 to 3 µl, optionally about 2.5 µl. However, it will be appreciated that different quantities of seed dressing may be appropriate for differently-sized plant propagation materials. The seed dressing may be supplied to the application nozzle by way of a controllable valve, for example a solenoid valve or a pneumatically- or hydraulically-driven valve. By appropriate control of the valve, it is possible to control a volume of seed dressing delivered each time the application nozzle is triggered. The delivered volume may be varied as required, for example for different seed positions or different seed dressings or different seed types. Moreover, in some embodiments a pressure of the seed dressing supplied to the application nozzle may be controlled, for example by way of the pump, so as to control or adjust a velocity of the sprayed seed dressing.

The transverse position of each seed within the sensor shaft is advantageously detected by at least one sensor. The impact location may be defined individually on the basis of the transverse position, and accordingly the time delay until the seed arrives at the impact location can be calculated individually. In this way, a sensor shaft with a relatively wide cross section can be used, with the result that the falling movements of the plant propagation materials are not impeded.

The application nozzle is advantageously oriented in such a way that its spraying trajectory intersects the fall lines of the plant propagation materials at an acute angle of preferably 30°-60°. As a result seed dressing can be reliably applied to plant propagation materials moving on various fall trajectories. In some embodiments, the intersection between the spraying trajectory and a fall line may be up to 5 cm, or up to 10 cm, from the application nozzle. It is generally preferred for the distance between the application nozzle and the intersection to be short, since this helps to improve the application accuracy of the seed dressing.

Two or more seed dressings are advantageously applied to the separated plant propagation materials by means of two or more application nozzles. As a result it is possible to treat the plant propagation materials with various or different seed dressings.

With respect to the sowing device, the essence of the invention is as follows: a sowing device for discharging plant propagation material onto an underlying surface for seed has a reservoir container for the plant propagation material, a separating device which is designed to separate plant propagation materials fed from the reservoir container and to output them individually, and an application device to apply a seed dressing composition to the separated plant propagation materials. The application device is configured to apply seed dressing to the separated plant propagation materials after they leave the separating device during their falling movement onto the underlying surface for seed.

Applying seed dressing to the plant propagation materials, as it were, in free fall prevents contamination of the components of the sowing device.

The application device is advantageously embodied as a structurally independent unit and is arranged underneath the separating device in the falling path of the separated plant propagation materials. As a result, the application device can be used on various sowing devices.

The application device advantageously has a sensor shaft which is open at both ends, and the application device is arranged in such a way that the separated plant propagation materials fall through the sensor shaft on their path from the separating device to the underlying surface for seed. This permits the falling plant propagation materials to be decoupled from external influences. For example, plant propagation materials falling within the sensor shaft may be protected from crosswinds or from rain.

At least one sensor for detecting the passage of a seed through the sensor shaft is advantageously arranged on an interior surface of the sensor shaft. The application device may have an application nozzle for the seed dressing, which application nozzle may be configured to apply a defined quantity of seed dressing to a seed which has fallen through the sensor shaft, once the seed is outside the sensor shaft, wherein the application device has a controller which cooperates with the at least one sensor, and which controller brings about the triggering of the application nozzle in accordance with sensor signals generated by the at least one sensor, in order to apply seed dressing to the seed. In this way, precise application of seed dressing to the plant propagation materials is possible.

The sensor may be an optical sensor, for example a CMOS or CCD-type sensor. In some embodiments, the sensor may be an optical sensor provided on one side of the sensor shaft in combination with a light source on the other side of the sensor shaft, thus forming an optical gate to detect when a seed passes between the light source and the optical sensor. In some embodiments, the sensor detects light reflected from a falling seed onto the sensor, for example by detecting a colour change or a change in light intensity.

In some embodiments, at least two sensors for detecting the passage of a seed through the sensor shaft may be arranged one after the other on an interior surface of the sensor shaft, in the falling direction of the plant propagation materials. As a seed falls, it may trigger a first sensor and subsequently a second sensor, thus allowing a rate of fall of the seed to be calculated by the controller. The controller can then calculate, on the basis of the sensor signals of the at least two sensors, a time delay after which it brings about the triggering of the application nozzle so as to target the seed correctly with the seed dressing. In this way, the rate of fall of the plant propagation materials can be taken into account during control of the application of seed dressing to the seed.

In some embodiments, at least one array of sensors may be provided on an interior surface of the sensor shaft. The at least one array may be a one-dimensional array, for example a linear array. The at least one array may be a two-dimensional array. By providing an array of sensors, it is possible to determine a lateral position of a seed within the sensor shaft with reference to a lateral dimension of the array.

The application nozzle is advantageously designed to eject, each time it is triggered, a defined quantity of seed dressing. The seed dressing may be ejected along a spraying trajectory. The spraying trajectory may be essentially linear. The controller may calculate the position of an impact location at which the spraying trajectory and the fall line of the seed to which seed dressing is applied intersect. The controller may calculate the time delay on the basis of the position of the impact location and of the rate of fall of the seed.

The application nozzle may be configured to eject a spray or droplets of seed dressing along the spraying trajectory towards the seed. The spray or droplets may cover the entire surface of the seed, or may cover only part of the surface of the seed. In particular, droplet-shaped application is to be understood as meaning here an application of seed dressing which does not completely surround the seed but rather covers only a relatively small ("punctiform") or relatively large part of the surface of the seed. The seed dressing may be configured such that it adheres as droplets to the seed. In some embodiments, the seed dressing may be chosen to dry relatively quickly and without loss of adhesion to the surface of the seed. In some embodiments, the seed dressing may be chosen so as not to dry before the seed reaches the underlying surface.

The application nozzle may comprise or be made of a corundum material, such as sapphire or ruby. In some embodiments, the application nozzle may comprise or be made of a ceramic material or a hard alloy material. It is preferred that the application nozzle is made of a hard material that is resistant to wear, abrasion and/or erosion. Abrasive particles in the seed dressing can cause unacceptable erosion of nozzles made of conventional softer metal materials.

The application nozzle is advantageously oriented in such a way that its spraying trajectory intersects the fall lines of the plant propagation materials at an acute angle of preferably 30°-60°. As a result, seed dressing can be reliably applied to plant propagation materials which are moving on various fall lines. It will be appreciated that a seed falling from the sensor shaft at a location close to the application nozzle will intersect the spraying trajectory before a seed falling from the sensor shaft at a location remote from the application nozzle. This is because the spraying trajectory is angled downwardly with respect to a horizontal direction across the sensor shaft. Accordingly, when the at least one sensor detects that a seed is falling on a fall line remote from the application nozzle, a time delay needs to be applied when activating the application nozzle so as to compensate for the additional time needed for the seed to reach the intersection between the fall line and the spraying trajectory. Account also needs to be taken of the additional time needed for the spray to reach the seed falling on the fall line remote from the application nozzle.

In some embodiments, a plurality of sensors, which detect the transverse position of the plant propagation materials within the sensor shaft, are advantageously arranged on the sensor shaft, wherein the controller calculates individually the time delay for each seed taking into account the transverse position of the seed. In this way, a sensor shaft with a relatively wide cross section can be used, with the result that the falling movements of the plant propagation materials are not impeded.

The application device advantageously has two or more application nozzles, by means of which two or more seed dressings can be applied to the separated plant propagation materials. In this way, the one or more seed dressings can be applied to the plant propagation materials by means of the same application device, depending on requirements.

In some embodiments, at least one additional sensor may be provided to detect whether or not a particular seed has actually been hit by the spray from the application nozzle. The additional sensor may be an optical sensor, for example a CMOS- or CCD-type sensor. The at least one additional sensor may detect a change in light reflected from the seed due to application of the spray. This may be a change in reflectance or, where the seed dressing has a particular colour (for example, imparted by a dye additive), the additional sensor may detect a colour change in reflected light. Data may be collected giving information as to a proportion of plant propagation materials that have been correctly provided with seed dressing by the applicator nozzle. In some embodiments, feedback control may be provided so as to vary one or more spray parameters, for example one or more of a spray pressure, spray trajectory, spray volume, seed dressing temperature and/or seed dressing viscosity, in response to detecting that an insufficient proportion of plant propagation materials have been correctly provided with seed dressing by the applicator nozzle.

In some embodiments, the sensor shaft may be omitted. Instead of falling down a sensor shaft as described above, plant propagation materials may be dispensed from the reservoir container directly to the underlying surface. Alternatively, the plant propagation materials may be extracted from reservoir container by mechanical or other means, for example a conveyor or a brush belt, before being allowed to fall freely to the underlying surface. In these embodiments, the at least one sensor is positioned and the reservoir container configured such that the plant propagation materials fall from the reservoir container along fall lines that traverse or pass the at least one sensor, allowing falling plant propagation materials to be detected as described above. The at least one application nozzle applies seed dressing to individual plant propagation materials as they fall freely from the reservoir container, and the at least one application nozzle is activated and controlled on the basis on signals from the at least one sensor. As before, an important advantage is that the seed dressing is directed towards the plant propagation materials while in free fall, thereby reducing contamination of fixed or other machinery surfaces with seed dressing.

In some embodiments, geolocation data may be collected while the plant propagation materials are being sown, thus enabling a map to be generated of the underlying surface (for example, a field) including data relating to spray parameters and/or composition of the seed dressing. Geolocation data may be collected by way of a global navigation satellite system such as GPS, GLONASS, Galileo or similar.

The controller may include a computer-readable storage medium comprising instructions which, when executed by a computer, cause the computer to carry out various of the steps described above. In particular, but not exclusively, the controller may be programmed to perform one or more of: processing signals from the at least one sensor, triggering the application device, calculating the delay time, calculating the rate of fall of a seed, determining a position of a seed, determining whether or not a seed has been correctly applied with seed dressing, determining geolocation data, and adjusting parameters of the application of seed dressing from the application device.

The term "plant propagation material" herein may refer to any seed, seedling, tuber, stem cutting or otherwise useful material for growing and propagating plants or crops that can be planted using the seed drill according to the invention.

The term "seeds" herein may be granular seeds, pelleted granular seeds, dummy seeds or combinations thereof. Advantageously, "dummy seeds", i.e. particles that are not plant propagation materials may be sown and treated alongside the actual seeds. Such "dummy seeds" may be useful in e.g. spacing apart smaller seeds or may be specifically sowed to carry phytotoxic dressing in e.g. rows parallel and spaced apart from rows of seeds, or fertilizers and growth enhancers to improve the soil quality.

Yet further, where plant propagation materials are employed that are very small, or irregular in shape and weight, these may be difficult to sow in regular distribution with a single seedling per cell, and with a straight row. Accordingly, there may be a number of erroneously planted seeds, and hence some cells will have more than one seed, while others, none. With high seed costs and largely for automated harvesting, it is not desirable simply place multiple seeds per cell, and then remove them to allow only a single plant in due time. Applicants have found that beneficially, seeds or propagation materials in general may then be put through a process called "pelleting", wherein preferably an inert material is coated onto the seeds, thereby forming a more regular and uniform shape and size, e.g. wherein tiny *Petunia* seeds are pelleted to an identical size and shape as lettuce seeds. The thus pelleted seeds have several benefits, are several, including easier use of standardized equipment, a more regular spread of the seeds, and a higher rate of selective coating with the dressing composition. This in turn may reduce the need for thinning of fields, and easier automation in greenhouse applications seed starting. Preferably, the pelleting material used on the seeds is selected to absorb water quickly, ensuring the uniform moisture around the seeds, and thereby increasing germination rates.

The term "seed" herein preferably relates to a seed of a crop or plant species including but not limited to corn (*Zea mays*), *Brassica* sp. (e.g., *B. napus, B. rapa. B. juncea*), alfalfa (*Medicago sativa*), rice (*Oryza sativa*), rye (*Secale cereale*), sorghum (*Sorghum bicolor, Sorghum vulgare*), millet (e.g., pearl millet (*Pennisetum glaucum*), proso millet (*Panicum miliaceum*), foxtail millet (*Setaria italica*), finger millet (*Eleusine coracana*)), sunflower (*Helianthus annuus*), safflower (*Carthamus tinctorius*), wheat (*Triticum aestivum*), soybean (*Glycine max*), tobacco (*Nicotiana tabacum*), potato (*Solanum tuberosum*), peanuts (*Arachis hypogaea*), cotton (*Gossypium barbadense, Gossypium hirsutum*), sweet potato (*Ipomoea batatus*), cassava (*Manihot esculenta*), coffee (*Cofea* spp.), coconut (*Cocos nucifera*), pineapple (*Ananas comosus*), citrus trees (*Citrus* spp.), cocoa (*Theobroma cacao*), tea (*Camellia sinensis*), banana (*Musa* spp.), avocado (*Persea americana*), fig (*Ficus casica*), guava (*Psidium guajava*), mango (*Mangifera indica*), olive (*Olea europaea*), papaya (*Carica papaya*), cashew (*Anacardium occidental*), macadamia (*Macadamia integrifolia*), almond (*Prunus amygdalus*), sugar beets (*Beta vulgaris*), sugarcane (*Saccharum* spp.), oats, barley, vegetables, ornamentals, woody plants such as conifers and deciduous trees, squash, pumpkin, hemp, zucchini, apple, pear, quince, melon, plum, cherry, peach, nectarine, apricot, strawberry, grape, raspberry, blackberry, soybean, sorghum, sugarcane, rapeseed, clover, carrot, and *Arabidopsis thaliana*.

In a preferred embodiment, the seed may be of any vegetables species including but not limited to tomatoes (*Lycopersicon esculentum*), lettuce (e.g., *Lactuca sativa*), green beans (*Phaseolus vulgaris*), lima beans (*Phaseolus limensis*), peas (*Lathyrus* spp.), cauliflower, broccoli, turnip, radish, spinach, asparagus, onion, garlic, pepper, celery, and members of the genus *Cucumis* such as cucumber (*C. sativus*), cantaloupe (*C. cantalupensis*), and musk melon (*C. melo*).

In another preferred embodiment, the plant propagation material may be of any ornamental species including but not limited to hydrangea (*Macrophylla hydrangea*), hibiscus (*Hibiscus rosasanensis*), petunias (*Petunia hybrida*), roses (*Rosa* spp.), azalea (*Rhododendron* spp.), tulips (*Tulipa* spp.), daffodils (*Narcissus* spp.), carnation (*Dianthus caryophyllus*), poinsettia (*Euphorbia pulcherrima*), and chrysanthemum.

In one embodiment, the plant propagation material may be of any conifer species including but not limited to conifers pines such as loblolly pine (*Pinus taeda*), slash pine (*Pinus elliotii*), ponderosa pine (*Pinus ponderosa*), lodgepole pine (*Pinus contorta*), and Monterey pine (*Pinus radiata*), Douglas-fir (*Pseudotsuga menziesii*); Western hemlock (*Tsuga canadensis*); Sitka spruce (*Picea glauca*); redwood (*Sequoia sempervirens*); true firs such as silver fir (*Abies amabilis*) and balsam fir (*Abies balsamea*); and cedars such as Western red cedar (*Thuja plicata*) and Alaska yellow-cedar (*Chamaecyparis nootkatensis*).

In another preferred embodiment, the seed may be of any leguminous plant species including but not limited beans and peas. Beans include guar, locust bean, fenugreek, soybean, garden beans, cowpea, mungbean, lima bean, fava bean, lentils, chickpea, pea, moth bean, broad bean, kidney bean, lentil, dry bean, etc. Legumes include, but are not limited to, *Arachis*, e.g., peanuts, *Vicia*, e.g., crown vetch, hairy vetch, adzuki bean, mung bean, and chickpea, *Lupinus*, e.g., lupine, *trifolium, Phaseolus*, e.g., common bean and lima bean, *Pisum*, e.g., field bean, *Melilotus*, e.g., clover, *Medicago*, e.g., alfalfa, *Lotus*, e.g., trefoil, lens, e.g., lentil, and false indigo. Typical forage and turf grass for use in the methods described herein include but are not limited to alfalfa, orchard grass, tall fescue, perennial ryegrass, creeping bent grass, lucerne, birdsfoot trefoil, clover, stylosanthes species, *Lotononis bainessii*, sainfoin and redtop. Other grass species include barley, wheat, oat, rye, orchard grass, guinea grass, sorghum or turf grass plant.

In another preferred embodiment, the seed may be selected from the following crops or vegetables: corn, wheat, sorghum, soybean, tomato, cauliflower, radish, cabbage, canola, lettuce, rye grass, grass, rice, cotton, sunflower, sorghum, teff, cotton, rice, soybean, sugar-beet, sugarcane, tobacco, barley, and oilseed rape crop plants.

It is understood that the term "seed" or "seedling" is not limited to a specific or particular type of species or seed. The term "seed" or "seedling" can refer to seed from a single plant species, a mixture of seed from multiple plant species, or a seed blend from various strains within a plant species. In a preferred embodiment, crop plant propagation materials may include but are not limited to rice, corn, wheat, barley, oats, soybean, cotton, sunflower, alfalfa, sorghum, rapeseed, sugarbeet, tomato, bean, carrot, tobacco or flower seeds.

Where used, references in brackets behind the active ingredients, e.g. [3878-19-1] refer to the Chemical Abstracts Registry number. The above described mixing partners are known. Where the active ingredients are included in "The Pesticide Manual", The Pesticide Manual—A World Compendium; Thirteenth Edition; Editor: C. D. S. TomLin; The British Crop Protection Council, they are described therein under the entry number given in round brackets hereinabove for the particular compound; for example, the compound "abamectin" is described under entry number (1). Where "[CCN]" is added hereinabove to the particular compound, the compound in question is included in the "Compendium of Pesticide Common Names", which is accessible on the internet, see A. Wood; Compendium of Pesticide Common Names, Copyright © 1995-2004.

Most of the active ingredients described below are referred to hereinabove by a so-called "common name", the relevant "ISO common name" or another "common name" being used in individual cases. If the designation is not a "common name", the nature of the designation used instead is given in round brackets for the particular compound; in that case, the IUPAC name, the IUPAC/Chemical Abstracts name, a "chemical name", a "traditional name", a "compound name" or a "development code" is used or, if neither one of those designations nor a "common name" is used, an "alternative name" is employed. "CAS Reg. No" means the Chemical Abstracts Registry Number.

As used herein, the term "dressing composition" herein relates to liquid compositions useful for covering and/or wetting a seed or plant material at least in part. Such compositions comprise at least one agricultural compound, and a diluent, solvent or otherwise carrier permitting an application. This "dressing composition", also referred to herein as "dressing" or "seed dressing", relates to a substance formulation which is a liquid or a gel, and of such a and which contains active agricultural compounds, and additionally may also contain other components, such as fillers, diluents, solvents, adhesive agents, dispersants, stabilizers, emulsifiers and colouring agents. In some embodiments, the dressing may be an adhesive powder. In the following description, all the positional information and directional information, such as e.g. top, bottom, above, below, upwards, downwards, vertical, horizontal, etc. relate to the upright position of the sowing device according to the invention as illustrated in the figures and corresponding to their practical use.

As used herein, the term an "underlying surface" is understood to be an agricultural soil or other solid medium onto which the plant propagation material, such as seeds and seedlings, are applied.

The term "plant propagation material" herein may refer to any seed, seedling, tuber, stem cutting or otherwise useful material for growing and propagating plants or crops. Many plant species, such as several fruits and ornamental plant species, are commonly reproduced by vegetative propagation (or "clonal propagation" or "vegetative reproduction"). Preferably it may refer to seeds, which are usually composed of individual plant propagation materials.

The term "seeds" herein may be granular seeds, pelleted granular seeds, dummy seeds or combinations thereof.

Advantageously, "dummy seeds", i.e. particles that are not plant propagation materials may be sown and treated alongside the actual seeds. Such "dummy seeds" may be useful in e.g. spacing apart smaller seeds or may be specifically sowed to carry phytotoxic dressing in e.g. rows parallel and spaced apart from rows of seeds, or fertilizers and growth enhancers to improve the soil quality. Yet further, where plant propagation materials are employed that are very small, or irregular in shape and weight, these may be difficult to sow in regular distribution with a single seedling per cell, and with a straight row. Accordingly, there may be a number of erroneously planted seeds, and hence some cells will have more than one seed, while others, none. With high seed costs and largely for automated harvesting, it is not desirable simply place multiple seeds per cell, and then remove them to allow only a single plant in due time. Applicants have found that beneficially, seeds or propagation materials in general may then be put through a process called "pelleting", wherein preferably an inert material is coated onto the seeds, thereby forming a more regular and uniform shape and size, e.g. wherein tiny *Petunia* seeds are pelleted to an identical size and shape as lettuce seeds. The thus pelleted seeds have several benefits, are several, including easier use of standardized equipment, a more regular spread of the seeds, and a higher rate of selective coating with the dressing composition. This in turn may reduce the need for thinning of fields, and easier automation in greenhouse applications seed starting. Preferably, the pelleting material used on the seeds is selected to absorb water quickly, ensuring the uniform moisture around the seeds, and thereby increasing germination rates.

The term "seed" herein preferably relates to a seed of a crop or plant species including but not limited to corn (*Zea mays*), *Brassica* sp. (e.g., *B. napus, B. rapa. B. juncea*), alfalfa (*Medicago sativa*), rice (*Oryza sativa*), rye (*Secale cereale*), sorghum (*Sorghum bicolor, Sorghum vulgare*), millet (e.g., pearl millet (*Pennisetum glaucum*), proso millet (*Panicum miliaceum*), foxtail millet (*Setaria italica*), finger millet (*Eleusine coracana*)), sunflower (*Helianthus annuus*), safflower (*Carthamus tinctorius*), wheat (*Triticum aestivum*), soybean (*Glycine max*), tobacco (*Nicotiana tabacum*), potato (*Solanum tuberosum*), peanuts (*Arachis hypogaea*), cotton (*Gossypium barbadense, Gossypium hirsutum*), sweet potato (*Ipomoea batatus*), cassava (*Manihot esculenta*), coffee (*Cofea* spp.), coconut (*Cocos nucifera*), pineapple (*Ananas comosus*), citrus trees (*Citrus* spp.), cocoa (*Theobroma cacao*), tea (*Camellia sinensis*), banana (*Musa* spp.), avocado (*Persea americana*), fig (*Ficus casica*), guava (*Psidium guajava*), mango (*Mangifera indica*), olive (*Olea europaea*), papaya (*Carica papaya*), cashew (*Anacardium occidental*), macadamia (*Macadamia integrifolia*), almond (*Prunus amygdalus*), sugar beets (*Beta vulgaris*), sugarcane (*Saccharum* spp.), oats, barley, vegetables, ornamentals, woody plants such as conifers and deciduous trees, squash, pumpkin, hemp, zucchini, apple, pear, quince, melon, plum, cherry, peach, nectarine, apricot, strawberry, grape, raspberry, blackberry, soybean, sorghum, sugarcane, rapeseed, clover, carrot, and *Arabidopsis thaliana*.

In a preferred embodiment, the seed may be of any vegetables species including but not limited to tomatoes (*Lycopersicon esculentum*), lettuce (e.g., *Lactuca sativa*), green beans (*Phaseolus vulgaris*), lima beans (*Phaseolus limensis*), peas (*Lathyrus* spp.), cauliflower, broccoli, turnip, radish, spinach, asparagus, onion, garlic, pepper, celery, and members of the genus *Cucumis* such as cucumber (*C. sativus*), cantaloupe (*C. cantalupensis*), and musk melon (*C. melo*).

In another preferred embodiment, the plant propagation material may be of any ornamental species including but not limited to hydrangea (*Macrophylla hydrangea*), hibiscus (*Hibiscus rosasanensis*), petunias (*Petunia hybrida*), roses (*Rosa* spp.), azalea (*Rhododendron* spp.), tulips (*Tulipa* spp.), daffodils (*Narcissus* spp.), carnation (*Dianthus caryophyllus*), poinsettia (*Euphorbia pulcherrima*), and chrysanthemum.

In one embodiment, the plant propagation material may be of any conifer species including but not limited to conifers pines such as loblolly pine (*Pinus taeda*), slash pine (*Pinus elliotii*), ponderosa pine (*Pinus ponderosa*), lodgepole pine (*Pinus contorta*), and Monterey pine (*Pinus radiata*), Douglas-fir (*Pseudotsuga menziesii*); Western hemlock (*Tsuga canadensis*); Sitka spruce (*Picea glauca*); redwood (*Sequoia sempervirens*); true firs such as silver fir (*Abies amabilis*) and balsam fir (*Abies balsamea*); and cedars such as Western red cedar (*Thuja plicata*) and Alaska yellow-cedar (*Chamaecyparis nootkatensis*).

In another preferred embodiment, the seed may be of any leguminous plant species including but not limited beans and peas. Beans include guar, locust bean, fenugreek, soybean, garden beans, cowpea, mungbean, lima bean, fava bean, lentils, chickpea, pea, moth bean, broad bean, kidney bean, lentil, dry bean, etc. Legumes include, but are not limited to, *Arachis*, e.g., peanuts, *Vicia*, e.g., crown vetch, hairy vetch, adzuki bean, mung bean, and chickpea, *Lupinus*, e.g., lupine, *trifolium, Phaseolus*, e.g., common bean and lima bean, *Pisum*, e.g., field bean, *Melilotus*, e.g., clover, *Medicago*, e.g., alfalfa, *Lotus*, e.g., trefoil, lens, e.g., lentil, and false indigo. Typical forage and turf grass for use in the methods described herein include but are not limited to alfalfa, orchard grass, tall fescue, perennial ryegrass, creeping bent grass, lucerne, birdsfoot trefoil, clover, stylosanthes species, *Lotononis bainessii*, sainfoin and redtop. Other grass species include barley, wheat, oat, rye, orchard grass, guinea grass, sorghum or turf grass plant.

In another preferred embodiment, the seed may be selected from the following crops or vegetables: corn, wheat, sorghum, soybean, tomato, cauliflower, radish, cabbage, canola, lettuce, rye grass, grass, rice, cotton, sunflower and the like.

It is understood that the term "seed" or "seedling" is not limited to a specific or particular type of species or seed. The term "seed" or "seedling" can refer to seed from a single plant species, a mixture of seed from multiple plant species, or a seed blend from various strains within a plant species.

In another preferred embodiment, crop plant propagation materials may include but are not limited to rice, corn, wheat, barley, oats, soybean, cotton, sunflower, alfalfa, sorghum, rapeseed, sugarbeet, tomato, bean, carrot, tobacco or flower seeds.

Vegetative propagation is the ability of plants to reproduce without sexual reproduction, by producing new, genetically identical, plants from existing vegetative structures. The most common method of artificial vegetative propagation involves removal of parts (commonly referred to as "cuttings") from the parent plant and placed in a suitable environment where they can grow into a whole new plant. Cutting takes advantage of the ability of plants to form adventitious roots under certain conditions, and the resulting plant is a clone of the parent plant. By plant "parts" is intended all above ground vegetative parts of crop plants such as primary or secondary shoots, leaf, stems, branches, and the like. The methods are useful for any portion of the plant from which adventitious roots can form in the cultivation medium. In some embodiments, the plant part or cutting is a shoot. The shoot can be at least about 1 cm, at least about 2 cm, at least about 3 cm, at least about 5 cm, or larger. The present invention also relates to describes methods for clonally propagating agricultural crop plants, particularly maize, sorghum, wheat, cotton, rice, soybean, sugar-beet, sugarcane, tobacco, barley, and oilseed rape crop plants. In a preferred embodiment, the plants may be clonally propagated in a purely soil based system. In such a system, the root system of the plants must remain in a sufficiently aqueous environment in order to survive and grow roots. Methods useful for the preparation of plant propagation materials may further preferably comprise removing a part (or "cutting") from a crop plant, such as a primary or secondary shoot or stem, and placing it in a suitable medium sufficient to support the development of one or more roots in the medium. The new plant can then be grown under suitable conditions into a mature plant. Where such cuttings or seedlings are employed, often these are allowed to fall into indentations in the soil prepared prior to the seeding or planting. Seeds on the other hand are usually allowed to fall into furrows, trenches or otherwise prepared plant receiving cavities, which are then usually closed up after sowing to prevent loss of the seeds due to e.g. wind or animals.

The liquid seed dressing composition used in the present invention may comprise a liquid diluent material and one or more agricultural compounds. The activity of compositions comprising agricultural compounds according to the invention may be adapted to prevailing circumstances, by including other active substances.

As used herein, the term "agricultural compound" herein relates to compounds such as those fungicidal, insecticidal and/or growth-promoting effects, i.e. compounds and substances known to assist the growth of crops, comprising chemical or biological substances including but not limited to micronutrients, insecticides, for protecting against sucking and eating insects; fungicides for protecting against fungal pathogens; inoculants, antibacterials, herbicides; safeners; immune-response-triggering compounds; biologicals, biosimilars, gene modulating seed dressings; growth regulators; and crop enhancers that offer specific, chemically induced, physiological responses of plants that increase and/or improve yields, in particular under abiotic stress; as well as diluents, solvents, carriers, emulsifiers, viscosity modifiers, stabilizers, encapsulants and/or any colorants, and any combinations thereof. Preferred micronutrients include Zinc, Molybdenum, Manganese, Magnesium, Boron, Copper, Iron, Nickel, and Chlorine.

The dressing composition may be applied at application stage, which herein relates to the viscosity and concentration that allows application as a fluid to a plant propagation material.

The agricultural components may be stored in one or more reservoir, e.g. in cartridges or canisters, as final compositions ready for us, also referred to herein as a "tank mix"; or as a concentrate, further referred to as "pre-mix", which requires a diluent or carrier for formation of the tank mix composition. As used herein, the term "herbicide," means and includes an active material that kills, controls, or otherwise adversely affects the growth of weeds, and more generally, undesirable plants.

As used herein, the term "insecticide," means and includes an active material that kills, regulates, or otherwise adversely affects the growth of insects. Exemplary bactericides include chlortetracycline, oxytetracycline, streptomycin.

As used herein, the term "pesticide," means and includes an active material or substance that kills, regulates, or otherwise adversely affects the growth of pests (e.g., insects, mites, ticks, nematodes, bacteria, fungi, diseases, and plants).

As used herein, the term "fungicide," means and includes an active material or substance that kills, controls, or otherwise adversely affects the growth of fungi or fungal spores.

Preferred agricultural compounds include those of chemical or biological in type, and in the case of biological could be further modified from the biological species derived in nature. Active substances include substances that control, repel or attract pests that damage or harm useful plants in general, but also substances that improve the growth of a useful plant, such as plant growth regulators, and substances that improve the performance of the active substance, such as synergists. Examples are insecticides, acaricides, nematicides, molluscicides, aligicides, virusicides, rodenticide, bactericides, fungicides, chemosterilants, anthelmintics. Examples of a biological active substance include baculovirus, plant extract, and bacteria, advantageously combined with other substances which may also have further surprising advantages which can also be described, in a wider sense, as synergistic activity. Examples of synergistic activity include better tolerance by plants, reduced phytotoxicity, insects can be controlled in their different development stages, or better behaviour relating to production, for example grinding or mixing, storage or use. By way of non-limiting example, if used, the at least one additional pesticide employed in the seed dressing compositions may be at least one of an insecticide, an acaricide (e.g., miticide, ixodicide, scabicide, archnicide, etc.), a nematocide, a bactericide, a biocide, an anthropodicide, a molluscide, a fungicide, and a herbicide.

Preferred agricultural compounds include, but are not limited to the following compounds: a compound selected from the group of substances consisting of petroleum oils, 1,1-bis(4-chloro-phenyl)-2-ethoxyethanol, 2,4-dichlorophenyl benzenesulfonate, 2-fluoro-N-methyl-N-1-naphthylacetamide, 4-chlorophenyl phenyl sulfone, acetoprole, aldoxycarb, amidithion, amidothioate, amiton, amiton hydrogen oxalate, amitraz, aramite, arsenous oxide, azobenzene, azothoate, benomyl, benoxafos, benzyl benzoate, bixafen, brofenvalerate, bromocyclen, bromophos, bromopropylate, buprofezin, butocarboxim, butoxycarboxim, butylpyridaben, calcium polysulfide, camphechlor, carbanolate, carbophenothion, cyclobutrifluram, cymiazole, chino-methionat, chlorbenside, chlordimeform, chlordimeform hydrochloride, chlorfenethol, chlorfenson, chlorfensulfide, chlorobenzilate, chloromebuform, chloromethiuron, chloropropylate, chlorthiophos, cinerin I, cinerin II, cinerins, closantel, coumaphos, crotamiton, crotoxyphos, cufraneb, cyanthoate, DCPM, DDT, demephion, demephion-O, demephion-S, demeton-methyl, demeton-O, demeton-O-methyl, demeton-S, demeton-S-methyl, demeton-S-methylsulfon, dichlofluanid, dichlorvos, dicliphos, dienochlor, dimefox, dinex, dinex-diclexine, dinocap-4, dinocap-6, dinocton, dinopenton, dinosulfon, dinoterbon, dioxathion, diphenyl sulfone, disulfiram, DNOC, dofenapyn, doramectin, endothion, eprinomectin, ethoate-methyl, etrimfos, fenazaflor, fenbutatin oxide, fenothiocarb, fenpyrad, fenpyroximate, fenpyrazamine, fenson, fentrifanil, flubenzimine, flucycloxuron, fluenetil, fluorbenside, flupentiofenox, FMC 1137, formetanate, formetanate hydrochloride, formparanate, gamma-HCH, glyodin, halfenprox, hexadecyl cyclopropanecarboxylate, isocarbophos, jasmolin I, jasmolin II, jodfenphos, lindane, malonoben, mecarbam, mephosfolan, mesulfen, methacrifos, methyl bromide, metolcarb, mexacarbate, milbemycin oxime, mipafox, monocrotophos, morphothion, moxidectin, naled, 4-chloro-2-(2-chloro-2-methyl-propyl)-5-[(6-iodo-3-pyridyl)methoxy]pyridazin-3-one, nifluridide, nikkomycins, nitrilacarb, nitrilacarb 1:1 zinc chloride complex, omethoate, oxazosulfyl, oxydeprofos, oxydisulfoton, pp'-DDT, parathion, permethrin, phenkapton, phosalone, phosfolan, phosphamidon, polychloroterpenes, polynactins, proclonol, promacyl, propoxur, prothidathion, prothoate, pyrethrin I, pyrethrin II, pyrethrins, pyridaphenthion, pyrimitate, quinalphos, quintiofos, R-1492, phosglycin, rotenone, schradan, sebufos, selamectin, sophamide, SSI-121, sulfiram, sulfluramid, sulfotep, sulfur, diflovidazin, tau-fluvalinate, TEPP, terbam, tetradifon, tetrasul, thiafenox, thiocarboxime, thiofanox, thiometon, thioquinox, thuringiensin, triamiphos, triarathene, triazophos, triazuron, trifenofos, trinactin, vamidothion, vaniliprole, bethoxazin, copper dioctanoate, copper sulfate, cybutryne, dichlone, dichlorophen, endothal, fentin, hydrated lime, nabam, quinoclamine, quinonamid, simazine, triphenyltin acetate, triphenyltin hydroxide, crufomate, piperazine, thiophanate, chloralose, fenthion, pyridin-4-amine, strychnine, 1-hydroxy-1H-pyridine-2-thione, 4-(quinoxalin-2-ylamino)benzenesulfonamide, 8-hydroxyquinoline sulfate, bronopol, copper hydroxide, cresol, dipyrithione, dodicin, fenaminosulf, formaldehyde, hydrargaphen, kasugamycin, kasugamycin hydrochloride hydrate, nickel bis(dimethyldithiocarbamate), nitrapyrin, octhilinone, oxolinic acid, oxytetracycline, potassium hydroxyquinoline sulfate, probenazole, streptomycin, streptomycin sesquisulfate, tecloftalam, thiomersal, *Adoxophyes orana* GV, *Agrobacterium radiobacter, Amblyseius* spp., *Anagrapha falcifera* NPV, *Anagrus atomus, Aphelinus abdominalis, Aphidius colemani, Aphidoletes aphidimyza, Autographa californica* NPV, *Bacillus sphaericus* Neide, *Beauveria brongniartii, Chrysoperla carnea, Cryptolaemus montrouzieri, Cydia pomonella* GV, *Dacnusa sibirica, Diglyphus isaea, Encarsia formosa, Eretmocerus eremicus, Heterorhabditis bacteriophora* and *H. megidis, Hippodamia convergens, Leptomastix dactylopii, Macrolophus caliginosus, Mamestra brassicae* NPV, *Metaphycus helvolus, Metarhizium anisopliae* var. *acridum, Metarhizium anisopliae* var. *anisopliae, Neodiprion sertifer* NPV and *N. lecontei* NPV, *Orius* spp., *Paecilomyces fumosoroseus, Phytoseiulus persimilis, Steinernema bibionis, Steinernema carpocapsae, Steinernema feltiae, Steinernema glaseri, Steinernema riobrave, Steinernema riobravis, Steinernema scapterisci, Steinernema* spp., *Trichogramma* spp., *Typhlodromus occidentalis, Verticillium lecanii*, apholate, bisazir, busulfan, dimatif, hemel, hempa, metepa, methiotepa, methyl apholate, morzid, penfluron, tepa, thiohempa, thiotepa, tretamine, uredepa, (E)-dec-5-en-1-yl acetate with (E)-dec-5-en-1-ol, (E)-tridec-4-en-1-yl acetate, (E)-6-methylhept-2-en-4-ol, (E,Z)-tetradeca-4,10-dien-1-yl acetate, (Z)-dodec-7-en-1-yl acetate, (Z)-hexadec-11-enal, (Z)-hexadec-11-en-1-yl acetate, (Z)-hexadec-13-en-11-yn-1-yl acetate, (Z)-icos-13-en-10-one, (Z)-tetradec-7-en-1-al, (Z)-tetradec-9-en-1-ol, (Z)-tetradec-9-en-1-yl acetate, (7E,9Z)-dodeca-7,9-dien-1-yl acetate, (9Z,11E)-tetradeca-9,11-dien-1-yl acetate, (9Z,12E)-tetradeca-9,12-dien-1-yl acetate, 14-methyloctadec-1-ene, 4-methylnonan-5-ol with 4-methylnonan-5-one, alpha-multistriatin, brevicomin, codlelure, codlemone, cuelure, disparlure, dodec-8-en-1-yl acetate, dodec-9-en-1-yl acetate, dodeca-8, 10-dien-1-yl acetate, dominicalure, ethyl 4-methyloctanoate, eugenol, frontalin, grandlure, grandlure I, grandlure II, grandlure III, grandlure IV, hexalure, ipsdienol, ipsenol, japonilure, lineatin, litlure, looplure, medlure, megatomoic acid, methyl eugenol, muscalure, octadeca-2,13-dien-1-yl acetate, octadeca-3,13-dien-1-yl acetate, orfralure, oryctalure, ostramone, siglure, sordidin, sulcatol, tetradec-11-en-1-yl acetate, trimedlure, trimedlure A, trimedlure $B_1$, trimedlure $B_2$, trimedlure C, trunc-call, 2-(octylthio)ethanol, butopyronoxyl, butoxy(polypropylene glycol), dibutyl adipate, dibutyl phthalate, dibutyl succinate, diethyltoluamide, dimethyl carbate, dimethyl phthalate, ethyl hexanediol, hexamide, methoquin-butyl, methylneodecanamide, oxamate, picaridin, 1-dichloro-1-nitroethane, 1,1-dichloro-2,2-bis(4-ethylphenyl)ethane, 1,2-dichloropropane with 1,3-dichloropropene, 1-bromo-2-chloroethane, 2,2,2-trichloro-1-(3,4-dichlorophenyl)ethyl acetate, 2,2-dichlorovinyl 2-ethylsulfinylethyl methyl phosphate, 2-(1,3-dithiolan-2-yl)phenyl dimethylcarbamate, 2-(2-butoxyethoxy)ethyl thiocyanate, 2-(4,5-dimethyl-1,3-dioxolan-2-yl)phenyl methylcarbamate, 2-(4-chloro-3,5-xylyloxy) ethanol, 2-chlorovinyl diethyl phosphate, 2-imidazolidone, 2-isovalerylindan-1,3-dione, 2-methyl(prop-2-ynyl)aminophenyl methylcarbamate, 2-thiocyanatoethyl laurate, 3-bromo-1-chloroprop-1-ene, 3-methyl-1-phenylpyrazol-5-yl dimethylcarbamate, 4-methyl(prop-2-ynyl)amino-3,5-xylyl methylcarbamate, 5,5-dimethyl-3-oxocyclohex-1-enyl dimethylcarbamate, acethion, acrylonitrile, aldrin, allosamidin, allyxycarb, alpha-ecdysone, aluminium phosphide, aminocarb, anabasine, athidathion, azamethiphos, *Bacillus thuringiensis* delta endotoxins, barium hexafluorosilicate, barium polysulfide, barthrin, Bayer 22/190, Bayer 22408, beta-cyfluthrin, beta-cypermethrin, bioethanomethrin, biopermethrin, bis(2-chloroethyl) ether, borax, bromfenvinfos, bromo-DDT, bufencarb, butacarb, butathiofos, butonate, calcium arsenate, calcium cyanide, carbon disulfide, carbon tetrachloride, cartap hydrochloride, cevadine, chlorbicyclen, chlordane, chlordecone, chloroform, chloropicrin, chlorphoxim, chlorprazophos, cis-resmethrin, cismethrin, clocythrin, copper acetoarsenite, copper arsenate, copper oleate, coumithoate, cryolite, CS 708, cyanofenphos, cyanophos, cyclethrin, cythioate, d-tetramethrin, DAEP, dazomet, decarbofuran, diamidafos, dicapthon, dichlofenthion, dicresyl, dicyclanil, dieldrin, diethyl 5-methylpyrazol-3-yl phosphate, dilor, dimefluthrin, dimetan, dimethrin, dimethylvinphos, dimetilan, dinoprop, dinosam, dinoseb, diofenolan, dioxabenzofos, dithicrofos, DSP, ecdysterone, EI 1642, EMPC, EPBP, etaphos, ethiofencarb, ethyl formate, ethylene dibromide, ethylene dichloride, ethylene oxide, EXD, fenchlorphos, fenethacarb, fenitrothion, fenoxacrim, fenpirithrin, fensulfothion, fenthion-ethyl, flucofuron, fosmethilan, fospirate, fosthietan, furathiocarb, furethrin, guazatine, guazatine acetates, sodium tetrathiocarbonate, halfenprox, HCH, HEOD, heptachlor, heterophos, HHDN, hydrogen cyanide, hyquincarb, IPSP, isazofos, isobenzan, isodrin, isofenphos, isolane, isoprothiolane, isoxathion, juvenile hormone I, juvenile hormone II, juvenile hormone III, kelevan, kinoprene, lead arsenate, leptophos, lirimfos, lythidathion, m-cumenyl methylcarbamate, magnesium phosphide, mazidox, mecarphon, menazon, mercurous chloride, mesulfenfos, metam, metam-potassium, metam-sodium, methanesulfonyl fluoride, methocrotophos, methoprene, methothrin, methoxychlor, methyl isothiocyanate, methylchloroform, methylene chloride, metoxadiazone, mirex, naftalofos, naphthalene, NC-170, nicotine, nicotine sulfate, nithiazine, nornicotine, O-5-dichloro-4-iodophenyl O-ethyl ethylphosphonothioate, O,O-diethyl O-4-methyl-2-oxo-2H-chromen-7-yl phosphorothioate, O,O-diethyl O-6-methyl-2-propylpyrimidin-4-yl phosphorothioate, O,O,O', O'-tetrapropyl dithiopyrophosphate, oleic acid, para-dichlorobenzene, parathion-methyl, pentachlorophenol, pentachlorophenyl laurate, PH 60-38, phenkapton, phosnichlor, phosphine, phoxim-methyl, pirimetaphos, polychlorodicyclopentadiene isomers, potassium arsenite, potassium thiocyanate, precocene I, precocene II, precocene III, primidophos, profluthrin, promecarb, prothiofos, pyrazophos, pyresmethrin, quassia, quinalphos-methyl, quinothion, rafoxanide, resmethrin, rotenone, kadethrin, ryania, ryanodine, sabadilla), schradan, sebufos, SI-0009, thiapronil, sodium arsenite, sodium cyanide, sodium fluoride, sodium hexafluorosilicate, sodium pentachlorophenoxide, sodium selenate, sodium thiocyanate, sulcofuron, sulcofuron-sodium, sulfuryl fluoride, sulprofos, tar oils, tazimcarb, TDE, tebupirimfos, temephos, terallethrin, tetrachloroethane, thicrofos, thiocyclam, thiocyclam hydrogen oxalate, thionazin, thiosultap, thiosultap-sodium, tralomethrin, transpermethrin, triazamate, trichlormetaphos-3, trichloronat, trimethacarb, tolprocarb, triclopyricarb, triprene, veratridine, veratrine, XMC, zetamethrin, zinc phosphide, zolaprofos, and meperfluthrin, tetramethylfluthrin, bis (tributyltin) oxide, bromoacetamide, ferric phosphate, niclosamide-olamine, tributyltin oxide, pyrimorph, trifenmorph, 1,2-dibromo-3-chloropropane, 1,3-dichloropropene, 3,4-dichloro-tetrahydrothiophene 1,1-dioxide, 3-(4-chlorophenyl)-5-methylrhodanine, 5-methyl-6-thioxo-1,3,5-thiadiazinan-3-ylacetic acid, 6-isopentenylaminopurine, benclothiaz, cytokinins, DCIP, furfural, isamidofos, kinetin, *Myrothecium verrucaria* composition, tetrachlorothiophene, xylenols, zeatin, potassium ethylxanthate, acibenzolar, acibenzolar-S-methyl, *Reynoutria sachalinensis* extract, alpha-chlorohydrin, antu, barium carbonate, bisthiosemi, brodifacoum, bromadiolone, bromethalin, chlorophacinone, cholecalciferol, coumachlor, coumafuryl, coumatetralyl, crimidine, difenacoum, difethialone, diphacinone, ergocalciferol, flocoumafen, fluoroacetamide, flupropadine, flupropadine hydrochloride, norbormide, phosacetim, phosphorus, pindone, pyrinuron, scilliroside, sodium fluoroacetate, thallium sulfate, warfarin, 2-(2-butoxyethoxy)ethyl piperonylate, 5-(1,3-benzodioxol-5-yl)-3-hexylcyclohex-2-enone, farnesol with nerolidol, verbutin, MGK 264, piperonyl butoxide, piprotal, propyl isomer, S421, sesamex, sesamolin, sulfoxide, anthraquinone, copper naphthenate, copper oxychloride, dicyclopentadiene, thiram, zinc naphthenate, ziram, imanin, ribavirin, mercuric oxide, thiophanate-methyl, azaconazole, bitertanol, bromuconazole, cyproconazole, difenoconazole, diniconazole, epoxiconazole, fenbuconazole, fluquinconazole, flusilazole, flutriafol, furametpyr, hexaconazole, imazalil, imibenconazole, ipconazole, metconazole, myclobutanil, paclobutrazole, pefurazoate, penconazole, prothioconazole, pyrifenox, prochloraz, propiconazole, pyrisoxazole, simeconazole, tebuconazole, tetraconazole, triadimefon, triadimenol, triflumizole, triticonazole, ancymidol, fenarimol, nuarimol, bupirimate, dimethirimol, ethirimol, dodemorph, fenpropidine, fenpropimorph, spiroxamine, tridemorph, cyprodinil, mepanipyrim, pyrimethanil, fenpiclonil, fludioxonil, benalaxyl, furalaxyl, metalaxyl, R-metalaxyl, ofurace, oxadixyl, carbendazim, debacarb, fuberidazole, thiabendazole, chlozolinate, dichlozoline, myclozoline, procymidone, vinclozoline, boscalid, carboxin, fenfuram, flutolanil, mepronil, oxycarboxin, penthiopyrad, thifluzamide, dodine, iminoctadine, azoxystrobin, dimoxystrobin, enestroburin, fenaminstrobin, flufenoxystrobin, fluoxastrobin, kresoxim-methyl, metominostrobin, trifloxystrobin, orysastrobin, picoxystrobin, pyraclostrobin, pyrametostrobin, pyraoxystrobin, ferbam, mancozeb, maneb, metiram, propineb, zineb, captafol, captan, fluoroimide, folpet, tolylfluanid, bordeaux mixture, copper oxide, mancopper, oxine-copper, nitrothal-isopropyl, edifenphos, iprobenphos, phosdiphen, tolclofos-methyl, anilazine, benthiavalicarb, blasticidin-S, chloroneb, chlorothalonil, cyflufenamid, cymoxanil, diclocymet, diclomezine, dicloran, diethofencarb, dimethomorph, flumorph, dithianon, ethaboxam, etridiazole, famoxadone, fenamidone, fenoxanil, ferimzone, fluazinam, fluopicolide, flusulfamide, fluxapyroxad, fenhexamid, fosetyl-aluminium, hymexazol, iprovalicarb, cyazofamid, methasulfocarb, metrafenone, pencycuron, phthalide, polyoxins, propamocarb, pyribencarb, proquinazid, pyroquilon, pyriofenone, quinoxyfen, quintozene, tiadinil, triazoxide, tricyclazole, triforine, validamycin, valifenalate, zoxamide, mandipropamid, isopyrazam, sedaxane, benzovindiflupyr, pydiflumetofen, 3-difluoromethyl-1-methyl-1H-pyrazole-4-carboxylic acid (3',4',5'-trifluoro-biphenyl-2-yl)-amide, isoflucypram, isotianil, dipymetitrone, 6-ethyl-5,7-dioxo-pyrrolo[4,5][1,4]dithiino[1,2-c]isothiazole-3-carbonitrile, 2-(difluoromethyl)-N-[3-ethyl-1,1-dimethyl-indan-4-yl]pyridine-3-carboxamide, 4-(2,6-difluorophenyl)-6-methyl-5-phenyl-pyridazine-3-carbonitrile, (R)-3-(difluoromethyl)-1-methyl-N-[1,1,3-trimethylindan-4-yl]pyrazole-4-carboxamide, 4-(2-bromo-4-fluoro-phenyl)-N-(2-chloro-6-fluoro-phenyl)-2,5-dimethyl-pyrazol-3-amine, 4-(2-bromo-4-fluorophenyl)-N-(2-chloro-6-fluorophenyl)-1,3-dimethyl-1H-pyrazol-5-amine, fluindapyr, coumethoxystrobin (jiaxiangjunzhi), Ivbenmixianan, dichlobentiazox, mandestrobin, 3-(4,4-difluoro-3,4-dihydro-3,3-dimethylisoquinolin-1-yl)quinolone, 2-[2-fluoro-6-[(8-fluoro-2-methyl-3-quinolyl)oxy]phenyl] propan-2-ol, oxathiapiprolin, tert-butyl N-[6-[[[(1-methyltetrazol-5-yl)-phenyl-methylene]amino]oxymethyl]-2-pyridyl]carbamate, pyraziflumid, inpyrfluxam, trolprocarb, mefentrifluconazole, ipfentrifluconazole, 2-(difluoromethyl)-N-[(3R)-3-ethyl-1,1-dimethyl-indan-4-yl]pyridine-3-carboxamide, N'-(2,5-dimethyl-4-phenoxy-phenyl)-N-ethyl-N-methyl-formamidine, N'-[4-(4,5-dichlorothiazol-2-yl)oxy-2,5-dimethyl-phenyl]-N-ethyl-N-methyl-formamidine, [2-[3-[2-[1-[2-[3,5-bis(difluoromethyl) pyrazol-1-yl]acetyl]-4-piperidyl]thiazol-4-yl]-4,5-dihydroisoxazol-5-yl]-3-chloro-phenyl] methanesulfonate, but-3-ynyl N-[6-[[(Z)-[(1-methyltetrazol-5-yl)-phenyl-methylene]amino]oxymethyl]-2-pyridyl]carbamate, methyl N-[[5-[4-(2,4-dimethylphenyl)triazol-2-yl]-2-methyl-phenyl]methyl]carbamate, 3-chloro-6-methyl-5-phenyl-4-(2,4,6-trifluorophenyl)pyridazine, pyridachlometyl, 3-(difluoromethyl)-1-methyl-N-[1,1,3-trimethylindan-4-yl]pyrazole-4-carboxamide, 1-[2-[[1-(4-chlorophenyl)pyrazol-3-yl] oxymethyl]-3-methyl-phenyl]-4-methyl-tetrazol-5-one, 1-methyl-4-[3-methyl-4-[[2-methyl-4-(3,4,5-trimethylpyrazol-1-yl)phenoxy]methyl]phenyl]tetrazol-5-one, aminopyrifen, ametoctradin, amisulbrom, penflufen, (Z,2E)-5-[1-(4-chlorophenyl)pyrazol-3-yl]oxy-2-methoxyimino-N,3-dimethyl-pent-3-enamide, florylpicoxamid, fenpicoxamid, tebufloquin, ipflufenoquin, quinofumelin, isofetamid, N-[2-[2,4-dichloro-phenoxy]phenyl]-3-(difluoromethyl)-1-methyl-pyrazole-4-carboxamide, N-[2-[2-chloro-4-(trifluoromethyl)phenoxy]phenyl]-3-(difluoromethyl)-1-methyl-pyrazole-4-carboxamide, benzothiostrobin, phenamacril, 5-amino-1,3,4-thiadiazole-2-thiol zinc salt (2:1), fluopyram, flutianil, fluopimomide, pyrapropoyne, picarbutrazox, 2-(difluoromethyl)-N-(3-ethyl-1,1-dimethyl-indan-4-yl)pyridine-3-carboxamide, 2-(difluoromethyl)-N-((3R)-1,1,3-trimethylindan-4-yl)pyridine-3-carboxamide, 4-[[6-[2-(2,4-difluorophenyl)-1,1-difluoro-2-hydroxy-3-(1,2,4-triazol-1-yl)propyl]-3-pyridyl]oxy]benzonitrile, metyltetraprole, 2-(difluoromethyl)-N-((3R)-1,1,3-trimethylindan-4-yl)pyridine-3-carboxamide, α-(1,1-dinethylethyl)-α-[4'-(trifluoromethoxy) [1,1'-biphenyl]-4-yl]-5-pyrimidinemethanol, fluoxapiprolin, enoxastrobin, 4-[[6-[2-(2,4-difluorophenyl)-1,1-difluoro-2-hydroxy-3-(1,2,4-triazol-1-yl)propyl]-3-pyridyl]oxy] benzonitrile, 4-[[6-[2-(2,4-difluorophenyl)-1,1-difluoro-2-hydroxy-3-(5-sulfanyl-1,2,4-triazol-1-yl) propyl]-3-pyridyl]oxy] benzonitrile, 4-[[6-[2-(2,4-difluorophenyl)-1,1-difluoro-2-hydroxy-3-(5-thioxo-4H-1,2,4-triazol-1-yl)propyl]-3-pyridyl]oxy]benzonitrile, trinexapac, coumoxystrobin, zhongshengmycin, thiodiazole copper, zinc thiazole, amectotractin, iprodione; N-methoxy-N-[[4-[5-(trifluoromethyl)-1,2,4-oxadiazol-3-yl]phenyl] methyl]cyclopropanecarbox-amide, N,2-dimethoxy-N-[[4-[5-(trifluoromethyl)-1,2,4-oxadiazol-3-yl]phenyl]methyl] propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-meth-oxy-1-[[4-[5-(trifluoromethyl)-1,2,4-oxadiazol-3-yl]phenyl]methyl]urea, N-[[4-[5-(trifluoromethyl)-1,2,4-oxadiazol-3-yl]phenyl]methyl]propanamide, 4,4-dimethyl-2-[[4-[5-(trifluoromethyl)-1,2,4-oxadiazol-3-yl] phenyl]methyl]isoxazolidin-3-one, 5,5-dimethyl-2-[[4-[5-(trifluoromethyl)-1,2,4-oxa-diazol-3-yl]phenyl]methyl] isoxazolidin-3-one, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine. The compounds in this paragraph may be prepared from the methods described in WO 2017/055473, WO 2017/055469, WO 2017/093348 and WO 2017/118689; 2-[6-(4-chlorophenoxy)-2-(trifluoromethyl)-3-pyridyl]-1-(1,2,4-triazol-1-yl)propan-2-ol (this compound may be prepared from the methods described in WO 2017/029179); 2-[6-(4-bromophenoxy)-2-(trifluoromethyl)-3-pyridyl]-1-(1,2,4-triazol-1-yl)propan-2-ol (this compound may be prepared from the methods described in WO 2017/029179); 3-[2-(1-chlorocyclopropyl)-3-(2-fluorophenyl)-2-hydroxy-propyl]imidazole-4-carbonitrile (this compound may be prepared from the methods described in WO 2016/156290); 3-[2-(1-chlorocyclopropyl)-3-(3-chloro-2-fluoro-phenyl)-2-hydroxy-propyl]imidazole-4-carbonitrile (this compound may be prepared from the methods described in WO 2016/156290); (4-phenoxyphenyl)methyl 2-amino-6-methyl-pyridine-3-carboxylate (this compound may be prepared from the methods described in WO 2014/006945); 2,6-Dimethyl-1H,5H-[1,4]dithiino[2,3-c:5,6-c'] dipyrrole-1,3,5,7(2H,6H)-tetrone (this compound may be prepared from the methods described in WO 2011/138281): N-methyl-4-[5-(trifluoromethyl)-1,2,4-oxadiazol-3-yl]benzenecarbothioamide; N-methyl-4-[5-(trifluoromethyl)-1,2, 4-oxadiazol-3-yl]benzamide; (Z,2E)-5-[1-(2,4-dichlorophenyl)pyrazol-3-yl]oxy-2-methoxyimino-N,3-dimethyl-pent-3-enamide (this compound may be prepared from the methods described in WO 2018/153707); N'-(2-chloro-5-methyl-4-phenoxy-phenyl)-N-ethyl-N-methyl-formamidine; N'-[2-chloro-4-(2-fluorophenoxy)-5-methyl-phenyl]-N-ethyl-N-methyl-formamidine (this compound may be prepared from the methods described in WO 2016/202742); 2-(difluoromethyl)-N-[(3S)-3-ethyl-1,1-dimethyl-indan-4-yl]pyridine-3-carboxamide (this compound may be prepared from the methods described in WO 2014/095675).

In one or more embodiments, the at least one additional pesticide may be used to control at least one of insects, mites, ticks, nematodes, bacteria, fungi, diseases, and plants (e.g., weeds). The at least one additional pesticide may be, for example, at least one of an insecticide, a fungicide, and a herbicide, each of which is described in further detail below.

Non-limiting examples of useful fungicides may include aromatic hydrocarbons, benzimidazoles, benzothiadiazole, carboxamides, carboxylic acid amides, morpholines, phenylamides, phosphonates, quinone outside inhibitors (e.g. strobilurins), thiazolidines, thiophanates, thiophene carboxamides, and triazoles. Further non-limiting examples of fungicides include acibenzolar-S-methyl, azoxystrobin, benalaxyl, bixafen, boscalid, carbendazim, chlorothalonil, cyclobutrifluram, cyproconazole, dimethomorph, epoxiconazole, fludioxonil, fluopyram, fluxapyroxad, fluoxastrobin, flutianil, flutolanil, fluxapyroxad, fosetyl-A1, ipconazole, isopyrazam, kresoxim-methyl, mefenoxam, metalaxyl, metconazole, myclobutanil, orysastrobin, penflufen, penthiopyrad, picoxystrobin, propiconazole, prothiconazole, pyraclostrobin, sedaxane, silthiofam, tebuconazole, thiabendazole, thifluzamide, thiophanate, tolclofos-methyl, trifloxystrobin, and triticonazole. In one embodiment, the fungicide may be selected from the group consisting of prothioconazole, fluoxastrobin, ipconazole, silthiofam, metalaxyl, trifloxystrobin, pyraclostrobin, fluxapyroxad, sedaxane, fluopyram, mefenoxam, penflufen, azoxystrobin, and combinations thereof.

Further non-limiting examples of fungicidal compounds and combinations which may be included in the dressing compositions of the invention are (E)-N-methyl-2-[2-(2,5-dimethylphenoxymethyl)phenyl]-2-methoxy-iminoacetamide (SSF-129), 4 bromo 2 cyano N,N dimethyl-6 trifluoromethyl-benzimidazole-1 sulfonamide, [N (3 chloro 2,6 xylyl) 2 methoxyacetamido]butyrolactone, 4-chloro-2-cyano-N,N-dimethyl-5-p-tolylimidazole-1-sulfonamide (IKF-916, cyamidazosulfamid), 3-5-dichloro-N-(3-chloro-1-ethyl-1-methyl-2-oxopropyl)-4-methylbenzamide (RH-7281, zoxamide), N-allyl-4,5-dimethyl-2-trimethylsilylthiophene-3-carboxamide (MON65500), N-(1-cyano-1,2-dimethylpropyl)-2-(2,4-dichlorophenoxy)-propionamide (AC382042), N (2 methoxy 5 pyridyl) cyclopropane carboxamide, acibenzolar (CGA245704) (e.g. acibenzolar-S-methyl), alanycarb, aldimorph, anilazine, azaconazole, azoxystrobin, benalaxyl, benomyl, benthiavalicarb, biloxazol, bitertanol, bixafen, blasticidin S, boscalid, bromuconazole, bupirimate, captafol, captan, carbendazim, carbendazim, chlorhydrate, carboxin, carpropamid, carvone, CGA41396, CGA41397, chinomethionate, chlorothalonil, chlorozolinate, clozylacon, copper containing compounds to give combinations such as copper oxychloride, copper oxyquinolate, copper sulfate, copper tallate and Bordeaux mixture, cyclufenamid, cymoxanil, cyproconazole, cyprodinil, debacarb, di 2 pyridyl disulfide 1,1' dioxide, dichlofluanid, diclomezine, dicloran, diethofencarb, difenoconazole, difenzoquat, diflumetorim, O,O di iso propyl S benzyl thiophosphate, dimefluazole, dimetconazole, dimethomorph, dimethirimol, diniconazole, dinocap, dithianon, dodecyl dimethyl ammonium chloride, dodemorph, dodine, doguadine, edifenphos, epoxiconazole, ethirimol I, ethyl-(Z)-N-benzyl-N-([methyl(methyl-thioethylideneamino-oxycarbonyl)amino]thio)alaninate, etridiazole, famoxadone, fenamidone (RPA407213), fenarimol, fenbuconazole, fenfuram, fenhexamid (KBR2738), fenpiclonil, fenpropidin, fenpropimorph, fentin acetate, fentin hydroxide, ferbam, ferimzone, fluazinam, fludioxonil, flumetover, fluopyram, fluoxastrobin, fluoroimide, fluquinconazole, flusilazole, flutolanil, flutriafol, fluxapyroxad, folpet, fuberidazole, furalaxyl, furametpyr, guazatine, hexaconazole, hydroxyisoxazole, hymexazole, imazalil, imibenconazole, iminoctadine, iminoctadine triacetate, ipconazole, iprobenfos, iprodione, iprovalicarb (SZX0722), isopropanyl butyl carbamate, isoprothiolane, isopyrazam, kasugamycin, kresoxim-methyl, LY186054, LY211795, LY248908, mancozeb, mandipropamid, maneb, mefenoxam, metalaxyl, mepanipyrim, mepronil, metalaxyl, metconazole, metiram, metiram zinc, metominostrobin, myclobutanil, neoasozin, nickel dimethyldithiocarbamate, nitrothal iso-propyl, nuarimol, ofurace, organomercury compounds, oxadixyl, oxasulfuron, oxolinic acid, oxpoconazole, oxycarboxin, pefurazoate, penconazole, pencycuron, penflufen, penthiopyrad, phenazin oxide, phosetyl Al, phosphorus acids, phthalide, picoxystrobin (ZA1963), polyoxinD, polyram, probenazole, prochloraz, procymidone, propamocarb, propiconazole, propineb, propionic acid, prothioconazole, pyrazophos, pyrifenox, pyrimethanil, pyraclostrobin, pyroquilon, pyroxyfur, pyrrolnitrin, quaternary ammonium compounds, quinomethionate, quinoxyfen, quintozene, sedaxane, sipconazole (F-155), sodium pentachlorophenate, spiroxamine, streptomycin, sulfur, tebuconazole, tecloftalam, tecnazene, tetraconazole, thiabendazole, thifluzamid, 2 (thiocyanomethylthio)benzothiazole, thiophanate-methyl, thiram, timibenconazole, tolclofos methyl, tolylfluanid, triadimefon, triadimenol, triazbutil, triazoxide, tricyclazole, tridemorph, trifloxystrobin (CGA279202), triforine, triflumizole, triticonazole, validamycin A, vapam, vinclozolin, zineb and ziram, N-[9-(dichloromethylene)-1,2,3,4-tetrahydro-1,4-methanonaphthalen-5-yl]-3-(difluoromethyl)-1-methyl-1H-pyrazole-4-carboxamide [1072957-71-1], 1-methyl-3-difluoromethyl-1H-pyrazole-4-carboxylic acid (2-dichloromethylene-3-ethyl-1-methyl-indan-4-yl)-amide, and 1-methyl-3-difluoromethyl-4H-pyrazole-4-carboxylic acid [2-(2,4-dichloro-phenyl)-2-methoxy-1-methyl-ethyl]-amide.

In some instances, the liquid seed dressing composition may comprise a flowability agent and one or more agricultural compounds that are useful to improve the agronomic characteristics of the seed and/or a plant grown from the seed.

Further non-limiting examples of insecticides and nematicides include carbamates, diamides, macrocyclic lactones, neonicotinoids, organophosphates, phenylpyrazoles, pyrethrins, spinosyns, synthetic pyrethroids, tetronic and tetramic acids. For example, the liquid seed treatment composition may comprise one or more insecticides and nematicides selected from abamectin, aldicarb, aldoxycarb, bifenthrin, carbofuran, chlorantraniliprole, clothianidin, cyantraniliprole, cyclobutrifluram, cyfluthrin, cyhalothrin, cypermethrin, deltamethrin, dinotefuran, emamectin, ethiprole, fenamiphos, fipronil, flubendiamide, flupentiofenox, fosthiazate, imidacloprid, ivermectin, lambda-cyhalothrin, milbemectin, tioxazafen, nitenpyram, oxamyl, permethrin, spinetoram, spinosad, spirodichlofen, spirotetramat, tefluthrin, thiacloprid, thiamethoxam, oxazosulfyl, tioxazafen, and thiodicarb. In one embodiment, the insecticide or nematicide may be selected from the group consisting of clothianidin, thiamethoxam, tioxazafen, imidacloprid and combinations thereof. In a preferred embodiment, the liquid seed treatment composition comprises tioxazafen.

Preferred agrochemical compounds Abamectin, Acequinocyl, Acetamiprid, Acetoprole, Acrinathrin, Acynonapyr, Afidopyropen, Afoxalaner, Alanycarb, Allethrin, Alpha-Cypermethrin, Alphamethrin, Amidoflumet, Aminocarb, Azocyclotin, Bensultap, Benzoximate, Benzpyrimoxan, Beta-cyfluthrin, Beta-cypermethrin, Bifenazate, Bifenthrin, Binapacryl, Bioallethrin, Bioallethrin (S)-cyclopentylisomer, Bioresmethrin, Bistrifluron, Broflanilide, Brofluthrinate, Bromophos-ethyl, Buprofezine, Butocarboxim, Cadusafos, Carbaryl, Carbosulfan, Cartap, CASnumber: 1472050-04-6, CASnumber: 1632218-00-8, CASnumber: 1808115-49-2, CASnumber: 2032403-97-5, CASnumber: 2044701-44-0, CASnumber: 2128706-05-6, CASnumber: 2249718-27-0, Chlorantraniliprole, Chlordane, Chlorfenapyr, Chloroprallethrin, Chromafenozide, Clenpirin, Cloethocarb, Clothianidin, 2-chlorophenylN-methylcarbamate (CPMC), Cyanofenphos, Cyantraniliprole, Cyclaniliprole, Cyclobutrifluram, Cycloprothrin, Cycloxaprid, Cyenopyrafen, Cyetpyrafen (or Etpyrafen), Cyflumetofen, Cyfluthrin, Cyhalodiamide, Cyhalothrin, Cypermethrin, Cyphenothrin, Cyromazine, Deltamethrin, Diafenthiuron, Dialifos, Dibrom, Dicloromezotiaz, Diflovidazine, Diflubenzuron, dimpropyridaz, Dinactin, Dinocap, Dinotefuran, Dioxabenzofos, Emamectin, Empenthrin, Epsilon-momfluorothrin, Epsilon-metofluthrin, Esfenvalerate, Ethion, Ethiprole, Etofenprox, Etoxazole, Famphur, Fenazaquin, Fenfluthrin, Fenitrothion, Fenobucarb, Fenothiocarb, Fenoxycarb, Fenpropathrin, Fenpyroximate, Fensulfothion, Fenthion, Fentinacetate, Fenvalerate, Fipronil, Flometoquin, Flonicamid, Fluacrypyrim, Fluazaindolizine, Fluazuron, Flubendiamide, Flubenzimine, Flucitrinate, Flucycloxuron, Flucythrinate, Fluensulfone, Flufenerim, Flufenprox, Flufiprole, Fluhexafon, Flumethrin, Fluopyram, Flupentiofenox, Flupyradifurone, Flupyrimin, Fluralaner, Fluvalinate, Fluxametamide, Fosthiazate, Gamma-Cyhalothrin, Gossyplure™, Guadipyr, Halofenozide, Halofenprox, Heptafluthrin, Hexythiazox, Hydramethylnon, Imicyafos, Imidacloprid, Imiprothrin, Indoxacarb, Iodomethane, Iprodione, Isocycloseram, Isothioate, Ivermectin, Kappa-bifenthrin, Kappa-tefluthrin, Lambda-Cyhalothrin, Lepimectin, Lufenuron, Metaflumizone, Metaldehyde, Metam, Methomyl, Methoxyfenozide, Metofluthrin, Metolcarb, Mexacarbate, Milbemectin, Momfluorothrin, Niclosamide, Nitenpyram, Nithiazine, Omethoate, Oxamyl, Oxazosulfyl, Parathion-ethyl, Permethrin, Phenothrin, Phosphocarb, Piperonylbutoxide, Pirimicarb, Pirimiphos-ethyl, Prallethrin, Profenofos, Profluthrin, Propargite, Propetamphos, Propoxur, Prothiophos, Protrifenbute, Pyflubumide, Pymetrozine, Pyraclofos, Pyrafluprole, Pyridaben, Pyridalyl, Pyrifluquinazon, Pyrimidifen, Pyrimostrobin, Pyriprole, Pyriproxyfen, Resmethrin, Sarolaner, Selamectin, Silafluofen, Spinetoram, Spinosad, Spirodiclofen, Spiromesifen, Spiropidion, Spirotetramat, Sulfoxaflor, Tebufenozide, Tebufenpyrad, Tebupirimiphos, Tefluthrin, Temephos, Tetrachloraniliprole, Tetradiphon, Tetramethrin, Tetramethylfluthrin, Tetranactin, Tetraniliprole, Theta-cypermethrin, Thiacloprid, Thiamethoxam, Thiocyclam, Thiodicarb, Thiofanox, Thiometon, Thiosultap, Tioxazafen, Tolfenpyrad, Toxaphene, Tralomethrin, Transfluthrin, Triazamate, Triazophos, Trichlorfon, Trichloronate, Trichlorphon, Triflumezopyrim, Tyclopyrazoflor, Zeta-Cypermethrin, Acibenzolar-S-methyl, Adepidyn, Sedaxane, Oxathiapiprolin, Ipconazole, Metalaxyl, Mefenoxam, Penflufen, Fluxopyroxad, Penthiopyrad, Prothiaconozole, Thiabendazole, Rizolex(Tolclofos-methyl), Carbofuran.

Additional agrochemical active compounds that may be incorporated into the seed treatment composition include, for example, biological agents for pest control, microbial extracts, plant growth activators, and plant defense agents. Non-limiting examples of biological agents include bacteria, fungi, beneficial nematodes, and viruses.

In certain embodiments, the biological agent can comprise a bacterium of the genus *Actinomycetes, Agrobacterium, Arthrobacter, Alcaligenes, Aureobacterium, Azobacter, Bacillus, Beijerinckia, Bradyrhizobium, Brevibacillus, Burkholderia, Chromobacterium, Clostridium, Clavibacter, Comamonas, Corynebacterium, Curtobacterium, Enterobacter, Flavobacterium, Gluconobacter, Hydrogenophaga, Klebsiella, Metarhizium, Methylobacterium, Paenibacillus, Pasteuria, Photorhabdus, Phyllobacterium, Pseudomonas, Rhizobium, Serratia, Sphingobacterium, Stenotrophomonas, Streptomyces, Variovorax,* and *Xenorhabdus*. In particular embodiments the bacteria is selected from the group consisting of *Bacillus amyloliquefaciens, Bacillus cereus, Bacillus firmus, Bacillus, lichenformis, Bacillus pumilus, Bacillus sphaericus, Bacillus subtilis, Bacillus thuringiensis, Bradyrhizobium japonicum, Chromobacterium subtsugae, Metarhizium anisopliae, Pasteuria nishizawae, Pasteuria penetrans, Pasteuria usage, Pseudomonas fluorescens,* and *Streptomyces lydicus.*

In certain embodiments the biological agent can comprise a fungus of the genus *Alternaria, Ampelomyces, Aspergillus, Aureobasidium, Beauveria, Colletotrichum, Coniothyrium, Gliocladium, Metarhizium, Muscodor, Paecilomyces, Penicillium, Trichoderma, Typhula, Ulocladium,* and *Verticillium*. In another embodiment the fungus is *Beauveria bassiana, Coniothyrium minitans, Gliocladium vixens, Muscodor albus, Paecilomyces lilacinus, Penicillium bilaiae, Trichoderma asperellum, Trichoderma polysporum,* or *Trichoderma vixens*. In further embodiments the biological agents can comprise harpin, *Reynoutria sachalinensis*, jasmonate, lipochitooligosaccharides, salicylic acid and/or isoflavones. In another embodiment, the biological agent may comprise *Bacillus firmus*. Non-limiting examples of commercially available biological agents include REVV, CUE, QUICKROOTS, TORQUE, JUMPSTART, JUMPSTART LCO, ACTINOVATE, VOTIVO, CLARIVA, TAGTEAM, TAGTEAM LCO, OPTIMIZE, RATCHET, PROSTABLISH, NVELOP, SMILAX, CELL TECH, NITRAGIN, NITRAGIN GOLD, and MET 52. Other biological agents include enrofloxacin, febantel, penethamate, moloxicam, cefalexin, kanamycin, pimobendan, clenbuterol, omeprazole, tiamulin, benazepril, pyriprole, cefquinome, florfenicol, buserelin, cefovecin, tulathromycin, ceftiour, carprofen, metaflumizone, praziquarantel, thiabendazole.

Other biological agents include entomopathogenic nematodes, such as *Heterohabditis bacteriophora* or *Steinernema carpocapsae*.

Preferred biological agricultural compounds include Azadirachtin, *Bacillus firmus, Beauveria bassiana*, D-limonene, Granulovirus, Harpin, *Helicoverpa armigera* Nucleopolyhedrovirus, *Helicoverpa zea* Nucleopolyhedrovirus, *Heliothis virescens* Nucleopolyhedrovirus, *Heliothis punctigera* Nucleopolyhedrovirus, *Metarhizium* spp., Neem tree based products, *Paecilomyces fumosoroseus, Paecilomyces lilacinus, Pasteuria nishizawae*, P-cymene, *Plutella xylostella* Granulosis virus, *Plutella xylostella* Nucleopolyhedrovirus, Polyhedrosis virus, pyrethrum, *Quillaja saponaria*, *Spodoptera frugiperda* Nucleopolyhedrovirus, Terpenoid blend, *Verticillium* spp., *Rhizobium japonimcum*, *Trichoderma* spp., *Bacillus subtilis*, Nitrogen fixing symbiotic organisms, *Penicillium bilaiae*, *Trichoderma harzianum rifai*, *Bacillus licheniformis*, *Bacillus amyloliquefaciens*, *Pochonia chlamydosporia*, Chitosan, *Pseudomonas fluorescens*, *Agrobacterium radiobacter*, *Metarhizium anisopliae*, *Cryptophlebia leucotreta* granulovirus (CrIeGV), and/or Pine oil.

Examples of suitable additional active ingredients include the following: acycloamino acid, s, aliphatic nitrogen fungicides, amide fungicides, anilide fungicides, antibiotic fungicides, aromatic fungicides, arsenical fungicides, aryl phenyl ketone fungicides, benzamide fungicides, benzanilide fungicides, benzimidazole fungicides, benzothiazole fungicides, botanical fungicides, bridged diphenyl fungicides, carbamate fungicides, carbanilate fungicides, conazole fungicides, copper fungicides, dicarboximide fungicides, dinitrophenol fungicides, dithiocarbamate fungicides, dithiolane fungicides, furamide fungicides, furanilide fungicides, hydrazide fungicides, imidazole fungicides, mercury fungicides, morpholine fungicides, organophosphorous fungicides, organotin fungicides, oxathiin fungicides, oxazole fungicides, phenylsulfamide fungicides, polysulfide fungicides, pyrazole fungicides, pyridine fungicides, pyrimidine fungicides, pyrrole fungicides, quaternary ammonium fungicides, quinoline fungicides, quinone fungicides, quinoxaline fungicides, strobilurin fungicides, sulfonamide fungicides, thiadiazole fungicides, thiazole fungicides, thiazolidine fungicides, thiocarbamate fungicides, thiophene fungicides, triazine fungicides, triazole fungicides, triazolopyrimidine fungicides, urea fungicides, valinamide fungicides, and zinc fungicides. Non-limiting examples of suitable fungicides that may be used as the at least one additional pesticide include 2-(thiocyanatomethylthio)-benzothiazole, 2-phenylphenol, 8-hydroxyquinoline sulfate, *Ampelomyces, quisqualis*, azaconazole, azoxystrobin, *Bacillus subtilis*, benalaxyl, benomyl, benthiavalicarb-isopropyl, benzylaminobenzene-sulfonate (BABS) salt, bicarbonates, biphenyl, bismerthiazol, bitertanol, blasticidin-S, borax, Bordeaux mixture, boscalid, bromuconazole, bupirimate, calcium polysulfide, captafol, captan, carbendazim, carboxin, carpropamid, carvone, chloroneb, chlorothalonil, chlozolinate, *Coniothyrium minitans*, copper hydroxide, copper octanoate, copper oxychloride, copper sulfate, copper sulfate (tribasic), cuprous oxide, cyazofamid, cyflufenarnid, cymoxanil, cyproconazole, cyprodinil, dazomet, debacarb, diammonium ethylenebis-(dithiocarbamate), dichlofluanid, dichlorophen, diclocymet, diclomezine, dichloran, diethofencarb, difenoconazole, difenzoquat ion, diflumetorim, dimethomorph, dimoxystrobin, diniconazole, diniconazole-M, dinobuton, dinocap, diphenylamine, dithianon, dodemorph, dodemorph acetate, dodine, dodine free base, edifenphos, epoxiconazole, ethaboxam, ethoxyquin, etridiazole, famoxadone, fenamidone, fenarimol, fenbuconazole, fenfuram, fenhexamid, fenoxanil, fenpiclonil, fenpropidin, fenpropimorph, fentin, fentin acetate, fentin hydroxide, ferbam, ferimzone, fluazinam, fludioxonil, flumorph, fluopicolide, fluoroimide, fluoxastrobin, fluquinconazole, flusilazole, flusulfamide, flutolanil, flutriafol, folpet, formaldehyde, fosetyl, fosetyl-aluminium, fuberidazole, furalaxyl, furametpyr, guazatine, guazatine acetates, GY-81, hexachlorobenzene, hexaconazole, hymexazol, imazalil, imazalil sulfate, imibenconazole, iminoctadine, iminoctadine triacetate, iminoctadine tris(albesilate), ipconazole, iprobenfos, iprodione, iprovalicarb, iso-prothiolane, kasugamycin, kasugamycin hydrochloride hydrate, kresoxim-methyl, mancopper, mancozeb, maneb, mepanipyrim, mepronil, mercuric chloride, mercuric oxide, mercurous chloride, metalaxyl, mefenoxam, metalaxyl-M, metam, metam-ammonium, metam-potassium, metam-sodium, metconazole, methasulfocarb, methyl iodide, methyl isothiocyanate, metiram, metominostrobin, metrafenone, mildiomycin, myclobutanil, nabam, nitrothal-isopropyl, nuarimol, octhilinone, ofurace, oleic acid, in general, fatty acids and salts thereof, in partiuarl potassium salts; orysastrobin, oxadixyl, oxine-copper, oxpoconazole fumarate, oxycarboxin, pefurazoate, penconazole, pencycuron, pentachlorophenol, pentachlorophenyl laurate, penthiopyrad, phenylmercury acetate, phosphonic acid, phthalide, picoxystrobin, polyoxin B, polyoxins, polyoxorim, potassium bicarbonate, potassium hydroxyquinoline sulfate, probenazole, prochloraz, procymidone, propamocarb, propamocarb hydrochloride, propiconazole, propineb, proquinazid, prothioconazole, pyraclostrobin, pyrazophos, pyributicarb, pyrifenox, pyrimethanil, pyroquilon, quinoclamine, quinoxyfen, quintozene, *Reynoutria sachalinensis* extract, silthiofam, simeconazole, sodium 2-phenylphenoxide, sodium bicarbonate, sodium pentachlorophenoxide, spiroxamine, sulfur, SYP-Z071, tar oils, tebuconazole, tecnazene, tetraconazole, thiabendazole, thifluzamide, thiophanate-methyl, thiram, tiadinil, tolclofos-methyl, tolylfluanid, triadimefon, triadimenol, triazoxide, tricyclazole, tridemorph, trifloxystrobin, triflumizole, triforine, triticonazole, validamycin, vinclozolin, zineb, ziram, zoxamide, *Candida oleophila*, *Fusarium oxysporum*, *Gliocladium* spp., *Phlebiopsis gigantean*, *Streptomyces griseoviridis*, *Trichoderma* spp., (RS)-N-(3,5-dichlorophenyl)-2-(methoxymethyl)-succinimide, 1,2-dichloropropane, 1,3-dichloro-1,1,3,3-tetrafluoroacetone hydrate, 1-chloro-2,4-dinitronaphthalene, 1-chloro-2-nitropropane, 2-(2-heptadecyl-2-imidazolin-1-yl)ethanol, 2,3-dihydro-5-phenyl-1,4-dithi-ine 1,1,4,4-tetraoxide, 2-methoxyethylmercury acetate, 2-methoxyethylmercury chloride, 2-methoxyethylmercury silicate, 3-(4-chlorophenyl)-5-methylrhodanine, 4-(2-nitroprop-1-enyl)phenyl thiocyanateme: ampropylfos, anilazine, azithiram, barium polysulfide, Bayer 32394, benodanil, benquinox, bentaluron, benzamacril; benzamacril-isobutyl, benzamorf, binapacryl, bis(methylmercury) sulfate, bis(tributyltin) oxide, buthiobate, cadmium calcium copper zinc chromate sulfate, carbamorph, CECA, chlobenthiazone, chloraniformethan, chlorfenazole, chlorquinox, climbazole, copper bis(3-phenylsalicylate), copper zinc chromate, cufraneb, cupric hydrazinium sulfate, cuprobam, cyclafuramid, cypendazole, cyprofuram, decafentin, dichlone, dichlozoline, diclobutrazol, dimethirimol, dinocton, dinosulfon, dinoterbon, dipyrithione, ditalimfos, dodicin, drazoxolon, EBP, ESBP, etaconazole, etem, ethirim, fenaminosulf, fenapanil, fenitropan, fluotrimazole, furcarbanil, furconazole, furconazole-cis, furmecyclox, furophanate, glyodine, griseofulvin, halacrinate, Hercules 3944, hexylthiofos, ICIA0858, isopamphos, isovaledione, mebenil, mecarbinzid, metazoxolon, methfuroxam, methylmercury dicyandiamide, metsulfovax, milneb, mucochloric anhydride, myclozolin, N-3,5-dichlorophenyl-succinimide, N-3-nitrophenylitaconimide, natamycin, N-ethylmercurio-4-toluenesulfonanilide, nickel bis(dimethyldithiocarbamate), OCH, phenylmercury dimethyldithiocarbamate, phenylmercury nitrate, phosdiphen, prothiocarb; prothiocarb hydrochloride, pyracarbolid, pyridinitril, pyroxychlor, pyroxyfur, quinacetol; quinacetol sulfate, quinazamid, quinconazole, rabenzazole, salicylanilide, SSF-109, sultropen, tecoram, thiadifluor, thicyofen, thiochlorfenphim, thiophanate, thioquinox, tioxymid, triamiphos, triarimol, triazbutil, trichlamide, urbacid, XRD-563, and zarilamid, and any combinations thereof.

Non-limiting examples of suitable herbicides that may be used as the at least one additional pesticide include amide herbicides such as allidochlor, beflubutamid, benzadox, benzipram, bromobutide, cafenstrole, CDEA, chlorthiamid, cyprazole, dimethenamid, dimethenamid-P, diphenamid, epronaz, etnipromid, fentrazamide, flupoxam, fomesafen, halosafen, isocarbamid, isoxaben, napropamide, naptalam, pethoxamid, propyzamide, quinonamid and tebutam; anilide herbicides such as chloranocryl, cisanilide, clomeprop, cypromid, diflufenican, etobenzanid, fenasulam, flufenacet, flufenican, mefenacet, mefluidide, metamifop, monalide, naproanilide, pentanochlor, picolinafen and propanil; arylalanine herbicides, such as benzoylprop, flamprop and flamprop-M; chloroacetanilide herbicides, such as acetochlor, alachlor, butachlor, butenachlor, delachlor, diethatyl, dimethachlor, metazachlor, metolachlor, S-metolachlor, pretilachlor, propachlor, propisochlor, prynachlor, terbuchlor, thenylchlor and xylachlor; sulfonanilide herbicides, such as benzofluor, perfluidone, pyrimisulfan and profluazol; sulfonamide herbicides, such as asulam, carbasulam, fenasulam and oryzalin; antibiotic herbicides, such as bilanafos; benzoic acid herbicides, such as chloramben, dicamba, 2,3,6-TBA and tricamba; pyrimidinyloxybenzoic acid herbicides, such as bispyribac and pyriminobac; pyrimidinylthiobenzoic acid herbicides, such as pyrithiobac; phthalic acid herbicides, such as chlorthal; picolinic acid herbicides such as aminopyralid, clopyralid and picloram; quinolinecarboxylic acid herbicides, such as quinclorac and quinmerac; arsenical herbicides, such as cacodylic acid, CMA, DSMA, hexaflurate, MAA, MAMA, MSMA, potassium arsenite and sodium arsenite; benzoylcyclohexanedione herbicides, such as mesotrione, sulcotrione, tefuryltrione and tembotrione; benzofuranyl alkylsulfonate herbicides, such as benfuresate and ethofumesate; carbamate herbicides, such as asulam, carboxazole chlorprocarb, dichlormate, fenasulam, karbutilate and terbucarb; carbanilate herbicides, such as barban, BCPC, carbasulam, carbetamide, CEPC, chlorbufam, chlorpropham, CPPC, desmedipham, phenisopham, phenmedipham, phenmedipham-ethyl, propham and swep; cyclohexene oxime herbicides, such as alloxydim, butroxydim, clethodim, cloproxydim, cycloxydim, profoxydim, sethoxydim, tepraloxydim and tralkoxydim; cyclopropylisoxazole herbicides, such as isoxachlortole and isoxaflutole; dicarboximide herbicides, such as benzfendizone, cinidon-ethyl, flumezin, flumiclorac, flumioxazin and flumipropyn; dinitroaniline herbicides, such as benfluralin, butralin, dinitramine, ethalfluralin, fluchloralin, isopropalin, methalpropalin, nitralin, oryzalin, pendimethalin, prodiamine, profluralin and trifluralin; dinitrophenol herbicides, such as dinofenate, dinoprop, dinosam, dinoseb, dinoterb, DNOC, etinofen and medinoterb; diphenyl ether herbicides, such as ethoxyfen; nitrophenyl ether herbicides, such as acifluorfen, aclonifen, bifenox, chlomethoxyfen, chlornitrofen, etnipromid, fluorodifen, fluoroglycofen, fluoronitrofen, fomesafen, furyloxyfen, halosafen, lactofen, nitrofen, nitrofluorfen and oxyfluorfen; dithiocarbamate herbicides, such as dazomet and metam; halogenated aliphatic herbicides, such as alorac, chloropon, dalapon, flupropanate, hexachloroacetone, iodomethane, methyl bromide, monochloroacetic acid, SMA and TCA; imidazolinone herbicides, such as imazamethabenz, imazamox, imazapic, imazapyr, imazaquin and imazethapyr; inorganic herbicides, such as ammonium sulfamate, borax, calcium chlorate, copper sulfate, ferrous sulfate, potassium azide, potassium cyanate, sodium azide, sodium chlorate and sulfuric acid; nitrile herbicides, such as bromobonil, bromoxynil, chloroxynil, dichlobenil, iodobonil, ioxynil and pyraclonil; organophosphorus herbicides, such as amiprofos-methyl, anilofos, bensulide, bilanafos, butamifos, 2,4-DEP, DMPA, EBEP, fosamine, glufosinate, glyphosate and piperophos; phenoxy herbicides, such as bromofenoxim, clomeprop, 2,4-DEB, 2,4-DEP, difenopenten, disul, erbon, etnipromid, fenteracol and trifopsime; phenoxyacetic herbicides, such as 4-CPA, 2,4-D, 3,4-DA, MCPA, MCPA-thioethyl and 2,4,5-T; phenoxybutyric herbicides, such as 4-CPB, 2,4-DB, 3,4-DB, MCPB and 2,4,5-TB; phenoxypropionic herbicides, such as cloprop, 4-CPP, dichlorprop, dichlorprop-P, 3,4-DP, fenoprop, mecoprop and mecoprop-P; aryloxyphenoxypropionic herbicides, such as chlorazifop, clodinafop, clofop, cyhalofop, diclofop, fenoxaprop, fenoxaprop-P, fenthiaprop, fluazifop, fluazifop-P, haloxyfop, haloxyfop-P, isoxapyrifop, metamifop, propaquizafop, quizalofop, quizalofop-P and trifop; phenylenediamine herbicides, such as dinitramine and prodiamine; pyrazolyl herbicides, such as benzofenap, pyrazolynate, pyrasulfotole, pyrazoxyfen, pyroxasulfone and topramezone; pyrazolylphenyl herbicides, such as fluazolate and pyraflufen; pyridazine herbicides, such as credazine, pyridafol and pyridate; pyridazinone herbicides, such as brompyrazon, chloridazon, dimidazon, flufenpyr, metflurazon, norflurazon, oxapyrazon and pydanon; pyridine herbicides such as aminopyralid, cliodinate, clopyralid, dithiopyr, fluoroxypyr, haloxydine, picloram, picolinafen, pyriclor, thiazopyr and triclopyr; pyrimidinediamine herbicides, such as iprymidam and tioclorim; quaternary ammonium herbicides, such as cyperquat, diethamquat, difenzoquat, diquat, morfamquat and paraquat; thiocarbamate herbicides, such as butylate, cycloate, di-allate, EPTC, esprocarb, ethiolate, isopolinate, methiobencarb, molinate, orbencarb, pebulate, prosulfocarb, pyributicarb, sulfallate, thiobencarb, tiocarbazil, tri-allate and vemolate; thiocarbonate herbicides, such as dimexano, EXD and proxan; thiourea herbicides such as methiuron; triazine herbicides, such as dipropetryn, triaziflam and trihydroxytriazine; chlorotriazine herbicides, such as atrazine, chlorazine, cyanazine, cyprazine, eglinazine, ipazine, mesoprazine, procyazine, proglinazine, propazine, sebuthylazine, simazine, terbuthylazine and trietazine; methoxytriazine herbicides, such as atraton, methometon, prometon, secbumeton, simeton and terbumeton; methylthiotriazine herbicides, such as ametryn, aziprotryne, cyanatryn, desmetryn, dimethametryn, methoprotryne, prometryn, simetryn and terbutryn; triazinone herbicides, such as ametridione, amibuzin, hexazinone, isomethiozin, metamitron and metribuzin; triazole herbicides, such as amitrole, cafenstrole, epronaz and flupoxam; triazolone herbicides, such as amicarbazone, bencarbazone, carfentrazone, flucarbazone, propoxycarbazone, sulfentrazone and thiencarbazone-methyl; triazolopyrimidine herbicides, such as cloransulam, diclosulam, florasulam, flumetsulam, metosulam, penoxsulam and pyroxsulam; uracil herbicides, such as butafenacil, bromacil, flupropacil, isocil, lenacil and terbacil; 3-phenyluracils; urea herbicides, such as benzthiazuron, cumyluron, cycluron, dichloralurea, diflufenzopyr, isonoruron, isouron, methabenzthiazuron, monisouron and noruron; phenylurea herbicides, such as anisuron, buturon, chlorbromuron, chloreturon, chlorotoluron, chloroxuron, daimuron, difenoxuron, dimefuron, diuron, fenuron, fluometuron, fluothiuron, isoproturon, linuron, methiuron, methyldymron, metobenzuron, metobromuron, metoxuron, monolinuron, monuron, neburon, parafluoron, phenobenzuron, siduron, tetrafluoron and thidiazuron; pyrimidinylsulfonylurea herbicides, such as amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, nicosulfuron, orthosulfamuron, oxasulfuron, primisulfuron, pyrazosulfuron, rimsulfuron, sulfometuron, sulfosulfuron and trifloxysulfuron; triazinylsulfonylurea herbicides, such as chlorsulfuron, cinosulfuron, ethametsulfuron, iodosulfuron, metsulfuron, prosulfuron, thifensulfuron, triasulfuron, tribenuron, triflusulfuron and tritosulfuron; thiadiazolylurea herbicides, such as buthiuron, ethidimuron, tebuthiuron, thiazafluoron and thidiazuron; and unclassified herbicides such as acrolein, allyl alcohol, azafenidin, benazolin, bentazone, benzobicyclon, buthidazole, calcium cyanamide, cambendichlor, chlorfenac, chlorfenprop, chlorflurazole, chlorflurenol, cinmethylin, clomazone, CPMF, cresol, ortho-dichlorobenzene, dimepiperate, endothal, fluoromidine, fluridone, fluorochloridone, flurtamone, fluthiacet, indanofan, methazole, methyl isothiocyanate, nipyraclofen, OCH, oxadiargyl, oxadiazon, oxaziclomefone, pentachlorophenol, pentoxazone, phenylmercury acetate, pinoxaden, prosulfalin, pyribenzoxim, pyriftalid, quinoclamine, rhodethanil, sulglycapin, thidiazimin, tridiphane, trimeturon, tripropindan, and tritac.

Non-limiting examples of suitable additional active ingredients also include the following: 3-difluoromethyl-1-methyl-1 H-pyrazole-4-carboxylic acid (9-dichloromethylene-1,2,3,4-tetrahydro-1,4-methano-naphthalen-5-yl)-amide, 3-difluoromethyl-1-methyl-1 H-pyrazole-4-carboxylic acid methoxy-[1-methyl-2-(2,4,6-trichlorophenyl)-ethyl]-amide, 1-methyl-3-difluoromethyl-1 H-pyrazole-4-carboxylic acid (2-dichloromethylene-3-ethyl-1-methyl-indan-4-yl)-amide (1072957-71-1), 1-methyl-3-difluoromethyl-1 H-pyrazole-4-carboxylic acid (4'-methylsulfanyl-biphenyl-2-yl)-amide, 1-methyl-3-difluoromethyl-4H-pyrazole-4-carboxylic acid [2-(2,4-dichloro-phenyl)-2-methoxy-1-methyl-ethyl]-amide, (5-Chloro-2,4-dimethyl-pyridin-3-yl)-(2,3,4-trimethoxy-6-methyl-phenyl)-methanone, (5-Bromo-4-chloro-2-methoxy-pyridin-3-yl)-(2,3,4-trimethoxy-6-methyl-phenyl)-methanone, 2-{2-[(E)-3-(2,6-Dichloro-phenyl)-1-methyl-prop-2-en-(E)-ylideneaminooxymethyl]-phenyl}-2-[(Z)-methoxyimino]-N-methyl-acetamide, 3-[5-(4-Chloro-phenyl)-2,3-dimethyl-isoxazolidin-3-yl]-pyridine, (E)-N-methyl-2-[2-(2, 5-dimethylphenoxymethyl) phenyl]-2-methoxy-iminoacetamide, 4-bromo-2-cyano-N,N-dimethyl-6-trifluoromethylbenzimidazole-1-sulphonamide, a-[N-(3-chloro-2, 6-xylyl)-2-methoxyacetamido]-y-butyrolactone, 4-chloro-2-cyano-N,N-dimethyl-5-p-tolylimidazole-1-sulfonamide, N-allyl-4, 5-dimethyl-2-trimethylsilylthiophene-3-carboxamide, N-(I-cyano-1, 2-dimethyl propyl)-2-(2, 4-dichlorophenoxy) propionamide, N-(2-methoxy-5-pyridyl)-cyclopropane carboxamide, (.+-.)-cis-1-(4-chlorophenyl)-2-(1 H-1,2,4-triazol-1-yl)-cycloheptanol, 2-(1-ieri-butyl)-1-(2-chlorophenyl)-3-(1,2,4-triazol-1-yl)-propan-2-ol, 2 6'-dibromo-2-methyl-4-trifluoromethoxy-4'-trifluoromethyl-1,3-thiazole-5-carboxanilide, 1-imidazolyl-1-(4'-chlorophenoxy)-3,3-dimethylbutan-2-one, methyl (E)-2-[2-[6-(2-cyanophenoxy)pyrimidin-4-yloxy]phenyl]3-methoxyacrylate, methyl (E)-2-[2-[6-(2-thioamidophenoxy)pyrimidin-4-yloxy]phenyl]-3-methoxyacrylate, methyl (E)-2-[2-[6-(2-fluorophenoxy)pyrimidin-4-yloxy]phenyl]-3-methoxyacrylate, methyl (E)-2-[2-[6-(2,6-difluorophenoxy)pyrimidin-4-yloxy]phenyl]-3-methoxyacrylate, methyl (E)-2-[2-[3-(pyrimidin-2-yloxy)phenoxy]phenyl]-3-methoxyacrylate, methyl (E)-2-[2-[3-(5-methylpyrimidin-2-yloxy)-phenoxy]phenyl]-3-methoxyacrylate, methyl (E)-2-[2-[3-(phenyl-sulphonyloxy)phenoxy]phenyl-3-methoxyacrylate, methyl (E)-2-[2-[3-(4-nitrophenoxy)phenoxy]phenyl]-3-methoxyacrylate, methyl (E)-2-[2-phenoxyphenyl]-3-methoxyacrylate, methyl (E)-2-[2-(3,5-dimethyl-benzoyl)pyrrol-1-yl]-3-methoxyacrylate, methyl (E)-2-[2-(3-methoxyphenoxy)phenyl]-3-methoxyacrylate, methyl (E)-2[2-(2-phenylethen-1-yl)-phenyl]-3-methoxyacrylate, methyl (E)-2-[2-(3,5-dichlorophenoxy)pyridin-3-yl]-3-methoxyacrylate, methyl (E)-2-(2-(3-(1,1,2,2-tetrafluoroethoxy)phenoxy)phenyl)-3-methoxyacrylate, methyl (E)-2-(2-[3-(alpha-hydroxybenzyl)phenoxy]phenyl)-3-methoxyacrylate, methyl (E)-2-(2-(4-phenoxypyridin-2-yloxy)phenyl)-3-methoxyacrylate,
methyl (E)-2-[2-(3-n-propyloxy-phenoxy)phenyl]3-methoxyacrylate, methyl (E)-2-[2-(3-isopropyloxyphenoxy)phenyl]-3-methoxyacrylate, methyl (E)-2-[2-[3-(2-fluorophenoxy)phenoxy]phenyl]-3-methoxyacrylate, methyl (E)-2-[2-(3-ethoxyphenoxy)phenyl]-3-methoxyacrylate, methyl (E)-2-[2-(4-ieri-butyl-pyridin-2-yloxy)phenyl]-3-methoxyacrylate, methyl (E)-2-[2-[3-(3-cyanophenoxy)phenoxy]phenyl]-3-methoxyacrylate, methyl (E)-2-[2-[(3-methyl-pyridin-2-yloxymethyl)phenyl]-3-methoxyacrylate, methyl (E)-2-[2-[6-(2-methyl-phenoxy)pyrimidin-4-yloxy]phenyl]-3-methoxyacrylate, methyl (E)-2-[2-(5-bromo-pyridin-2-yloxymethyl)phenyl]-3-methoxyacrylate, methyl (E)-2-[2-(3-(3-iodopyridin-2-yloxy)phenoxy)phenyl]-3-methoxyacrylate, methyl (E)-2-[2-[6-(2-chloropyridin-3-yloxy)pyrimidin-4-yloxy]phenyl]-3-methoxyacrylate, methyl (E),(E)-2-[2-(5,6-dimethylpyrazin-2-ylmethyloximinomethyl)phenyl]-3-methoxyacrylate, methyl (E)-2-{2-[6-(6-methylpyridin-2-yloxy)pyrimidin-4-yloxy]phenyl}-3-methoxy-acrylate, methyl (E),(E)-2-{2-(3-methoxyphenyl)methyloximinomethyl]-phenyl}-3-methoxyacrylate, methyl (E)-2-{2-(6-(2-azidophenoxy)-pyrimidin-4-yloxy]phenyl}-3-methoxyacrylate, methyl (E),(E)-2-{2-[6-phenylpyrimidin-4-yl)-methyloximinomethyl]phenyl}-3-methoxyacrylate, methyl (E),(E)-2-{2-[(4-chlorophenyl)-methyloximinomethyl]-phenyl}-3-methoxyacrylate, methyl (E)-2-{2-[6-(2-n-propylphenoxy)-1,3,5-triazin-4-yloxy]phenyl}-3-methoxyacrylate, methyl (E),(E)-2-{2-[(3-nitrophenyl)methyloximinomethyl]phenyl}-3-methoxyacrylate, 3-chloro-7-(2-aza-2,7,7-trimethyl-oct-3-en-5-ine), 2,6-dichloro-N-(4-trifluoromethylbenzyl)-benzamide, 3-iodo-2-propinyl alcohol, 4-chlorophenyl-3-iodopropargyl formal, 3-bromo-2,3-diiodo-2-propenyl ethylcarbamate, 2,3,3-triiodoallyl alcohol, 3-bromo-2,3-diiodo-2-propenyl alcohol, 3-iodo-2-propinyl n-butylcarbamate, 3-iodo-2-propinyl n-hexylcarbamate, 3-iodo-2-propinyl cyclohexyl-carbamate, 3-iodo-2-propinyl phenylcarbamate; phenol derivatives, such as tribromophenol, tetrachlorophenol, 3-methyl-4-chlorophenol, 3,5-dimethyl-4-chlorophenol, phenoxyethanol, dichlorophene, o-phenylphenol, m-phenylphenol, p-phenylphenol, 2-benzyl-4-chlorophenol, 5-hydroxy-2 (5H)-furanone; 4,5-dichlorodithiazolinone, 4,5-benzodithiazolinone, 4,5-trimethylenedithiazolinone, 4,5-dichloro-(3H)-1,2-dithiol-3-one, 3,5-dimethyl-tetrahydro-1,3,5-thiadiazine-2-thione, N-(2-p-chlorobenzoylethyl)-hexaminium chloride, acibenzolar, acypetacs, alanycarb, albendazole, aldimorph, allicin, allyl alcohol, ametoctradin, amisulbrom, amobam, ampropylfos, anilazine, asomate, aureofungin, azaconazole, azafendin, azithiram, azoxystrobin, barium polysulfide, benalaxyl, benalaxyl-M, benodanil, benomyl, benquinox, bentaluron, benthiavalicarb, benthiazole, benzalkonium chloride, benzamacril, benzamorf, benzohydroxamic acid, benzovindiflupyr, berberine, bethoxazin, biloxazol, binapacryl, biphenyl, bitertanol, bithionol, bixafen, blasticidin-S, boscalid, bromothalonil, bromuconazole, bupirimate, buthiobate, butylamine calcium polysulfide, captafol, captan, carbamorph, carbendazim, carbendazim chlorhydrate, carboxin, carpropamid, carvone, CGA41396, CGA41397, chinomethionate, chitosan, chlobenthiazone, chloraniformethan, chloranil, chlorfenazole, chloroneb, chloropicrin, chlorothalonil, chlorozolinate, chlozolinate, climbazole, clotrimazole, clozylacon, copper containing compounds such as copper acetate, copper carbonate, copper hydroxide, copper naphthenate, copper oleate, copper oxychloride, copper oxyquinolate, copper silicate, copper sulphate, copper tallate, copper zinc chromate and Bordeaux mixture, cresol, cufraneb, cuprobam, cuprous oxide, cyazofamid, cyclafuramid, cycloheximide, cyflufenamid, cymoxanil, cypendazole, cyproconazole, cyprodinil, dazomet, debacarb, decafentin, dehydroacetic acid, di-2-pyridyl disulphide 1,1'-dioxide, dichlofluanid, diclomezine, dichlone, dicloran, dichlorophen, dichlozoline, diclobutrazol, diclocymet, diethofencarb, difenoconazole, difenzoquat, diflumetorim, O-di-iso-propyl-S-benzyl thiophosphate, dimefluazole, dimetachlone, dimetconazole, dimethomorph, dimethirimol, diniconazole, diniconazole-M, dinobuton, dinocap, dinocton, dinopenton, dinosulfon, dinoterbon, diphenylamine, dipyrithione, disulfiram, ditalimfos, dithianon, dithioether, dodecyl dimethyl ammonium chloride, dodemorph, dodicin, dodine, doguadine, drazoxolon, edifenphos, enestroburin, epoxiconazole, etaconazole, etem, ethaboxam, ethirimol, ethoxyquin, ethilicin, ethyl (Z)-N-benzyl-N([methyl (methyl-thioethylideneamino-oxycarbonyl) amino] thio)^-alaninate, etridiazole, famoxadone, fenamidone, fenaminosulf, fenapanil, fenarimol, fenbuconazole, fenfuram, fenhexamid, fenitropan, fenoxanil, fenpiclonil, fenpicoxamid, fenpropidin, fenpropimorph, fenpyrazamine, fentin acetate, fentin hydroxide, ferbam, ferimzone, fluazinam, fludioxonil, flumetover, flumorph, flupicolide, fluopyram, fluoroimide, fluotrimazole, fluoxastrobin, fluquinconazole, flusilazole, flusulfamide, flutanil, flutolanil, flutriafol, fluxapyroxad, folpet, formaldehyde, fosetyl, fuberidazole, furalaxyl, furametpyr, furcarbanil, furconazole, furfural, furmecyclox, furophanate, glyodin, griseofulvin, guazatine, halacrinate, hexa chlorobenzene, hexachlorobutadiene, hexachlorophene, hexaconazole, hexylthiofos, hydrargaphen, hydroxyisoxazole, hymexazole, imazalil, imazalil sulphate, imibenconazole, iminoctadine, iminoctadine triacetate, inezin, iodocarb, ipconazole, ipfentrifluconazole, iprobenfos, iprodione, iprovalicarb, isopropanyl butyl carbamate, isoprothiolane, isopyrazam, isotianil, isovaledione, izopamfos, kasugamycin, kresoximmethyl, LY186054, LY211795, LY248908, mancozeb, mandipropamid, maneb, mebenil, mecarbinzid, mefenoxam, mefentrifluconazole, mepanipyrim, mepronil, mercuric chloride, mercurous chloride, meptyldinocap, metalaxyl, metalaxyl-M, metam, metazoxolon, metconazole, methasulfocarb, methfuroxam, methyl bromide, methyl iodide, methyl isothiocyanate, metiram, metiram-zinc, metominostrobin, metrafenone, metsulfovax, milneb, moroxydine, myclobutanil, myclozolin, nabam, natamycin, neoasozin, nickel dimethyldithiocarbamate, nitrostyrene, nitrothalisopropyl, nuarimol, octhilinone, ofurace, organomercury compounds, orysastrobin, osthol, oxadixyl, oxasulfuron, oxathiapiprolin, oxine-copper, oxolinic acid, oxpoconazole, oxycarboxin, parinol, pefurazoate, penconazole, pencycuron, penflufen, pentachlorophenol, penthiopyrad, phenamacril, phenazin oxide, phosdiphen, phosetyl-Al, phosphorus acids, phthalide, picoxystrobin, piperalin, polycarbamate, polyoxin D, polyoxrim, polyram, probenazole, prochloraz, procymidone, propamidine, propamocarb, propiconazole, propineb, propionic acid, proquinazid, prothiocarb, prothioconazole, pydiflumetofen, pyracarbolid, pyraclostrobin, pyrametrostrobin, pyraoxystrobin, pyrazophos, pyribencarb, pyridinitril, pyrifenox, pyrimethanil, pyriofenone, pyroquilon, pyroxychlor, pyroxyfur, pyrrolnitrin, quaternary ammonium compounds, quinacetol, quinazamid, quinconazole, quinomethionate, quinoxyfen, quintozene, rabenzazole, santonin, sedaxane, silthiofam, simeconazole, sipconazole, sodium pentachlorophenate, spiroxamine, streptomycin, sulphur, sultropen, tebuconazole, tebfloquin, tecloftalam, tecnazene, tecoram, tetraconazole, thiabendazole, thiadifluor, thicyofen, thifluzamide, 2-(thiocyanomethylthio) benzothiazole, thiophanate-methyl, thioquinox, thiram, tiadinil, timibenconazole, tioxymid, tolclofos-methyl, tolylfluanid, triadimefon, triadimenol, triamiphos, triarimol, triazbutil, triazoxide, tricyclazole, tridemorph, trifloxystrobin, triflumazole, triforine, triflumizole, triticonazole, uniconazole, urbacide, validamycin, valifenalate, vapam, vinclozolin, zarilamid, zineb, ziram, and zoxamide.

The agricultural compounds useful in the dressings applied according to the invention may also be used in combination with anthelmintic agents. Such anthelmintic agents include, compounds selected from the macrocyclic lactone class of compounds such as ivermectin, avermectin, abamectin, emamectin, eprinomectin, doramectin, selamectin, moxidectin, nemadectin and milbemycin derivatives as described in EP-357460, EP-444964 and EP-594291. Additional anthelmintic agents include semisynthetic and biosynthetic avermectin/milbemycin derivatives such as those described in U.S. Pat. No. 5,015,630, WO-9415944 and WO-9522552. Additional anthelmintic agents include the benzimidazoles such as albendazole, cambendazole, fenbendazole, flubendazole, mebendazole, oxfendazole, oxibendazole, parbendazole, and other members of the class. Additional anthelmintic agents include imidazothiazoles and tetrahydropyrimidines such as tetramisole, levamisole, pyrantel pamoate, oxantel or morantel. Additional anthelmintic agents include flukicides, such as triclabendazole and clorsulon and the cestocides, such as praziquantel and epsiprantel.

The compounds of the invention may be used in combination with derivatives and analogues of the paraherquamide/marcfortine class of anthelmintic agents, as well as the antiparasitic oxazolines such as those disclosed in U.S. Pat. Nos. 5,478,855, 4,639,771 and DE-19520936.

Non-limiting examples of suitable additional active ingredients also include the following: derivatives and analogues of the general class of dioxomorpholine antiparasitic agents as described in WO 96/15121 and also with anthelmintic active cyclic depsipeptides such as those described in WO 96/11945, WO 93/19053, WO 93/25543, EP 0 626 375, EP 0 382 173, WO 94/19334, EP 0 382 173, and EP 0 503 538. The compounds of the invention may be used in combination with other ectoparasiticides; for example, fipronil; pyrethroids; organophosphates; insect growth regulators such as lufenuron; ecdysone agonists such as tebufenozide and the like; neonicotinoids such as imidacloprid and the like.

The compounds of the invention may be used in combination with terpene alkaloids, for example those described in International Patent Application Publication Numbers WO 95/19363 or WO 04/72086, particularly the compounds disclosed therein.

Other examples of such biologically active agricultural compounds that may be used in combination with include but are not restricted to the following: Organophosphates include acephate, azamethiphos, azinphos-ethyl, azinphos-methyl, bromophos, bromophos-ethyl, cadusafos, chlorethoxyphos, chlorpyrifos, chlorfenvinphos, chlormephos, demeton, demeton-S-methyl, demeton-S-methyl sulphone, dialifos, diazinon, dichlorvos, dicrotophos, dimethoate, disulfoton, ethion, ethoprophos, etrimfos, famphur, fenamiphos, fenitrothion, fensulfothion, fenthion, flupyrazofos, fonofos, formothion, fosthiazate, heptenophos, isazophos, isothioate, isoxathion, malathion, methacriphos, methamidophos, methidathion, methyl-parathion, mevinphos, monocrotophos, naled, omethoate, oxydemeton-methyl, paraoxon, parathion, parathion-methyl, phenthoate, phosalone, phosfolan, phosphocarb, phosmet, phosphamidon, phorate, phoxim, pirimiphos, pirimiphosmethyl, profenofos, propaphos, proetamphos, prothiofos, pyraclofos, pyridapenthion, quinalphos, sulprophos, temephos, terbufos, tebupirimfos, tetrachlorvinphos, thimeton, triazophos, trichlorfon, vamidothion. Exemplary additional carbamates include alanycarb, aldicarb, 2-sec-butylphenyl methylcarbamate, benfuracarb, carbaryl, carbofuran, carbosulfan, cloethocarb, ethiofencarb, fenoxycarb, fenthiocarb, furathiocarb, HCN-801, isoprocarb, indoxacarb, methiocarb, methomyl, 5-methyl-m-cumenylbutyryl(methyl)carbamate, oxamyl, pirimicarb, propoxur, thiodicarb, thiofanox, triazamate, UC-51717. Exemplary additional pyrethroids may include acrinathin, allethrin, alphametrin, 5-benzyl-3-furylmethyl (E)-(1 R)-cis-2,2-dimethyl-3-(2-oxothiolan-3-ylidenemethyl)cyclopropanecarboxylate, bifenthrin, beta-cyfluthrin, cyfluthrin, a-cypermethrin, beta-cypermethrin, bioallethrin, bioallethrin((S)-cyclopentylisomer), bioresmethrin, bifenthrin, NCI-85193, cycloprothrin, cyhalothrin, cythithrin, cyphenothrin, deltamethrin, empenthrin, esfenvalerate, ethofenprox, fenfluthrin, fenpropathrin, fenvalerate, flucythrinate, flumethrin, fluvalinate (D isomer), imiprothrin, cyhalothrin, lambda-cyhalothrin, permethrin, phenothrin, prallethrin, pyrethrins (natural products), resmethrin, tetramethrin, transfluthrin, theta-cypermethrin, silafluofen, t-fluvalinate, tefluthrin, tralomethrin, and Zeta-cypermethrin.

Exemplary additional arthropod growth regulators may include a) chitin synthesis inhibitors: benzoylureas: chlorfluazuron, diflubenzuron, fluazuron, flucycloxuron, flufenoxuron, hexaflumuron, lufenuron, novaluron, teflubenzuron, triflumuron, buprofezin, diofenolan, hexythiazox, etoxazole, chlorfentazine; b) ecdysone antagonists: halofenozide, methoxyfenozide, tebufenozide; c) juvenoids: pyriproxyfen, methoprene (including S-methoprene), fenoxycarb; d) lipid biosynthesis inhibitors: spirodiclofen.

Other exemplary additional antiparasitic compounds may include acequinocyl, amitraz, AKD-1022, ANS-1 18, azadirachtin, bensultap, bifenazate, binapacryl, bromopropylate, BTG-504, BTG-505, camphechlor, cartap, chlorobenzilate, chlordimeform, chlorfenapyr, chromafenozide, clothianidine, cyromazine, diacloden, diafenthiuron, DBI-3204, dinactin, dihydroxymethyldihydroxypyrrolidine, dinobuton, dinocap, endosulfan, ethiprole, ethofenprox, fenazaquin, flumite, MTI-800, fenpyroximate, fluacrypyrim, flubenzimine, flubrocythrinate, flufenzine, flufenprox, fluproxyfen, halofenprox, hydramethylnon, IKI-220, kanemite, NC-196, neem guard, nidinorterfuran, nitenpyram, SD-35651, WL-108477, pirydaryl, propargite, protrifenbute, pymethrozine, pyridaben, pyrimidifen, NC-1 1 1 1, R-195, RH-0345, RH-2485, RYI-210, S-1283, S-1833, SI-8601, silafluofen, silomadine, spinosad, tebufenpyrad, tetradifon, tetranactin, thiacloprid, thiocyclam, thiamethoxam, tolfenpyrad, triazamate, triethoxyspinosyn, trinactin, verbutin, vertalec, YI-5301. The at least one 2,4-(substituted aromatic)-1,3-oxazoline compound and the at least one additional pesticide may, for example, be present in a weight ratio of from about 1:100 to about 100:1. Additional insecticide compound may be used for the same pesticidal activity as the at least one 2,4-(substituted aromatic)-1,3-oxazoline compound (e.g., to control insects of a particular Order, Family, Genus, Species, etc.), or may be used for a different pesticidal activity (e.g., to control insects of a different Order, Family, Genus, Species, etc.). Non-limiting examples of suitable insecticides that may be used as the at least one additional pesticide include: antibiotic insecticides, such as allosamidin and thuringiensin; macrocyclic lactone insecticides, such as spinosad, spinetoram, and other spinosyns including the 21-butenyl spinosyns and their derivatives; avermectin insecticides, such as abamectin, doramectin, emamectin, eprinomectin, ivermectin and selamectin; milbemycin insecticides, such as lepimectin, milbemectin, milbemycin oxime and moxidectin; arsenical insecticides, such as calcium arsenate, copper acetoarsenite, copper arsenate, lead arsenate, potassium arsenite and sodium arsenite; biological insecticides such as *Bacillus popilliae, B. sphaericus, B. thuringiensis* subsp. *aizawai, B. thuringiensis* subsp. *kurstaki, B. thuringiensis* subsp. *tenebrionis, Beauveria bassiana, Cydia pomonella granulosis* virus; *Bacillus thuringiensis* delta endotoxin, baculovirus, entomopathogenic bacteria, virus and fungi; Douglas fir tussock moth NPV, gypsy moth NPV, *Helicoverpa zea* NPV, Indian meal moth *granulosis* virus, *Metarhizium anisopliae, Nosema locustae, Paecilomyces fumosoroseus, P. lilacinus, Photorhabdus luminescens, Spodoptera exigua* NPV, trypsin modulating oostatic factor, *Xenorhabdus nematophilus*, and *X. bovienii*, plant incorporated protectant insecticides such as Cry1Ab, Cry1Ac, Cry1F, Cry1A.105, Cry2Ab2, Cry3A, mir Cry3A, Cry3Bb1, Cry34, Cry35, and VIP3A; botanical insecticides, such as anabasine, azadirachtin, d-limonene, nicotine, pyrethrins, cinerins, cinerin I, cinerin II, jasmolin I, jasmolin II, pyrethrin I, pyrethrin II, quassia, rotenone, ryania and sabadilla; carbamate insecticides such as bendiocarb and carbaryl; benzofuranyl methylcarbamate insecticides, such as benfuracarb, carbofuran, carbosulfan, decarbofuran and furathiocarb; dimethylcarbamate insecticides dimitan, dimetilan, hyquincarb and pirimicarb; oxime carbamate insecticides, such as alanycarb, aldicarb, aldoxycarb, butocarboxim, butoxycarboxim, methomyl, nitrilacarb, oxamyl, tazimcarb, thiocarboxime, thiodicarb and thiofanox; phenyl methylcarbamate insecticides, such as allyxycarb, aminocarb, bufencarb, butacarb, carbanolate, cloethocarb, dicresyl, dioxacarb, EMPC, ethiofencarb, fenethacarb, fenobucarb, isoprocarb, methiocarb, metolcarb, mexacarbate, promacyl, promecarb, propoxur, trimethacarb, XMC and xylylcarb; dinitrophenol insecticides, such as dinex, dinoprop, dinosam and DNOC; fluorine insecticides, such as barium hexafluorosilicate, cryolite, sodium fluoride, sodium hexafluorosilicate and sulfluramid; formamidine insecticides, such as amitraz, chlordimeform, formetanate and formparanate; fumigant insecticides, such as acrylonitrile, carbon disulfide, carbon tetrachloride, chloroform, chloropicrin, para-dichlorobenzene, 1,2-dichloropropane, ethyl formate, ethylene dibromide, ethylene dichloride, ethylene oxide, hydrogen cyanide, iodomethane, methyl bromide, methylchloroform, methylene chloride, naphthalene, phosphine, sulfuryl fluoride and tetrachloroethane; inorganic insecticides, such as borax, calcium polysulfide, copper oleate, mercurous chloride, potassium thiocyanate and sodium thiocyanate; chitin synthesis inhibitors such as bistrifluoron, buprofezin, chlorfluazuron, cyromazine, diflubenzuron, flucycloxuron, flufenoxuron, hexaflumuron, lufenuron, novaluron, noviflumuron, penfluoron, teflubenzuron and triflumuron; juvenile hormone mimics, such as epofenonane, fenoxycarb, hydroprene, kinoprene, methoprene, pyriproxyfen and triprene; juvenile hormones such as juvenile hormone I, juvenile hormone II and juvenile hormone III; moulting hormone agonists, such as chromafenozide, halofenozide, methoxyfenozide and tebufenozide; moulting hormones such as α-ecdysone and ecdysterone; moulting inhibitors, such as diofenolan; precocenes, such as precocene I, precocene II and precocene III; unclassified insect growth regulators, such as dicyclanil; nereistoxin analogue insecticides, such as bensultap, cartap, thiocyclam and thiosultap; nicotinoid insecticides, such as flonicamid; nitroguanidine insecticides, such as clothianidin, dinotefuran, imidacloprid and thiamethoxam; aminofuranone neonicotinoids such as BYI-02960; semisynthetic fermentation products such as cypropen; nitromethylene insecticides, such as nitenpyram and nithiazine; pyridylmethylamine insecticides, such as acetamiprid, imidacloprid, nitenpyram and thiacloprid; organochlorine insecticides, such as bromo-DDT, camphechlor, DDT, pp'-DDT, ethyl-DDD, HCH, gamma-HCH, lindane, methoxychlor, pentachlorophenol and TDE; cyclodiene insecticides such as aldrin, bromocyclen, chlorbicyclen, chlordane, chlordecone, dieldrin, dilor, endosulfan, endrin, HEOD, heptachlor, HHDN, isobenzan, isodrin, kelevan and mirex; organophosphate insecticides, such as bromfenvinfos, chlorfenvinphos, crotoxyphos, dichlorvos, dicrotophos, dimethylvinphos, fospirate, heptenophos, methocrotophos, mevinphos, monocrotophos, naled, naftalofos, phosphamidon, propaphos, TEPP and tetrachlorvinphos; organothiophosphate insecticides, such as dioxabenzofos, fosmethilan and phenthoate; aliphatic organothiophosphate insecticides, such as acethion, amiton, cadusafos, chlorethoxyfos, chlormephos, demephion, demephion-O, demephion-S, demeton, demeton-O, demeton-S, demeton-methyl, demeton-O-methyl, demeton-S-methyl, demeton-S-methylsulphon, disulfoton, ethion, ethoprophos, IPSP, isothioate, malathion, methacrifos, oxydemetonmethyl, oxydeprofos, oxydisulfoton, phorate, sulfotep, terbufos and thiometon; aliphatic amide organothiophosphate insecticides, such as amidithion, cyanthoate, dimethoate, ethoate-methyl, formothion, mecarbam, omethoate, prothoate, sophamide and vamidothion; oxime organothiophosphate insecticides, such as chlorphoxim, phoxim and phoxim-methyl; heterocyclic organothiophosphate insecticides, such as azamethiphos, coumaphos, coumithoate, dioxathion, endothion, menazon, morphothion, phosalone, pyraclofos, pyridaphenthion and quinothion; benzothiopyran organothiophosphate insecticides, such as dithicrofos and thicrofos; benzotriazine organothiophosphate insecticides such as azinphos-ethyl and azinphos-methyl; isoindole organothiophosphate insecticides, such as dialifos and phosmet; isoxazole organothiophosphate insecticides, such as isoxathion and zolaprofos; pyrazolopyrimidine organothiophosphate insecticides, such as chlorprazophos and pyrazophos; pyridine organothiophosphate insecticides, such as chlorpyrifos and chlorpyrifos-methyl; pyrimidine organothiophosphate insecticides, such as butathiofos, diazinon, etrimfos, lirimfos, pirimiphos-ethyl, pirimiphos-methyl, primidophos, pyrimitate and tebupirimfos; quinoxaline organothiophosphate insecticides, such as quinalphos and quinalphos-methyl; thiadiazole organothiophosphate insecticides, such as athidathion, lythidathion, methidathion and prothidathion; triazole organothiophosphate insecticides, such as isazofos and triazophos; phenyl organothiophosphate insecticides, such as azothoate, bromophos, bromophos-ethyl, carbophenothion, chlorthiophos, cyanophos, cythioate, dicapthon, dichlofenthion, etaphos, famphur, fenchlorphos, fenitrothion fensulfothion, fenthion, fenthion-ethyl, heterophos, jodfenphos, mesulfenfos, parathion, parathion-methyl, phenkapton, phosnichlor, profenofos, prothiofos, sulprofos, temephos, trichlormetaphos-3 and trifenofos; phosphonate insecticides, such as butonate and trichlorfon; phosphonothioate insecticides, such as mecarphon; phenyl ethylphosphonothioate insecticides, such as fonofos and trichloronat; phenyl phenylphosphonothioate insecticides, such as cyanofenphos, EPN and leptophos; phosphoramidate insecticides such as crufomate, fenamiphos, fosthietan, mephosfolan, phosfolan and pirimetaphos; phosphoramidothioate insecticides such as acephate, isocarbophos, isofenphos, methamidophos and propetamphos; phosphorodiamide insecticides, such as dimefox, mazidox, mipafox and schradan; oxadiazine insecticides, such as indoxacarb; phthalimide insecticides, such as dialifos, phosmet and tetramethrin; pyrazole insecticides, such as acetoprole, ethiprole, fipronil, pyrafluprole, pyriprole, tebufenpyrad, tolfenpyrad and vaniliprole; pyrethroid ester insecticides, such as acrinathrin, allethrin, bioallethrin, barthrin, bifenthrin, bioethanomethrin, cyclethrin, cycloprothrin, cyfluthrin, beta-cyfluthrin, cyhalothrin, gamma-cyhalothrin, lambda-cyhalothrin, cypermethrin, alpha-cypermethrin, beta-cypermethrin, theta-cypermethrin, zeta-cypermethrin, cyphenothrin, deltamethrin, dimefluthrin, dimethrin, empenthrin, fenfluthrin, fenpirithrin, fenpropathrin, fenvalerate, esfenvalerate, flucythrinate, fluvalinate, tau-fluvalinate, furethrin, imiprothrin, metofluthrin, permethrin, biopermethrin, transpermethrin, phenothrin, prallethrin, profluthrin, pyresmethrin, resmethrin, bioresmethrin, cismethrin, tefluthrin, terallethrin, tetramethrin, tralomethrin and transfluthrin; pyrethroid ether insecticides, such as etofenprox, flufenprox, halfenprox, protrifenbute and silafluofen; pyrimidinamine insecticides, such as flufenerim and pyrimidifen; pyrrole insecticides, such as chlorfenapyr; tetronic acid insecticides, such as spirodiclofen, spiromesifen and spirotetramat; thiourea insecticides such as diafenthiuron; urea insecticides, such as flucofuron and sulcofuron; and unclassified insecticides, such as AKD-3088, closantel, crotamiton, cyflumetofen, EXD, fenazaflor, fenazaquin, fenoxacrim, fenpyroximate, FKI-1033, flubendiamide, cyazypyr (cyantraniliprole), hydramethylnon, IKI-2002, isoprothiolane, malonoben, metaflumizone, metoxadiazone, nifluridide, NNI-9850, NNI-0101 (pyrifluquinazon), pymetrozine, pyridaben, pyridalyl, Qcide, rafoxanide, rynaxypyr (chlorantraniliprole), SYJ-159, sulfoxaflor, triarathene, and triazamate, and any combinations thereof.

Generally, the liquid dressing compositions described herein may also comprise any adjuvants, excipients, or other desirable components known in the art. For example, in some embodiments, the treatment composition further comprises a surfactant.

In these compositions, the active ingredient is employed in pure form, a solid active ingredient for example in a specific particle size, or, preferably, together with—at least—one of the auxiliaries conventionally used in the art of formulation, such as extenders, for example solvents or solid carriers, or such as surface-active compounds (surfactants). Examples of suitable solvents or diluents are water, unhydrogenated or partially hydrogenated aromatic hydrocarbons, preferably the fractions $C_5$ to $C_{12}$ of alkylbenzenes, such as xylene mixtures, alkylated naphthalenes or tetrahydronaphthalene, aliphatic or cycloaliphatic hydrocarbons, such as paraffins or cyclohexane, alcohols such as ethanol, propanol or butanol, glycols and their ethers and esters such as propylene glycol, dipropylene glycol ether, ethylene glycol or ethylene glycol monomethyl ether or ethylene glycol monoethyl ether, ketones, such as cyclohexanone, isophorone or diacetone alcohol, strongly polar solvents, such as N-methylpyrrolid-2-one, dimethyl sulfoxide or N,N-dimethylformamide, water, unepoxidized or epoxidized vegetable oils, such as unexpodized or epoxidized rapeseed, castor, coconut or soya oil, and silicone oils.

Suitable surface-active compounds are, depending on the type of the active ingredient to be formulated, non-ionic, cationic and/or anionic surfactants or surfactant mixtures which have good emulsifying, dispersing and wetting properties. The surfactants mentioned below are only to be considered as examples; a large number of further surfactants which are conventionally used in the art of formulation and suitable according to the invention are described in the relevant literature.

Suitable non-ionic surfactants are, especially, polyglycol ether derivatives of aliphatic or cycloaliphatic alcohols, of saturated or unsaturated fatty acids or of alkyl phenols which may contain approximately 3 to approximately 30 glycol ether groups and approximately 8 to approximately 20 carbon atoms in the (cyclo)aliphatic hydrocarbon radical or approximately 6 to approximately 18 carbon atoms in the alkyl moiety of the alkyl phenols. Also suitable are water-soluble polyethylene oxide adducts with polypropylene glycol, ethylenediaminopolypropylene glycol or alkyl polypropylene glycol having 1 to approximately 10 carbon atoms in the alkyl chain and approximately 20 to approximately 250 ethylene glycol ether groups and approximately 10 to approximately 100 propylene glycol ether groups.

Normally, the abovementioned compounds contain 1 to approximately 5 ethylene glycol units per propylene glycol unit. Examples which may be mentioned are nonylphenoxypolyethoxyethanol, castor oil polyglycol ether, polypropylene glycol/polyethylene oxide adducts, tributylphenoxypolyethoxyethanol, polyethylene glycol or octylphenoxypolyethoxyethanol. Also suitable are fatty acid esters of polyoxyethylene sorbitan, such as polyoxyethylene sorbitan trioleate. The cationic surfactants are, especially, quarternary ammonium salts which generally have at least one alkyl radical of from $C_8$ to $C_{22}$ carbon atoms as substituents and as further substituents (unhalogenated or halogenated) lower alkyl or hydroxyalkyl or benzyl radicals. The salts are preferably in the form of halides, methylsulfates or ethylsulfates. Examples are stearyltrimethylammonium chloride and benzylbis(2-chloroethyl)ethylammonium bromide.

Examples of suitable anionic surfactants are water-soluble soaps or water-soluble synthetic surface-active compounds. Examples of suitable soaps are the alkali, alkaline earth or (unsubstituted or substituted) ammonium salts of fatty acids having approximately $C_{10}$ to $C_{22}$ carbon atoms as substituents, such as the sodium or potassium salts of oleic or stearic acid, or of natural fatty acid mixtures which are obtainable for example from coconut or tall oil; mention must also be made of the fatty acid methyl taurates. However, synthetic surfactants are used more frequently, in particular fatty sulfonates, fatty sulfates, sulfonated benzimidazole derivatives or alkylaryl sulfonates. As a rule, the fatty sulfonates and fatty sulfates are present as alkali, alkaline earth or (substituted or unsubstituted) ammonium salts and they generally have an alkyl radical of $C_8$ to $C_{22}$ carbon atoms as substituents, alkyl also to be understood as including the alkyl moiety of acyl radicals; examples which may be mentioned are the sodium or calcium salts of lignosulfonic acid, of the dodecylsulfuric ester or of a fatty alcohol sulfate mixture prepared from natural fatty acids. This group also includes the salts of the sulfuric esters and sulfonic acids of fatty alcohol/ethylene oxide adducts. The sulfonated benzimidazole derivatives preferably contain 2 sulfonyl groups and a fatty acid radical of approximately 8 to approximately 22 C atoms. Examples of alkylarylsulfonates are the sodium, calcium or triethanolammonium salts of decylbenzenesulfonic acid, of dibutylnaphthalenesulfonic acid or of a naphthalenesulfonic acid/formaldehyde condensate. Also possible are, furthermore, suitable phosphates, such as salts of the phosphoric ester of a p-nonylphenol/(4-14)ethylene oxide adduct, or phospholipids.

As a rule, the dressing compositions may comprise 0.1 to 99%, especially 0.1 to 95%, of active ingredient and 1 to 99.9%, especially 5 to 99.9%, of at least one solid or liquid adjuvant, it being possible as a rule for 0 to 25%, especially 0.1 to 20%, of the composition to be surfactants (% in each case meaning percent by weight).

Whereas concentrated compositions, also referred to as pre-mix formulations tend to be preferred for cartridge use, also dilute compositions which have substantially lower concentrations of active ingredient may be employed as ready-to-use, or so-called tank mix compounds.

Suitable pre-mix formulations for seed application may comprise 0.1 to 99.9%, especially 1 to 95%, of the desired ingredients, and 99.9 to 0.1%, especially 99 to 5%, of a solid or liquid adjuvant or diluent, including, for example, a solvent or diluent such as water, whereby auxiliary components may include surfactants in an amount of from 0 to 50%, especially 0.5 to 40%, based on the pre-mix formulation. Preferably, a formulation for seed treatment application comprises 0.25 to 80%, especially 1 to 75%, of the desired ingredients, and 99.75 to 20%, especially 99 to 25%, of a solid or liquid auxiliary compounds, including, for example, a diluent such as water, with auxiliary compounds such as surfactants in an amount of from 0 to 40%, especially 0.5 to 30%, based on the tank-mix formulation. Advantageously, a pre-mix formulation for seed treatment application may comprises 0.5 to 99.9%, especially 1 to 95%, of the desired ingredients, and 99.5 to 0.1%, especially 99 to 5%, of a solid or liquid adjuvant, including, for example, a diluents such as water, whereby the auxiliary compounds such as surfactants in an amount of 0 to 50%, especially 0.5 to 40%, based on the pre-mix formulation.

In general, the pre-mix compositions used in the subject process may contain 0.5 to 99.9 especially 1 to 95, advantageously 1 to 50%, by mass of the desired ingredients, and 99.5 to 0.1, especially 99 to 5%, by mass of a solid or liquid adjuvant, including, for example, a solvent or diluent such as water, and auxiliary compounds such as surfactants in an amount of from 0 to 50, especially of from 0.5 to 40%, by mass based on the mass of the pre-mix formulation. Preferably, the composition may comprise 0.1 to 99%, especially 0.1 to 95%, of active ingredient and 1 to 99.9%, especially 5 to 99.9%, of at least one solid or liquid adjuvant, it being possible as a rule for 0 to 25%, especially 0.1 to 20%, of the composition to be surfactants (% in each case meaning percent by weight). Whereas concentrated compositions tend to be preferred for commercial goods, the end consumer as a rule uses dilute compositions which have substantially lower concentrations of active ingredient.

A formulation for seed treatment application at the nozzle comprises 0.25 to 80%, especially 1 to 75%, of the desired ingredients, and 99.75 to 20%, especially 99 to 25%, of a solid or liquid auxiliaries (including, for example, a solvent such as water), where the auxiliaries can be a surfactant in an amount of 0 to 40%, especially 0.5 to 30%, based on the tank-mix formulation.

Typically, a pre-mix formulation as present in a cartridge for seed treatment application may comprise 0.5 to 99.9%, especially 1 to 95%, of the desired ingredients, and 99.5 to 0.1%, especially 99 to 5%, of a solid or liquid adjuvant (including, for example, a solvent such as water), where the auxiliaries can be a surfactant in an amount of 0 to 50%, especially 0.5 to 40%, based on the pre-mix formulation.

Examples of anionic surfactants include alkyl sulfates, alcohol sulfates, alcohol ether sulfates, alpha olefin sulfonates, alkylaryl ether sulfates, arylsulfonates, alkylsulfonates, alkylaryl sulfonates, sulfosuccinates, mono- or diphosphate esters of polyalkoxylated alkyl alcohols or alkyl phenols, mono- or disulfosuccinate esters of alcohols or polyalkoxylated alkanols, alcohol ether carboxylates, phenol ether carboxylates. In one embodiment, the surfactant is an alkylaryl sulfonate.

Examples of non-ionic surfactants include sorbitan esters, ethoxylated sorbitan esters, alkoxylated alkylphenols, alkoxylated alcohols, block copolymer ethers, and lanolin derivatives. In accordance with one embodiment, the surfactant comprises an alkylether block copolymer.

Non-limiting examples of cationic surfactants include mono alkyl quaternary amine, fatty acid amide surfactants, amidoamine, imidazoline, and polymeric cationic surfactants.

In some embodiments, the treatment composition comprises a co-solvent in addition to diluent such as water. Non-limiting examples of co-solvents that can be used include ethyl lactate, methyl soyate/ethyl lactate co-solvent blends (e.g., STEPOSOL, available from Stepan), isopropanol, acetone, 1,2-propanediol, n-alkylpyrrolidones (e.g., the AGSOLEX series, available from ISP), a petroleum based-oil (e.g., AROMATIC series and SOLVESSO series available from Exxon Mobil), isoparaffinic fluids (e.g. ISOPAR series, available from Exxon Mobil), cycloparaffinic fluids (e.g. NAPPAR 6, available from Exxon Mobil), mineral spirits (e.g. VARSOL series available from Exxon Mobil), and mineral oils (e.g., paraffin oil).

The liquid seed treatment composition may also be in the form of an aqueous slurry comprising one or more dispersed solid phases and a continuous aqueous phase. In some instances, the liquid seed treatment composition further comprises a dispersed liquid organic phase. For example, the composition may be in the form of an aqueous suspension concentrate.

Where the dressing formulation is to be applied to the at least one seed or pant propagation material as an emulsion, the emulsifiable concentrate pre-mix may include the at least one 2,4-(substituted aromatic)-1,3-oxazoline compound, and at least one liquid carrier. The at least one 2,4-(substituted aromatic)-1,3-oxazoline compound may be substantially dissolved in the at least one liquid carrier. The emulsifiable concentrate may, optionally, include at least one emulsifier at a concentration within a range of from about 1 percent by weight to about 30 percent by weight. As used herein, the term "emulsifier" means and includes a material that stabilizes a suspension of droplets of one liquid phase in another liquid phase. The at least one emulsifier may be non-ionic, anionic, cationic, or a combination thereof. Non-limiting examples of non-ionic emulsifiers include polyalkylene glycol ethers and condensation products of alkyl and aryl phenols, aliphatic alcohols, aliphatic amines or fatty acids with ethylene oxide, propylene oxides such as the ethoxylated alkyl phenols, and carboxylic esters solubilized with the polyol or polyoxyalkylene. Non-limiting examples of anionic emulsifiers include oil-soluble salts (e.g., calcium) of alkylaryl sulphonic acids, oil-soluble salts, sulfated polyglycol ethers, and salts of phosphated polyglycol ether. Non-limiting examples of cationic emulsifiers include quaternary ammonium compounds, and fatty amine salts. The emulsifiable concentrate may also contain other compatible additives, such as plant growth regulators and other biologically active compounds used in agriculture. A concentration of the at least one 2,4-(substituted aromatic)-1,3-oxazoline compound in the emulsifiable concentrate may, for example, be within a range of from about 10 percent by weight to about 50 percent by weight. In one or more embodiments, the emulsifiable concentrate may be diluted with water and oil to form spray mixtures in the form of oil-in-water emulsions.

If, for example, the formulation is applied to the at least one seed as an aqueous suspension, the aqueous suspension may include the at least one 2,4-(substituted aromatic)-1,3-oxazoline compound dispersed in an aqueous liquid carrier (e.g., water). A concentration of the at least one 2,4-(substituted aromatic)-1,3-oxazoline compound in the aqueous suspension may be within a range from about 5 to about 50 weight percent. The aqueous suspension may be prepared by finely grinding the at least one 2,4-(substituted aromatic)-1,3-oxazoline compound, and mixing the at least one 2,4-(substituted aromatic)-1,3-oxazoline compound into the aqueous liquid carrier. The aqueous suspension may, optionally, include at least one surfactant that may aid in the formation and/or the stabilization of the aqueous suspension. Other materials, such as inorganic salts and synthetic or natural gums, may be added to increase one or more of the density and the viscosity of the aqueous suspension.

Non-limiting examples of suitable water-immiscible solvents include aromatic hydrocarbons derived from benzene, such as toluene, xylenes, other alkylated benzenes and the like, and naphthalene derivatives, aliphatic hydrocarbons such as hexane, octane, cyclohexane, and the like, mineral oils from the aliphatic or isoparaffinic series, and mixtures of aromatic and aliphatic hydrocarbons; halogenated aromatic or aliphatic hydrocarbons; vegetable, seed or animal oils such as soybean oil, rape seed oil, olive oil, castor oil, sunflower seed oil, coconut oil, corn oil, cotton seed oil, linseed oil, palm oil, peanut oil, safflower oil, sesame oil, tung oil and the like, and $C_1$-$C_6$ mono-esters derived from vegetable, seed or animal oils; $C_1$-$C_6$ dialkyl amides of $C_6$-$C_{20}$ saturated and unsaturated aliphatic carboxylic acids, such as, N-N-dimethyl alkyl amide; $C_1$-$C_{12}$ esters of aromatic carboxylic acids and dicarboxylic acids and $C_1$-$C_{12}$ esters of aliphatic and cycloaliphatic carboxylic acids; $C_4$-$C_{12}$ polyesters of dihydric, trihydric, or other lower polyalcohols such as, propylene glycol dioleate, di-octyl succinate, di-butyl adipate, di-octyl phthalate and the like. The aqueous emulsion may be prepared by emulsifying the at least one 2,4-(substituted aromatic)-1,3-oxazoline compound or a water-immiscible solution thereof into the aqueous liquid carrier. The aqueous emulsion may, optionally, include at least one surfactant that may aid in the formation and/or the stabilization of the aqueous emulsion.

The at least one adjuvant material, may also comprise one or more conventional adjuvants used in the agricultural sciences art including, but not limited to, a wetting agent, a dispersant, a binder, a penetrant, a fertilizer, a growth regulator, a buffer, a dye, a sequestering agent, a drift reduction agent, a compatibility agent, a viscosity regulator, an anti-foam agent, a cleaning agent, a surfactant, an emulsifier, combinations thereof, and the like. Suitable adjuvant materials are well known in the agricultural sciences art (e.g., see "Chemistry and Technology of Agrochemical Formulations" edited by D. A. Knowles, copyright 1998 by Kluwer Academic Publishers; also see "Insecticides in Agriculture and Environment-Retrospects and Prospects" by A. S. Perry, I. Yamamoto, I. Ishaaya, and R. Perry, copyright 1998 by Springer-Verlag). In at least some embodiments, the at least one adjuvant material includes at least one binder (e.g., a polyacrylate, a polymethacrylate, a polybutene, a polyisobutylene, a polyether, a polyethyleneamine, a polyethyleneamide, a polyethyleneimine, a polystyrene, a polyurethane, a polyvinylalcohol, a polyvinylpyrrolidone, polyvinylacetate, copolymers derived from such polymers, and combinations thereof) that may enhance the adhesion of the at least one 2,4-(substituted aromatic)-1,3-oxazoline compound to the at least one seed or plant propagation material.

The dressing composition may also comprise a binder. The binder (or any of the layers) can be molasses, granulated sugar, alginates, karaya gum, jaguar gum, tragacanth gum, polysaccharide gum, mucilage, gelatin, polyvinyl acetates, polyvinyl acetate copolymers, polyvinyl alcohols, polyvinyl alcohol copolymers, styrene acrylate polymers, styrene butadiene polymers, celluloses (including ethylcelluloses and methylcelluloses, hydroxypropylcelluloses, hydroxymethyl celluloses, hydroxymethylpropyl-celluloses), polyvinylpyrrolidones, dextrins, malto-dextrins, polysaccharides, fats, oils, proteins, gum arabics, shellacs, vinylidene chloride, vinylidene chloride copolymers, calcium lignosulfonates, acrylic copolymers, starches, derivatized starches, polyvinylacrylates, zeins, carboxymethylcellulose, chitosan, polyethylene oxide, acrylimide polymers and copolymers, polyhydroxyethyl acrylate, methylacrylimide monomers, alginate, ethylcellulose, polychloroprene, syrups or any combination thereof.

According to an embodiment of the present invention, the dressing composition may comprise a plant biostimulant. Plant biostimulants are usually components other than fertilizers that affect plant growth and/or metabolism upon foliar application or when added to soil. Plant biostimulants generally fall within one of three categories: hormone-containing products, amino acid-containing products and humic acid-containing products. Plant biostimulants are used to treat crops in a commercial setting in view of their ability to, for example, increase growth rates, decrease pest plant growth, increase stress tolerance, increase photosynthetic rate, and increase disease tolerance. Plant biostimulants are generally believed to operate by up-regulating or down-regulating plant hormones, such as Cis-jasmone, Methyl-jasmonate and Jasmonic acid.

Preferred biostimulants include extract of seaweed and fermentation product derived from melasse; extract of seaweed and fermentation product derived from melasse comprising urea, amino acids, potassium and molybdenum and EDTA-chelated manganese, extract of seaweed and fermented plant products, extract of seaweed and fermented plant products comprising phytohormones, vitamins, EDTA-chelated copper, zinc, and iron. Further agricultural compounds may include repellants, such as Peppermint oil, Chili pepper oils and/or Plant oil extracts of various species.

As used herein, the term an "underlying surface" is understood to be an agricultural soil or other cultivation medium onto which the plant propagation material, such as seeds and seedlings, are applied.

In accordance with a preferred method of carrying out the present invention, the triggerable nozzle(s) jets a droplet of dressing at a controllable rate onto seeds passing through the delivery outlet. This nozzle is so located that seeds are sprayed just after they leave the outlet. In this way, promptly after a seed is coated, seeds are substantially dry by the time they arrive in the furrow.

In a preferred embodiment, the system includes a pump for circulating treating fluid from the storage tank or the cartridges to the nozzle through a hydraulic control circuit that includes one or more pressure valves responsive to pressure in the conduit from the pump to the bypass nozzle for controlling the rate of fluid flow. When pressure in the conduit is above a predetermined value, return conduits may continuously returns fluid from the bypass nozzle to the storage or a waste storage at a controlled rate, so that a limited, but controllable amount of fluidized treating material remains available for jetting onto seeds after in the seed delivery tube. Further in accordance with the preferred form of the invention, electrically operated solenoid valves in both the supply conduit and the return conduits may activate the pressure control system, and controlled by the controller unit.

In the present invention, the device may advantageously comprise a cartridge assembly, which comprises at least one cartridge or canister comprising the at least one agricultural compound, and a computer-readable unit having information stored therein, the dispensing assembly comprising: a) a controller unit; b) a dispensing unit in communication with the controller unit and configured for generating a fluid supply flow to the application device; c) an interface unit in communication with the controller unit, the interface unit being configured to interface the computer-readable unit of the cartridge and to at least retrieve the information stored therein; wherein the dispensing unit is responsive to the information stored on the computer-readable unit and retrieved therefrom. Preferably, the controller unit and the interface unit are integral. The controller unit advantageously is configured to retrieve and to write information from and onto the computer-readable unit via the interface unit. The interface unit preferably comprises a connector or a radio-frequency transceiver, which permits control of filling levels and of application speeds and dressing composition, as well as minimizing downtime needed to refill the sowing device.

Preferably, the controller unit is also configured to control the fluid supply unit based on the information stored on the computer-readable unit and retrieved therefrom, advantageously by modulating the volume and pressure of the fluid supply unit based on the information stored on the computer-readable unit and retrieved therefrom.

Advantageously, the one or more cartridges may be configured and constructed to permit repeated removal from the device, and then either refilled with the dressing composition and then placed back into the device, more preferably, or replaced by pre-filled cartridges.

Advantageously, the one or more cartridges are each connected to a nozzle from a plurality of nozzles, through which the dressing can be applied from the cartridge to the plant materials.

Advantageously, the device may contain a plurality of the cartridges that each comprise a dressing composition, or at least one agricultural component, which may be identical or different.

The device may preferably further comprise a diluent reservoir for holding and supplying a diluent composition, and a diluent control unit for controlling the supply of the diluent composition during application. This diluent supply unit is ideally configured to supply diluent to flush the supply lines, and/or for diluting and/or transporting the agricultural compound to the application device (30).

Preferably, the device comprises at least two cartridge connector units to detachably attach the cartridges to the device, wherein each cartridge comprises a reservoir configured to hold at least an agricultural compound. Herein, a first compound may for instance be one of a biostimulant, micro nutrient, macro nutrient, safener, growth regulator, nematicide, herbicide, a pesticide, and a fungicide, the second compound being one of the same, or of a different compound, such as a different pesticide and a different fungicide; and the device further preferably comprises a mixing controller unit configured to compose a seed dressing from the at least first and at least second cartridge and the diluent composition. Preferably, the device also comprises a processor configured to identify the plant material and at least one additional environmental parameter and configured to controllably regulate the amount of the diluent, first chemical and/or second compound to be respectively provided to the fluid supply lines, and controlling the supply to the formed composition to application device.

Environmental conditions may include one or more agricultural management parameters for planting and growing crops is suited for promoting plant growth. This data may advantageously be collected from sensors on the device, or from other devices equipped with sensors and location-determining receivers. The environmental data may be associated with a field for growing a crop in a particular location, or with a particular crop type.

The device further preferably comprises a transmitter configured to transmit at least the seed and the at least one additional data to a remote computer for data analysis, wherein the transmitter is configured to transmit an order request to the remote computer for the remote computer to prepare and procure another cartridge with suitable agricultural compounds to selectively compose a seed treatment. The location-determining receiver preferably then facilitates referencing measurement locations to the particular location, and a transmitter then preferably transmits the collected environmental data to a data processing system. This data processing system may then apply the collected environmental data to an agronomic model for estimating one or more agricultural management parameters, e.g. need for certain active ingredients due to predictions of emergence of a certain pest and adjust the seed dressing to be applied accordingly. Also, the system may then require the operator, or a remote computer system, to prepare and dispatch another cartridge or cartridges with a dressing or at least one agricultural compound that may be needed for the treatment of a specific location. This permits to apply an in-time management for the delivery of agricultural compounds with minimal downtime for the sowing apparatus. The data may be transmitted using an automatic wireless transmission but also a manually initiated transmission, or a physical wired connection may be applied, wherein the another cartridge is delivered to an address corresponding to a location of the device.

Cartridges for use with the present invention may comprise a complete formulated seed dressing compositions, including one or more agricultural compounds, diluents and adjuvants, or may comprise concentrates.

In the latter case, accurately proportioned aliquots of the desired seed dressing may be prepared by metering a diluent flow to the a concentrate flow, static mixers such as Venturi systems, and flow through devices which typically channel a flow of fluid streams through a reservoir that holds a soluble product or concentrate, releasing the product into the stream.

This may be done by conventional metering pumps in the fluid supply system, which either may inject a predetermined amount of the concentrate into the fluid supply stream while adjusting to changes in flow volume in the stream, or they may be controlled electronically by flow sensors located in the fluid stream. Preferably, such components are chosen that they are essentially inert to wear and mechanical failure.

Using concentrates, the present invention may also provide for convenient packaging for handling and shipping, since the cartridges may be made smaller and lighter than presently used reservoir containers, thereby offering the potential to reduce manufacturing and shipping costs are therefore reduced. Furthermore, there is less volume of agricultural product required, resulting in reduced storage and handling requirements.

In some embodiments the cartridges comprising the agricultural product may be rigid. In some embodiments the agricultural product containers may be disposable.

It is thus an objective of the present invention to provide a device for dispensing selectively agricultural compounds, in which removable cartridges can be removed before being fully depleted and then reused later, the cartridges generally keeping track of the remaining dispensing volume. Hence, a device for dispensing agricultural compounds, in accordance with the principles of the present invention, generally comprises a housing having therein a main dispensing unit in fluid connection with a fluid flow control unit capable of producing fluid flow between the dispensing unit and an application device, and a controller unit operatively connected to the fluid flow unit. The device also comprises a removable cartridge which can be received in the dispensing unit fluidly closed and tamper proof manner, to minimize operator and general environmental exposure.

According to an aspect of the present invention, each cartridge may advantageously comprise a computer-readable unit, itself generally comprising at least an electronic data storage unit and an interface unit. The data storage unit has stored therein information such as, but not limited to, the serial number of the cartridge, the type of agricultural compound contained in the cartridge, the recommended dispensing cycle, the estimated remaining dispensing time or volume of the agricultural compound.

Correspondingly, the dispensing unit of the device generally comprises an interface unit operatively connected to the controller unit, or substantially integral therewith, which is configured to communicate with and read the information from the data storage unit of the computer-readable unit of the cartridge inserted in the device and to transmit the information to the controller unit. The interface unit of the dispensing unit is also preferably configured for writing updated and/or new information on the data storage unit of the computer-readable unit of the cartridge.

According to another aspect of the present invention, the controller unit is responsive to the information read from the computer-readable unit of the cartridge. In that sense, the controller unit can perform different functions depending on the information read. For example, upon being informed of the desired dispensing cycle, the controller unit can drive the fluid supply unit according to a specific sequence and/or according to a specific speed.

In another example, upon being informed of the estimated remaining dispensing volume or time, the controller unit could turn on and/or flash a warning indicator to indicate that the remaining dispensing volume is below a certain threshold and that the cartridge should be replaced.

In still another example, upon being informed of the type of agricultural compound stored in the cartridge, the controller unit could modulate the fluid supply speed to take into account the volume of the compound.

The computer-readable unit of the cartridge could be interfaced by the interface unit of the dispensing unit wirelessly (e.g. via radio-frequency transceivers) or through a physical connection (e.g. via connectors).

Though many kinds of known substrates could be used in the cartridges, those that allow for either easy cleaning and refill, or disposal in terms of incineration are preferred.

Hence, a device for dispensing dressings comprising agricultural compounds, in accordance with the principles of the present invention, generally comprises a main dispensing unit capable of receiving removable cartridges. The dispensing unit generally comprises a controller unit and a fluid supply unit in communication with the controller unit.

Each of the cartridges generally comprises a casing having therein a substrate bearing the one or more agricultural compound(s) and any diluents or solvents or otherwise carrier fluids to be dispensed, and a computer-readable unit capable of being interfaced by the controller unit of the dispensing unit. Advantageously, the device also comprises a fluid circuit for flushing or recycling diluent and seed dressing composition, to a waste reservoir.

The one or more cartridges may be preferably configured to be detachably attached to the device according the invention in a tamper-proof manner, and comprise a reservoir configured to hold at least a first agricultural compound. Preferably, the cartridge further comprises a controllable conduit operatively connected to the reservoir of the cartridge; and a cartridge controller that controllably regulates the dispensing of the a first agricultural compound to conduit when the cartridge is in fluid connection, and controls the dispensing of the a first agricultural compound into the fluid supply system and interacts with the device controller unit.

In accordance with the principles of the present invention, the controller unit may controllably drive the fluid supply unit based on information retrieved from the computer-readable unit of the cartridge received in the dispensing unit. Also in accordance with the principles of the present invention, the controller unit can warn the operator, through different signalling or warning schemes that a cartridge is almost depleted, or calcite the time until a cartridge needs replacement. By providing the ability to the cartridges and to the controller unit to communicate with each the other, and by providing the cartridges with memory, the present invention provides significant benefits such as, but not limited to, allowing the controller unit of the dispensing device to drive the supply unit according to a sequence and/or a speed which actually depend on the cartridge used in the device, and allowing the user to remove a used yet non-depleted cartridge and then reuse it later.

Preferably, the device also comprises a processor configured to identify the plant material and at least one additional environmental parameter, and configured to controllably regulate the amount of the diluent, first chemical and/or second compound to be respectively provided to the fluid supply lines, and controlling the supply to the formed composition to application device.

Environmental conditions may include one or more agricultural management parameters for planting and growing crops is suited for promoting plant growth. This data may advantageously be collected from sensors on the device, or from other devices equipped with sensors and location-determining receivers. The environmental data may be associated with a field for growing a crop in a particular location, or with a particular crop type.

Preferably, the one or more environmental condition includes abiotic or biotic stress conditions, humidity, temperature exposure, wind speeds, osmotic conditions, mineral conditions, light exposure, availability of nitrogen or phosphorus, and/or data based on weather and soil condition prediction.

The device further preferably comprises a transmitter configured to transmit at least the seed and the at least one additional data to a remote computer for data analysis, wherein the transmitter is configured to transmit an order request to the remote computer for the remote computer to prepare and procure another cartridge with suitable agricultural compounds to selectively compose a seed treatment. The location-determining receiver preferably then facilitates referencing measurement locations to the particular location, and a transmitter then preferably transmits the collected environmental data to a data processing system. This data processing system may then apply the collected environmental data to an agronomic model for estimating one or more agricultural management parameters, e.g. need for certain active ingredients due to predictions of emergence of a certain pest, and adjust the seed dressing to be applied accordingly According to the overall view in FIG. 1, the sowing device comprises a reservoir container 10 for plant propagation material, depicted herein as granular seed, a separating device 20 which is designed to separate plant propagation materials K fed from the reservoir container and to output them individually, and an application device 30 for applying seed dressing to the plant propagation materials K which are output individually by the separating device 20. The application device is designed and arranged here in such a way that it can apply seed dressing to the separated plant propagation materials K after they leave the separating device 20 during their falling movement onto the underlying surface B for seed.

In some embodiments, the chemical substance-spraying device includes a cartridge or canister configured to hold a solution including one or more active ingredients or seed coating composition upon release of the composition from the canister.

The exemplary canister is in fluid communication with a nozzle configured to release the composition from the canister.

In one aspect, two or more canisters are operatively coupled in fluid communication to a single nozzle, such that the single nozzle may be controlled (e.g., by the control unit or the control unit of the computing device) to selectively spray a seed coating from any one of the canisters coupled to the nozzle.

In another aspect, two or more cartridge may each be operatively coupled in fluid communication to their own respective nozzles such that each canister only sprays its respective composition only via its own respective nozzle.

The entire sowing device is usually mounted during practical use on an agricultural vehicle such as e.g. a tractor. In this context, a plurality of sowing devices can also be arranged on the vehicle, with the result that seed can be discharged simultaneously into a plurality of seed furrows. The seed devices can, of course, also be applied with a common reservoir container here.

For most modern crop and vegetable seeding and transplanting processes, precision seeders are employed, which separate out and singulate seeds for a selective planting. Generally, three different mechanisms are employed for the singulation mechanism, namely vacuum singling, mechanical singling and overpressure singling, whereby the majority of precision seed planters to date use a vacuum for seed singling. Seed Drills can plant small to large seeds, spaced closely in the row, and tend to spout seeds into the furrow like into a funnel, with limited spacing adjustment in the row, so thinning may be required if a close crop spacing is not desired. Plate planters comprise a rotating plate that picks up mostly one seed at a time in a suitably spaced cell of the plate, and then drop it into the furrow, and are usually employed for medium to large size granular seeds. By adjusting gear or plate size, the spacing of the seeds into rows can be regulated. Other systems include punched conveyer belts, vacuum-assisted plate wheels, or seed cup systems for singling out one seed at a time for planting. Independently from the actual way in which the seeds are metered, the present invention permits to use untreated seeds, and an on-the-go adjustment of the seed dressing applied, both in volume and composition, while eliminating the issue of contaminated dust.

Typically, seeders may comprise one or more of seeding units, which are used for a row of planted seed each. This may be accomplished by supplying seed to separate reservoirs, e.g. one per seed unit, or by supplying the seeds to each seed unit from a central reservoir that is pneumatically transporting seed to separate units; or combinations of a central reservoir and smaller reservoirs or hoppers per seed unit. In a pneumatic system, seeds are provided in a central reservoir which is linked to each seed unit by feed lines. After loading, the reservoir tank is closed, and tank and feed lines are pressurized. This pressure then permits to transport seeds to individual row seed units.

Typically, the seed units are mounted on a toolbar for multi-row planting, usually in symmetrical numbers. Row spacings between rows can then easily be adjusted by attaching the planter unit on the toolbar at the desired spacing. A planter unit typically comprises a furrow unit that prepares the soil for the seed. Row cleaners push stalks, leaves and clods of soil out of what will become the furrow. Then typically gauge wheels regulate how deep a seed will be planted, followed by opener wheels that open the soil to create the furrow. Then a seed meter continually spins, separating seeds, and allowing them to fall through a seed tube and onto the underlying soil at a time. Once a seed has dropped into the furrow, a seed firmer or shoe, presses the seed gently to the soil creating good seed to soil contact, and finally a closing wheels fill the furrow with soil again.

Figure 6:
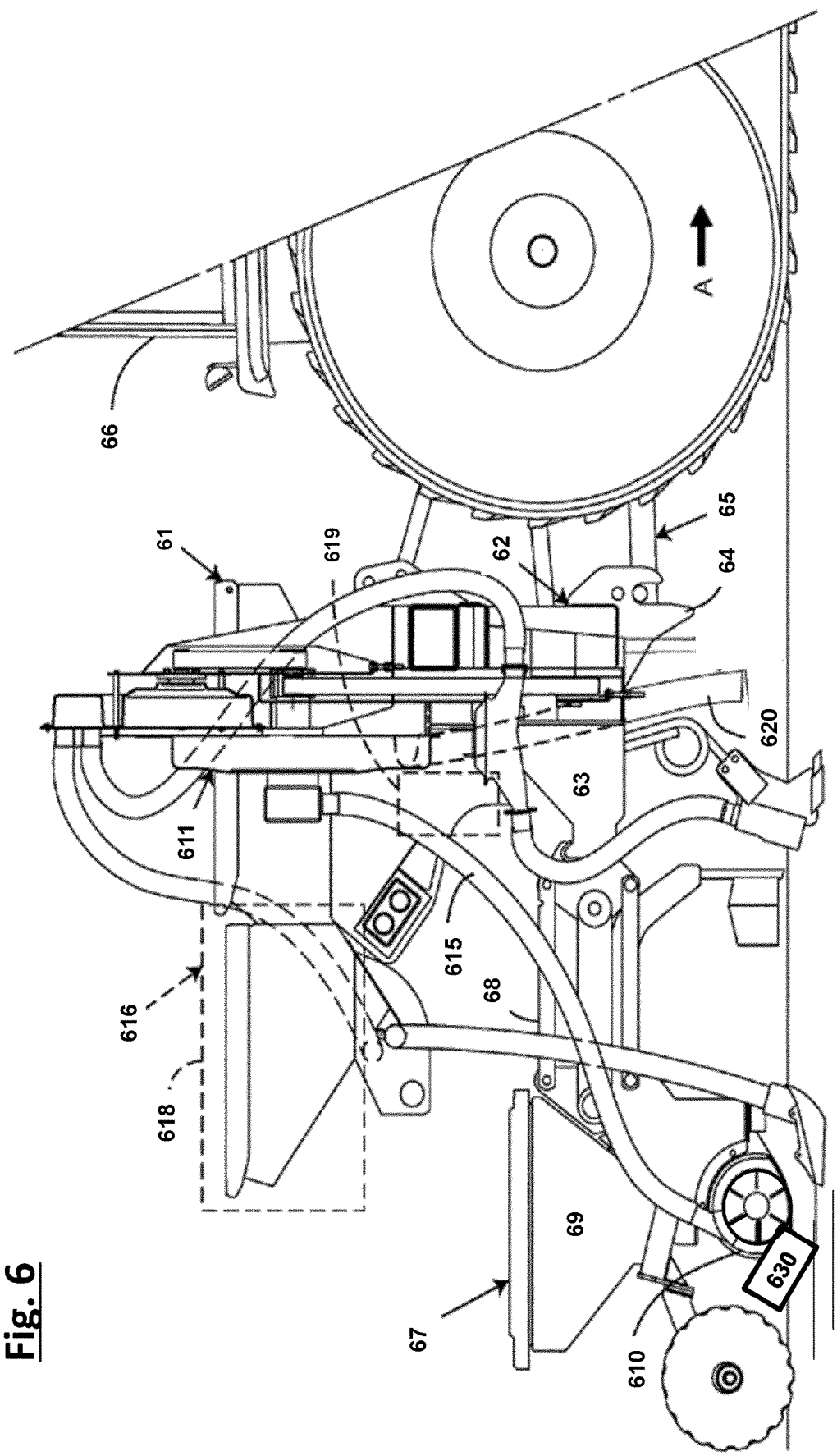
FIG. 6 shows a side view of a retrofitted sowing device according to the invention, as attached to a tractor.

FIG. 6 shows a conventional single row unit: Each row unit has its own hose that links it to the main hopper tanks, and once seeds fill the smaller hopper boxes, gravity forces them into the seed meter. Inside each meter, a seed is sucked onto a plate that is pocked with individual holes, which can take up one seed to one hole. Vacuum drawn through the holes attract and hold the seeds to the plate. As shown in FIG. 6, a pneumatic precision seed drill (61) comprises a frame (62) comprising a main beam (63) extending substantially perpendicular to the direction of advance (A) and a coupling structure (64) which is connected to a coupling system (65) a tractor (66). On this main beam (63) sowing elements (67) are attached at regular intervals on beam (63) via a deformable parallelogram (68). The latter allows each sowing element (67) to follow the irregularities of the soil. Each sowing unit (67) comprises a hopper (69) for containing seeds and a metering and separation device (610) whose function is to extract one by one the seeds of the reservoir (69) and distribute them at a constant interval through the dressing application unit (617) and into the furrow. In the drill (61), the seed distribution is assisted by a pneumatic device. Seed selection is assisted by vacuum suction. This air flow is produced by a fan (611) driven by the power take-off of the tractor (66). Flexible tubing connects the fan (611) to the different seeding units (67). The seed distribution unit (610) comprises a housing of generally cylindrical shape and a metering disc provided with perforations spaced on its circumference. The metering disc is rotatably mounted on a horizontal axis inside the housing. The disc separates the seed receptacle from the suction chamber so that the perforations are depressed and retain seeds taken from the receptacle. The size of the perforations is smaller than that of the seeds. During their angular displacement, a selector eliminates duplicate seeds. When the seed arrives in the lower part of the housing, the depression ceases and the seed is released and falls by gravity through the seed tube and the retrofitted application unit (630), where the seed is selectively sprayed with an aliquot of a dressing composition downward into the furrow. A fan (611) for pressurized air is fixed on the frame (62) via a substantially vertical support structure. The pressurized air is conveyed from the turbine (611) to each sowing unit (67) by means of a hose (615), respectively. The drill (61) is equipped with a application device (630) for selectively applying an aliquot of a seed dressing composition to each seed while the latter is falling to ground. This device (630) therefore eliminates the necessity to use pre-treated seeds.

Figure 7:
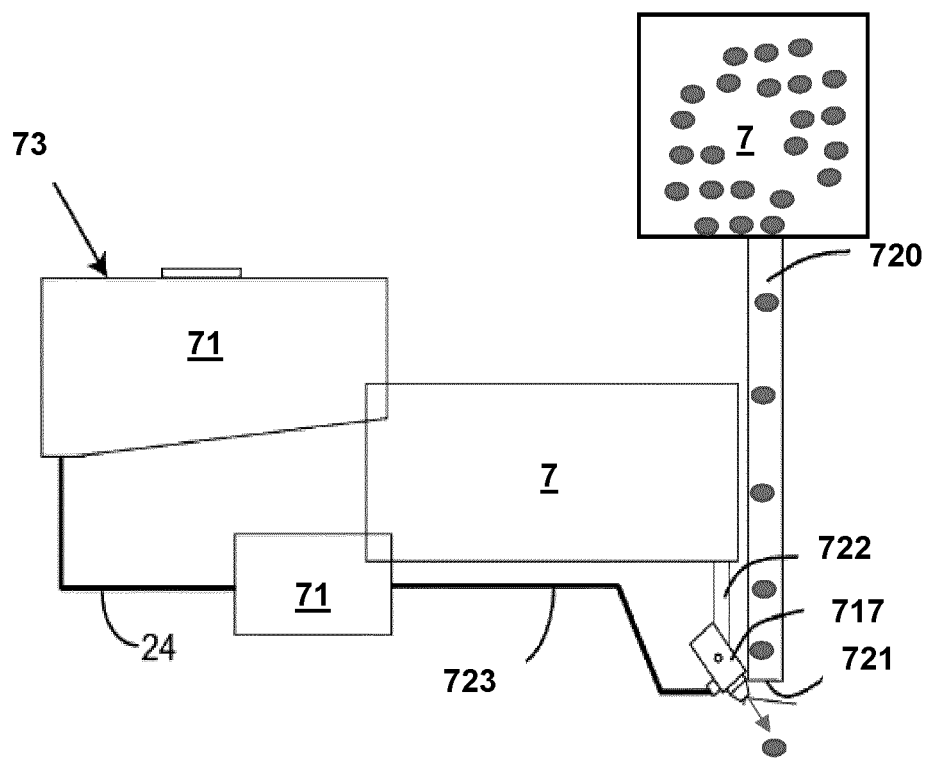
FIG. 7 shows a schematic view of the components of an exemplary embodiment of the system.

In FIG. 7, an exemplary application device (730) is illustrated as comprising at least one spray nozzle (717), a reservoir (718) capable of containing a dressing composition in an applicable state, and a sensor array in the seed line after the separator (not shown), and a pump (719). The dressing pressurized by the pump (719) is then selectively divided into drops by means of a nozzle (717). Thus fine droplets are created to wet at least part of a seed falling though the seed tube (720) from the reservoir (71) and singulated by the metering device (not shown). The frame (72) of the seed drill (71) carries the application device (730). The nozzle (717) is connected to the frame (72) via an arm (722). The dressing reservoir (718) is advantageously removable and interchangeable. The reservoir (718) has a capacity in adequacy for the necessary treatment volumes needs.

Further objects and advantages of the present invention will now become apparent from the following description of preferred embodiments of apparatus for carrying out the method, as particularly illustrated in the accompanying drawings which form a part of this application. It is obvious that the invention is not limited to the embodiments described above and shown in the accompanying drawings. Modifications remain possible, in particular as regards the constitution or the number of the various elements or by substitution of technical equivalents, without departing from the scope of protection as defined by the following claims.

The invention claimed is:
1. A system for modifying existing sowing equipment comprising a plant propagation materials reservoir, a separation device for separating plant propagation materials, and an outlet for directing the separated plant propagation materials to an underlying surface for the plant propagation materials, comprising an application device configured to be attachable to the outlet or to the separation device, for selectively applying an aliquot of a dressing composition to the separated plant propagation materials, wherein the application device is configured to operably apply the dressing compositions to the plant propagation material directly before the plant propagation material is injected into the underlying surface for the plant propagation materials, wherein the application device further comprises:
  i. a power supply connector,
  ii. a reservoir for the dressing composition, all attachable to the sowing equipment;
  iii. a sensor array comprising at least one sensor for measuring the trajectory of the plant propagation materials while free-falling, iv. a controller for calculating the trajectory from the data received from the sensor array; and for coordinating and applying the dressing composition; and
v. an outlet device for dispensing an aliquot of the dressing composition selectively onto the plant propagation materials during free-falling; wherein the application device has a sensor shaft which is open at both ends, and wherein the application device is arranged in such a way that the separated plant propagation materials fall through the sensor shaft on their path from the separating device to the underlying surface for plant propagation material;
wherein at least one sensor for detecting the passage of a plant propagation material through the sensor shaft is arranged in the sensor shaft, and wherein the application device has a triggerable application nozzle for the dressing composition configured to apply a defined quantity of dressing composition to a plant propagation material having fallen through the sensor shaft, once the plant propagation material is outside the sensor shaft, wherein the application device has a controller which cooperates with the at least one sensor, the controller bringing about the triggering of the application nozzle in accordance with sensor signals generated by the at least one sensor, in order to apply the dressing composition to the plant propagation material;
wherein the application nozzle is configured to eject, each time the application nozzle is triggered, a defined quantity of plant propagation material dressing along a spraying trajectory, wherein the controller is configured to calculate a position of an impact location at which the spraying trajectory and the fall line of the plant propagation material to which dressing is applied intersect, and wherein the at least one sensor is configured to detect a transverse position of the plant propagation material within the sensor shaft, and wherein the controller is configured to calculate the time delay on the basis of the transverse position of the impact location and the rate of fall of the plant propagation material;
and wherein the application nozzle is oriented such that its spraying trajectory intersects the fall lines of the plant propagation materials at an acute angle.

2. The system according to claim 1, wherein the dressing composition comprises at least one agricultural compound and at least one additional component for forming the dressing composition for application, or the dressing composition, in fluid connection with the application system.

3. The system according to claim 2, further comprising a diluent reservoir for a diluent suitable for diluting the at least one agricultural compound and the at least one additional component to form a dressing composition.

4. The system according to claim 1, further comprising a mixing control unit configured and operable to adapt the dressing composition by controlling the flow of the dressing composition and/or diluent to obtain a dressing composition to an application state, and/or to a state and composition suitable for the one or more environmental condition, and/or the specific plant propagation material.

5. The system according to claim 1, wherein the application device comprises a valve operatively controlled by the controller.

6. The system according to claim 1, wherein at least two sensors for detecting the passage of a material through the sensor shaft are arranged one after the other along the sensor shaft, in the falling direction of the plant propagation materials, wherein the controller is configured to calculate, on the basis of the sensor signals of the at least two sensors, a time delay after which it brings about the triggering of the application nozzle.

7. The system according to claim 1, wherein the application nozzle is oriented such that its spraying trajectory intersects the fall lines of the plant propagation materials at an acute angle of 30°-60°.

8. The system according to claim 1, wherein the application device has two or more application nozzles per application device, by means of which one, two or more dressing compositions can be applied to the separated plant propagation materials.

9. The system according to claim 1, further comprising a cartridge assembly comprising one or more cartridges comprising the dressing composition, components of the dressing composition, or a pre-mix of the dressing composition, wherein the application device is configured to apply the dressing composition from the one or more cartridges to the separated plant propagation materials after they leave the separating device.

10. The system according to claim 9, wherein the cartridge assembly comprises at least one removable cartridge comprising at least one agricultural compound and/or at least one additional component, and a computer-readable unit having information stored therein, a dispensing assembly comprising: a) a controller unit; b) a dispensing unit in communication with the controller unit and configured for generating a fluid supply flow to the application device; c) an interface unit in communication with the controller unit, the interface unit being configured to interface the computer-readable unit of the cartridge and to at least retrieve the information stored therein; wherein the dispensing unit is responsive to the information stored on the computer-readable unit and retrieved therefrom, preferably wherein the controller unit and the interface unit are integral.

11. The system according to claim 10, wherein the controller unit is configured to control the dispensing unit, and preferably also configured to modulate the volume and pressure of the fluid supply flow based on the information stored on the computer-readable unit and retrieved therefrom.

12. The system according to claim 10, wherein the one or more cartridges can be repeatedly removed from the device, and optionally, refilled with dressing premix or dressing composition and then replaced in the device with minimal operator interaction and exposure to the dressing components, wherein the one or more cartridges are each connected to a nozzle from a plurality of nozzles per application device, through which the dressing composition can be applied from the one or more cartridges to the plant propagation materials, more preferably wherein each cartridge comprises a different or identical dressing premix or application state dressing composition.

13. A kit of parts comprising a. a precision sowing equipment comprising a plant propagation materials reservoir, a separation device for separating plant propagation materials, and an outlet for directing the separated plant propagation materials to the underlying surface for the plant propagation materials, and b. an application device configured to be attachable to the outlet or the separation device, for selectively applying an aliquot of a dressing composition to the separated plant propagation materials, wherein the application device further comprises:
i. a power supply connector,
ii. a reservoir for the dressing composition, all attachable to the sowing equipment;
iii. a sensor array comprising at least one sensor for measuring the trajectory of the plant propagation materials while falling,
iv. a controller for calculating the trajectory from the data received from the sensor array; and for coordinating and applying the dressing composition; and
v. an outlet device for dispensing an aliquot of the dressing composition selectively onto the plant propagation materials during free-falling; wherein the application device has a sensor shaft which is open at both ends, and wherein the application device is arranged in such a way that the separated plant propagation materials fall through the sensor shaft on their path from the separating device to the underlying surface for plant propagation material;
wherein at least one sensor for detecting the passage of a plant propagation material through the sensor shaft is arranged in the sensor shaft, and wherein the application device has a triggerable application nozzle for the dressing composition configured to apply a defined quantity of dressing composition to a plant propagation material having fallen through the sensor shaft, once the plant propagation material is outside the sensor shaft, wherein the application device has a controller which cooperates with the at least one sensor, the controller bringing about the triggering of the application nozzle in accordance with sensor signals generated by the at least one sensor, in order to apply the dressing composition to the plant propagation material;
wherein the application nozzle is configured to eject, each time it is triggered, a defined quantity of plant propagation material dressing along a spraying trajectory, wherein the controller is configured to calculate the position of an impact location at which the spraying trajectory and the fall line of the plant propagation material to which dressing is applied intersect, and wherein the at least one sensor is configured to detect a transverse position of the plant propagation material within the sensor shaft, and wherein the controller is configured to calculate the time delay on the basis of the transverse position of the impact location and the rate of fall of the plant propagation material;
and wherein the application nozzle is oriented such that its spraying trajectory intersects the fall lines of the plant propagation materials at an acute angle.

14. A method for retrofitting an existing sowing equipment, comprising
a. providing an existing sowing equipment comprising a plant propagation materials reservoir, a separation device for separating plant propagation materials, and an outlet for directing the separated plant propagation materials to the underlying surface for the plant propagation materials, and
b. operably attaching an application device configured to be attachable to the outlet or the singulatseparation device, for selectively applying an aliquot of a dressing composition to the separated plant propagation materials to the separation device or outlet
wherein the application device comprises:
i. a power supply connector,
ii. a reservoir for the dressing composition, all attachable to the sowing equipment;
iii. a sensor array comprising at least one sensor for measuring the trajectory of the plant propagation materials while falling,
iv. a controller for calculating the trajectory from the data received from the sensor array; and for coordinating and applying the dressing composition; and
v. an outlet device for dispensing an aliquot of the dressing composition selectively onto the plant propagation materials during free-falling; wherein the application device has a sensor shaft which is open at both ends, and wherein the application device is arranged in such a way that the separated plant propagation materials fall through the sensor shaft on their path from the separating device to the underlying surface for plant propagation material;
wherein at least one sensor for detecting the passage of a plant propagation material through the sensor shaft is arranged in the sensor shaft, and wherein the application device has a triggerable application nozzle for the dressing composition configured to apply a defined quantity of dressing composition to a plant propagation material having fallen through the sensor shaft, once the plant propagation material is outside the sensor shaft, wherein the application device has a controller which cooperates with the at least one sensor, the controller bringing about the triggering of the application nozzle in accordance with sensor signals generated by the at least one sensor, in order to apply the dressing composition to the plant propagation material;
wherein the application nozzle is configured to eject, each time it is triggered, a defined quantity of plant propagation material dressing along a spraying trajectory, wherein the controller is configured to calculate the position of an impact location at which the spraying trajectory and the fall line of the plant propagation material to which dressing is applied intersect, and wherein the at least one sensor is configured to detect a transverse position of the plant propagation material within the sensor shaft, and wherein the controller is configured to calculate the time delay on the basis of the transverse position of the impact location and the rate of fall of the plant propagation material;
and wherein the application nozzle is oriented such that its spraying trajectory intersects the fall lines of the plant propagation materials at an acute angle.

15. The system according to claim 1, wherein the at least one sensor comprises a plurality of sensors, which are configured to detect the transverse position of the plant propagation materials within the sensor shaft, are arranged in the sensor shaft, and wherein the controller is configured to calculate individually the time delay for each material taking into account the transverse position of the plant propagation material.

* * * * *